US006995897B2

(12) United States Patent  
Mushika et al.

(10) Patent No.: US 6,995,897 B2
(45) Date of Patent: Feb. 7, 2006

(54) DEFORMABLE MIRROR AND INFORMATION DEVICE HAVING THE DEFORMABLE MIRROR

(75) Inventors: Yoshihiro Mushika, Neyagawa (JP); Teruyuki Takizawa, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/088,207

(22) Filed: Mar. 23, 2005

(65) Prior Publication Data
US 2005/0168798 A1 Aug. 4, 2005

Related U.S. Application Data

(62) Division of application No. 10/470,685, filed as application No. PCT/JP02/00676 on Jan. 29, 2002.

(30) Foreign Application Priority Data

Jan. 30, 2001 (JP) ............................. 2001-021143
Apr. 17, 2001 (JP) ............................. 2001-117845

(51) Int. Cl.
G02F 1/29 (2006.01)
G11B 7/00 (2006.01)
(52) U.S. Cl. ................ 359/300; 369/112.1; 369/44.23; 369/53.19
(58) Field of Classification Search ............ 250/201.9; 359/300; 369/44.23, 53.13, 53.19, 53.23, 369/112.1
See application file for complete search history.

(56) References Cited

U.S. PATENT DOCUMENTS

| 4,737,621 A | 4/1988 | Gonsiorowski et al. |
| 5,079,544 A | 1/1992 | DeMond et al. |
| 6,057,913 A | 5/2000 | Brown et al. |
| 6,185,167 B1 | 2/2001 | Arai et al. |
| 6,220,707 B1 | 4/2001 | Bille |
| 6,411,576 B1 | 6/2002 | Furukawa et al. |
| 6,430,137 B1 | 8/2002 | Saimi et al. |
| 2005/0063285 A1* | 3/2005 | Mushika et al. ........ 369/112.29 |

FOREIGN PATENT DOCUMENTS

| EP | 0 790 604 A2 | 8/1997 |
| JP | 01-253841 A | 10/1989 |
| JP | 07-084196 A | 3/1995 |

(Continued)

OTHER PUBLICATIONS

Ariga, "Hosho Kogaku no Tsushin-Keisoku eno Oyo", *The Journal of the Institute of Electronics, Information And Communication Engineers*, vol. 80, No. 12, pp. 1237-1241, (1997).

(Continued)

*Primary Examiner*—David N. Spector
(74) *Attorney, Agent, or Firm*—Akin Gump Strauss Hauer & Feld, LLP

(57) ABSTRACT

A deformable mirror according to the invention comprises a substrate, a reflector which is supported by said substrate and the shape of whose reflecting areas is variable, and a plurality of drive units for independently driving a plurality of regions of the reflector and thereby controlling the distances between said plurality of regions and said substrate. Each of the plurality of drive units comprises a plurality of electrodes disposed over said substrate, a tilt member which is rotated round the axis of tilt by being attracted by the selected one of the plurality of electrodes, and an action member for varying the distance between a specific region of the reflector and said substrate following the motion of the tilt member.

22 Claims, 26 Drawing Sheets

FOREIGN PATENT DOCUMENTS

| | | |
|---|---|---|
| JP | 09-237425 A | 9/1997 |
| JP | 10-222856 A | 8/1998 |
| JP | 10-289468 A | 10/1998 |
| JP | 11-014918 A | 1/1999 |
| JP | 11-231234 A | 8/1999 |
| JP | 11-305159 A | 11/1999 |
| JP | 2000-182268 A | 6/2000 |
| JP | 2000-235715 A | 8/2000 |

OTHER PUBLICATIONS

Mali, et al., "Development of microelectromec hanical deformable mirrors for phase modulation of light", Optical Engineering, vol. 36, No. 2, pp. 542-548, (1997).

Hornbeck, "Digital Light Processing™ for High-Brightness, High-Resolution Applications", pp. 1-14, 1996 best avail.

* cited by examiner

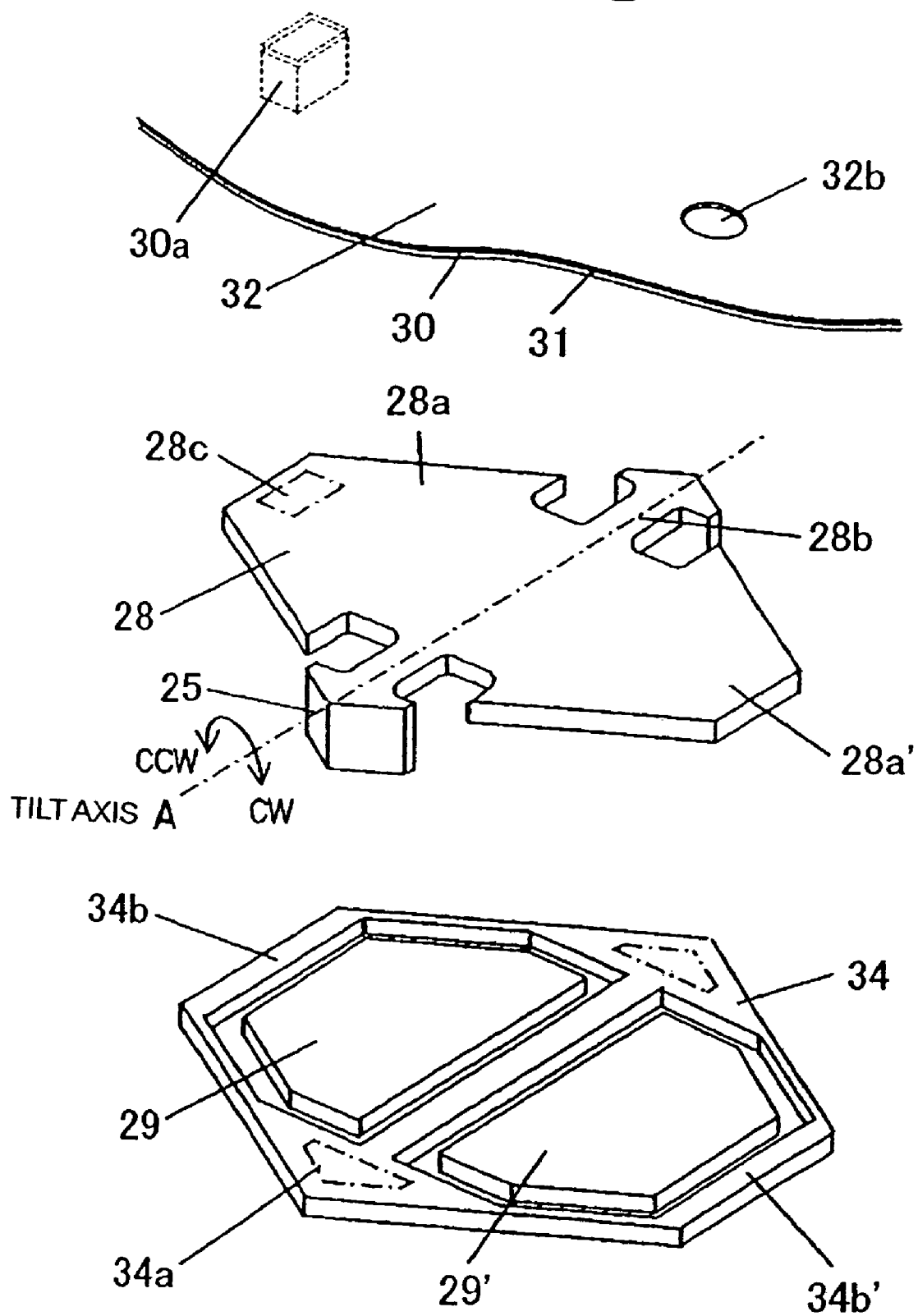

DETECTION REGIONS

PRIOR ART

DEFORMABLE MIRROR AND INFORMATION DEVICE HAVING THE DEFORMABLE MIRROR

CROSS REFERENCE TO RELATED-APPLICATIONS

This application is a divisional of U.S. patent application Ser. No. 10/470,685, filed Jul. 29, 2003, which was published on Apr. 1, 2004, under U.S. Publication No. 2004/0061917 A1, which application was a U.S. National Phase of International Application No. PCT/JP2002/00676 filed Jan. 29, 2002, which was published on Aug. 8, 2002, under Publication No. WO 02/061,488 A1, and the disclosures of which are incorporated herein by reference.

TECHNICAL FIELD

The present invention relates to a deformable mirror comprising a displaceable light reflecting area, and an information device capable of reading information out of a storage medium and/or writing information onto a storage medium. The invention also relates to an optical compensation device and a wave front detection device for detecting and correcting the wave front of light beams coming incident from an external light source or of light beams from a light source provided inside.

BACKGROUND ART

As an example of information device for optically detecting information according to the prior art, an optical disk device will be described. The optical disk device irradiates an optical disk, which is its recording medium, with forward light emitted from a laser beam source and detects variations in the intensity of the reflected backward light. Then, information recorded on the optical disk can be detected on the basis of these variations in the backward light. This kind of information device requires keeping the spot shape of the light beams appropriate to ensure highly reliable reproduction or recording. For this purpose, it is essential to suppress wave front aberrations of the light beams arising on the optical path.

In an optical disk device, wave front aberrations may arise from any of a wide variety of causes including a tilt of the optical axis of the light beams relative to the recording layer of the disk, a variation in the thickness of the disk substrate and the smear of the disk surface with a fingerprint or the like, and the type of wave front aberration may vary with the cause. For instance, wave front aberrations due to tilts are predominantly coma aberrations and astigmatisms, while wave front aberration due to a variation in the thickness of the disk substrate are predominantly spherical aberrations.

According to the prior art, techniques of detecting a specific type of aberration from the output signals of an optical pickup and correcting it have been proposed, and they are disclosed, for instance, in the Japanese Patent Laid-Open No. 2000-155979. The information device disclosed in this patent application will be described below with reference to FIGS. 26(a) and 26(b).

In this information device, as shown in FIG. 26(a), light beams emitted from a light source 101, such as a semiconductor laser, are transmitted by a wave front converting element 304, after passing a half mirror 302 and being converted into substantially parallel light by a collimating lens 303. The transmitted light is subsequently brought to incidence by an objective lens 305 onto the write/read information layer through the substrate of an optical disk 306.

The light beams reflected by the write/read information layer of the optical disk 306 are again transmitted by the substrate, and transmitted successively by the objective lens 305, the wave front converting element 304 and the collimating lens 303. After they are reflected by the half mirror 302, they are diffracted by a hologram 309 and brought to incidence on an optical detector 307 for signal detection use.

The optical detector 307 is configured of optical detecting elements, such as pin diodes, for detecting information signals, control signals including focusing signals and tracking signals, and aberrations of light beams. These detecting elements may either be individually configured for different modes of signal detection or perform a plurality of functions by integrating them. The detected aberrations are processed by a signal processing circuit 308 and drive the wave front converting element 304.

The wave front converting element 304 is an element comprising two glass substrates between which liquid crystals are sealed in. In the wave front converting element 304, the part which light beams pass are divided into a plurality of areas, and a voltage is applied to each area independently of others to vary the refractive index of the corresponding part and thereby to change the phase of the wave front.

A configuration for detecting coma aberrations in particular, out of different wave front aberrations, is shown in FIG. 26(b) to exemplify the optical detector 307 and the hologram 309. Out of light beams 312 on the backward path, on which the beams reflected by the optical disk are condensed, only those passing the path center part 313 of the area of Y>0 are separated from the light beams passing other areas than the area 313, and condensed into bisected optical detectors 317a and 317b to cause a light spot 314 to be formed. Here, the configuration is such that the light spot 314 be formed to focus on the line dividing the optical detectors 317a and 317b from each other when there is no aberration. The area 313 is so set that, when any coma aberration has arisen in the direction of the Y axis, light beams ahead of or behind the light beams passing other areas than this in phase can be extracted.

If the light beams passing the area 313 are behind in phase, those light beams will be focused behind the detection surfaces of the optical detectors, and the output of the optical detector 317a will become greater than that of the optical detector 317b. Conversely, if the light beams passing the area 313 are ahead in phase, those light beams will be focused ahead the detection surfaces of the optical detectors, and the output of the optical detector 317a will become smaller than that of the optical detector 317b. By detecting a signal of the output difference between the bisected optical detectors 317a and 317b, the quantity and sign of the coma aberration are determined.

As another example of the optical detector 307 and the hologram 309, a configuration for detecting spherical aberrations in particular is shown in FIG. 26(c). An optical axis 310 is supposed to pass the origin of the X-Y coordinate system. In light beams 322 on the backward path, on which the beams reflected by the optical disk are condensed, only those passing the area 323 of Y>0, out of the areas between two concentric circles of differing diameters around the optical axis 310 are separated from the light beams passing other areas than the area 323, and condensed into bisected optical detectors 317a and 317b to cause a light spot 324 to be formed. Here, the configuration is such that the light spot 324 be formed to focus on the line dividing the optical detectors 317a and 317b from each other when there is no aberration. The area 323 is so set that, when any spherical aberration has arisen, light beams ahead of or behind the light beams passing other areas than this in phase can be extracted.

If the light beams passing the area 323 are behind in phase, those light beams will be focused behind the detection surfaces of the optical detectors, and the output of the optical detector 317a will become greater than that of the optical detector 317b. Conversely, if the light beams passing the area 323 are ahead in phase, those light beams will be focused ahead the detection surfaces of the optical detectors, and the output of the optical detector 317a will become smaller than that of the optical detector 317b. By detecting a signal of the output difference between the bisected optical detectors 317a and 317b, the quantity and sign of the spherical aberration are determined. Other aberrations, for instance astigmatisms, can be detected if the arrangement and shapes of the optical detector 307 and the hologram 309 are optimally designed.

Besides the liquid crystal system, there is also available for the wave front converting element 304 a deformable mirror system by which the optical path length is controlled by deforming a flexible deformable mirror, and this technique is disclosed in the Japanese Patent Laid-Open No. 11-14918. The configuration here is such that a metallic thin film is vapor-deposited on the surface of a flexible deformable plate to make it a mirror surface, an electrode is provided on the rear side of the deformable plate in the opposite position with a prescribed gap in-between, and the deformable plate is attracted with an electrostatic force by applying a voltage to this electrode.

The information devices described above involve the following problems.

First, as the detection and correction of wave front aberrations are limited to a specific type or another, it is not possible all the time to address a wave front aberration of a desired type. For instance if the hologram 309 and the optical detector 307 are so designed as to permit detection of coma aberrations in the direction of the Y axis as shown in FIG. 26(b), no other wave front aberrations (such as coma aberrations in the direction of the X axis, spherical aberrations and astigmatisms) can be detected accurately. The same is true of the case shown in FIG. 26(c), wherein no others than spherical aberrations can be detected accurately. However, usual wave front aberrations arise from combinations of causes including a tilt, a variation in the thickness of the disk substrate, double refraction and smear with a fingerprint or the like, but the aberrations that arise are not always confined to any specific type.

Accurate detection of such a broad variety of wave front aberration types is difficult with a configuration for aberration detection based on a specific pattern of wave front aberration. Similarly, in correcting wave front aberrations, the electrode pattern for drying liquid crystals for correcting coma aberrations and that for correcting spherical aberrations differ from each other, and accurate detection of a broad variety of wave front aberration types is difficult with a configuration for aberration detection based on a specific pattern of wave front aberration.

Second, it is difficult to achieve at the same time a broad enough range of wave front correction and adequate responsiveness and accuracy. In the case of a wave front converting element using liquid crystals, it is possible to widen the range of wave front correction by thickening the liquid crystal layer, but this would invite a deterioration in correction accuracy due to a drop in transmission efficiency and response speed, and increased discontinuity of the optical path length between electrode patterns. On the other hand, in a wave front converting element using a deformable mirror, as the only electrostatic force working on the deformable plate is an attracting force, there is a problem that in the configuration according to the prior art, active drive is only possible in the direction of bringing the deformable plate towards the electrode. Therefore, the only driving force in the reverse direction is only a passive one deriving from the righting force of the deformable plate which has been once deformed, and this lack of symmetry of the driving forces results in poor control accuracy and responsiveness. Moreover, bidirectional driving by utilizing such a passive force inevitably requires the use of a position deformed in advance to some extent as the reference face, it is made difficult to reproduce the shape of the reference face stably by fluctuations in drive sensitivity from one unit to another, and this invites a deterioration in the accuracy of correction.

The main object of the present invention is to provide a deformable mirror adaptable to a broad variety of aberration types and capable of correcting wave front aberrations, which is accurate, broad in correctable range and highly responsive and an information device equipped with such a mirror.

Another object of the invention is to provide an optical compensation device and a wave front detection device which can be readily reduced in size and cost and excels in relative positional accuracy.

DISCLOSURE OF INVENTION

A deformable mirror according to the present invention comprises: a substrate; a reflector supported by the substrate and having a plurality of light reflecting areas which can be separately driven; and a plurality of drive units for independently driving each of the plurality of light reflecting areas and thereby controlling the dispositional relationship between each light reflecting area and the substrate, wherein each of the plurality of drive units comprises a plurality of electrodes supported by the substrate, a tilt member which is rotated around the axis of tilt by being attracted by a selected one of the plurality of electrodes, and an action member for varying the distance between a specific region of the reflecting areas and the substrate following the motion of the tilt member.

In a certain preferable embodiment of the present invention, the plurality of drive units are coupled to corresponding one of the reflecting areas.

In a certain preferable embodiment of the present invention, the tilt member has a supporting portion arranged on the axis of tilt and a planar portion coupled to the supporting portion, the planar portion of the tilt member includes a first electroconductive portion and a second electroconductive portion which are symmetric with respect to the axis of tilt, and the plurality of electrodes include a first electrode opposite the first electroconductive portion of the planar portion with a gap in-between and a second electrode opposite the second electroconductive portion of the planar portion with a gap in-between.

In a certain preferable embodiment of the present invention, each light reflecting area of the reflector is coupled to one of the first electroconductive member and the second electroconductive member of the planar portion in the corresponding one of the drive units via a coupling member functioning as the action member.

In a certain preferable embodiment of the present invention, in a selected drive unit out the plurality of drive units, the curvature of the surface of the light reflecting area coupled to the drive unit can be varied by performing an action to make either one of the spacing between the first electroconductive portion of the planar portion and the first electrode and the spacing between the second electroconductive portion of the planar portion and the second electrode shorter than the other.

In a certain preferable embodiment of the present invention, the action is executed by providing a higher electric potential to either one of the first electrode and the second electrode in the selected drive unit than to the other.

In a certain preferable embodiment of the present invention, the circumference of the reflector is configured of a deformable film fixed to the substrate, and the film comprises tension in advance.

In a certain preferable embodiment of the present invention, the reflective film is formed of a material having a greater thermal expansion coefficient than the thermal expansion coefficient of the substrate, and the reflective film has been formed at a higher temperature than the temperature at which it is intended to be used.

In a certain preferable embodiment of the present invention, the coupling member is a portion protruding from the film and formed of the same material as the material of the film.

In a certain preferable embodiment of the present invention, the distance between the coupling member and the axis of tilt in each drive unit is set as a function of the position of the drive unit on the substrate.

In a certain preferable embodiment of the present invention, the reflector is fixed to the substrate at a fixed point position farther inside than its circumference.

In a certain preferable embodiment of the present invention, out of the plurality of drive units, a drive unit arranged in position relatively close to the fixed point has the distance between the corresponding coupling member and the axis of tilt being set shorter than those of drive units arranged relatively far from the fixed point.

In a certain preferable embodiment of the present invention, the reflector is configured of a plurality of micromirrors separated from one another, and the plurality of micromirrors are coupled to respectively different drive units out of the plurality of drive units and are independently displaceable.

In a certain preferable embodiment of the present invention, when no drive signal is given to the drive units, the reflective surfaces of the micromirrors are arrayed on a virtual same plane where the curvature becomes substantially zero, and when any drive signal is given to the drive units, the reflective surface is displaced forward or backward relative to the plane.

In a certain preferable embodiment of the present invention, the micromirrors have a shape whose lengthwise direction is a direction parallel to the axis of tilt, and the drive units have a shape whose lengthwise direction is a direction normal to the axis of tilt.

In a certain preferable embodiment of the present invention, there is further provided a voltage applying circuit which receives an address signal to designate a selected drive unit out of the plurality of drive units and a drive signal to be given to the drive unit designated by the address signal, and applies voltages to the electrodes in the selected drive unit on the basis of the address signal and the drive signal.

In a certain preferable embodiment of the present invention, the voltage applying circuit comprises an address counter which updates n (n is an integer not smaller than 2) output values in a circulatory process with a first clock signal, a counter which updates output values with a second clock signal generated by dividing the frequency of the first clock by n, a memory for outputting drive signals according to the output of the address counter, a comparator for comparing the output of the memory and the output of the counter, a shift register for shifting the output of the comparator in response to the first clock signal, and a latch unit for latching the output of the shift register in response to the second clock signal.

An information device according to the present invention is an information device for irradiating a medium with forward light emitted from a light source and detecting information stored by the medium on the basis of backward light modulated by the medium, and comprises a wave front detector for detecting the wave fronts of the backward light in respect of each of a plurality of detection regions included in a section across the optical axis of the backward light; a wave front corrector, provided within the optical path of the forward light and/or backward light, for locally varying the optical path length of the forward light and/or backward light by an action of a plurality of drive units arrayed on a plane crossing the optical path; and a control unit for supplying a plurality of drive signals to the wave front corrector on the basis of a plurality of outputs of the wave front detector and reconstructing the whole wave fronts of the backward light.

In a certain preferable embodiment of the present invention, the control unit has a multi-input/multi-output converting unit comprising undiagonal conversion elements.

In a certain preferable embodiment of the present invention, the wave front detector comprises a deflector for deflecting the backward light in respect of each of the detection regions independently of one another, and an optical detector having divided photodetectors comprising a plurality of light receiving portions for receiving the backward light deflected by the deflector in respect of each of the detection regions, wherein wave fronts in each detection region of the backward light are detected by comparing the outputs of a plurality of divided parts of the divided photodetectors.

In a certain preferable embodiment of the present invention, the areas of detection regions arranged in parts where the intensity of the backward light is lower are set greater than the areas of detection regions arranged in parts where the intensity of the backward light is higher.

In a certain preferable embodiment of the present invention, the backward light has an intensity distribution of decreasing according to the distance from the center of the optical path, the areas of detection regions crossing the center of the optical path are smaller than the areas of other detection regions, the areas of detection regions are set to become greater with an increase in distance from the center of the optical path, the shapes of detection regions at an equal distance from the center of the optical path are substantially the same among one another and have rotational symmetry with respect to the center of the optical path.

In a certain preferable embodiment of the present invention, the medium has a diffraction groove extending in a prescribed direction, the plurality of detection regions are divided according to the conditions of interference by the diffraction groove, and the conditions of interference are set to be substantially the same within the same one of the detection regions.

In a certain preferable embodiment of the present invention, the detection regions are the regions in which the conditions of interference by the diffraction groove are substantially the same, being divided into a plurality.

In a certain preferable embodiment of the present invention, the deflector includes a hologram having diffraction grating patterns differing from one to another of the detection regions, wherein the hologram deflects backward light in at least two deflecting directions differing from one detection region to another, backward light deflected in a first deflecting direction included in the two deflecting directions are received by a first divided detector comprising a dividing line in the first dividing direction, backward light deflected in a second deflecting direction included in the two deflecting directions are received by a second divided detector comprising a dividing line in a second dividing direction at least differing from the first dividing direction, and wave front components in two different directions, which are directions normal to the dividing line, are detected by comparing the outputs of detectors divided by each of the dividing lines with each other.

In a certain preferable embodiment of the present invention, there are provided a medium information detecting unit for detecting on the basis of the backward light information stored by the medium, and a timing unit for generating, on the basis of the output of the medium information detecting unit, a timing to validate the output of the wave front detector, wherein the wave front detector detects, on the basis of the timing outputted from the timing unit, local wave fronts of the backward light.

In a certain preferable embodiment of the present invention, the wave front corrector comprises a reflector for reflecting the forward light and/or backward light, and a plurality of drive units for bidirectionally displacing the reflector by an electrostatic force.

An information device according to the invention is an information device for irradiating a medium with forward light emitted from a light source and detecting information stored by the medium on the basis of backward light modulated by the medium, and comprises a wave front detector for detecting the wave fronts of the backward light in respect of each of a plurality of detection regions included in a section across the optical axis of the backward light; a wave front corrector, provided within the optical path of the forward light and/or backward light, for locally varying the optical path length of the forward light and/or backward light by an action of a plurality of drive units arrayed on a plane crossing the optical path; and a control-unit for supplying a plurality of drive signals to the wave front corrector on the basis of a plurality of outputs of the wave front detector and reconstructing the whole wave fronts of the backward light wherein the wave front corrector comprises a deformable mirror according to any of the foregoing paragraphs.

In a certain preferable embodiment of the present invention, the control unit comprises a steady deviation compensation unit having an integrator for integrating the outputs of the wave front detector and an undiagonal first matrix computing unit for linearly converging the outputs of the integrator, a stabilizing compensation unit having an undiagonal second matrix computing unit for computing and predicting the state of the wave front corrector from the output of the steady deviation compensation unit and the output of the wave front detector, and a diagonal converting unit, to which the output of the steady deviation compensation unit and the output of the stabilizing compensation unit are inputted, for generating drive signals for drive units.

In a certain preferable embodiment of the present invention, the diagonal converting unit performs nonlinear computations.

In a certain preferable embodiment of the present invention, a plurality of light sources differing in each other in the wavelength of emitted beams and an optical system for irradiating the medium with forward light of different wavelengths emitted from the light sources, wherein the wave front corrector is arranged within the optical system, and the wave front detector separates by wavelength backward light modulated by the medium, and detects the wave fronts of the backward light for each wavelength.

In a certain preferable embodiment of the present invention, there is provided an objective lens for focusing forward light emitted from the plurality of light sources and irradiating the medium with them, wherein the numerical aperture of the objective lens towards the medium side can take either one of a first value and a second value smaller than the first value according to the selected light source.

In a certain preferable embodiment of the present invention, at least one light source out of the plurality of light sources forms forward light functioning as finite system light in the divergent direction, and the numerical aperture of the objective lens towards the medium, where the forward light comes incident, is set to the second value.

In a certain preferable embodiment of the present invention, the imaging point of the forward light is formed before the objective lens.

In a certain preferable embodiment of the present invention, there is provided in an acceptable way a first medium so configured as to appropriately detect information it holds when the first value is assigned as the numerical aperture of the objective lens towards the medium, and a second medium so configured as to appropriately detect information it holds when the second value is assigned as the numerical aperture of the objective lens towards the medium, further comprises a medium discriminating unit for distinguishing the first medium and the second medium from each other by judging whether or not the detection has been appropriately accomplished, wherein, after first causing the medium discriminating unit to judge whether or not the medium is the second medium in a state in which the second value is assigned as the numerical aperture of the objective lens towards the medium, the medium discriminating unit is caused to judge whether or not the medium is the first medium in a state in which the first value is assigned as the numerical aperture of the objective lens towards the medium.

Another information device according to the invention irradiates a medium with forward light emitted from a light source and detects information stored by the medium on the basis of backward light modulated by the medium, the information device comprising a wave front detector for dividing the backward light into a plurality of detection regions and detecting wave fronts of the backward light in each of the detection regions, a curvature computing unit for computing a value representing the curvature of the whole wave fronts of the backward light on the basis of a plurality of outputs of the wave front detector, and an objective lens control unit for controlling the objective lens on the basis of the output of the curvature computing unit.

An optical compensation device according to the invention comprises a deflector for deflecting light beams as divided into a plurality of detection regions, an optical detector arranged in a position to receive the light beams deflected by the deflector, and a wave front corrector for correcting the wave fronts of the light beams on the basis of the output of the optical detector, wherein the deflector, optical detector and wave front corrector are formed over the same substrate, and there are further provided a dielectric member in a parallel planar shape for forming an optical path for the light beams to come incident on the wave front-corrected recording medium.

In a certain preferable embodiment of the present invention, the dielectric member is formed of a microprism comprising an inclined face non-parallel to the main face of the substrate, and the inclined face functions as the incident face or the emitting face of the light beams.

In a certain preferable embodiment of the present invention, the incident direction or emitting direction of the light beams substantially coincides with the direction normal to the inclined face of the microprism.

Another optical compensation device according to the invention comprises any of the deformable mirrors described above, and an optical detector for receiving light beams reflected by the deformable mirror and modulated by the medium, wherein the deformable mirror and the optical detector are integrated over the same substrate.

Still another information device according to the invention comprises any of the optical compensation devices described above.

BRIEF DESCRIPTION OF DRAWINGS

FIG. 4 is an exploded perspective view of an actuator and a reflective film in Embodiment 1 of the invention;

BEST MODE FOR CARRYING OUR THE INVENTION

Embodiments of the present invention will be described with reference to drawings.

(Embodiment 1)

Figure 1:
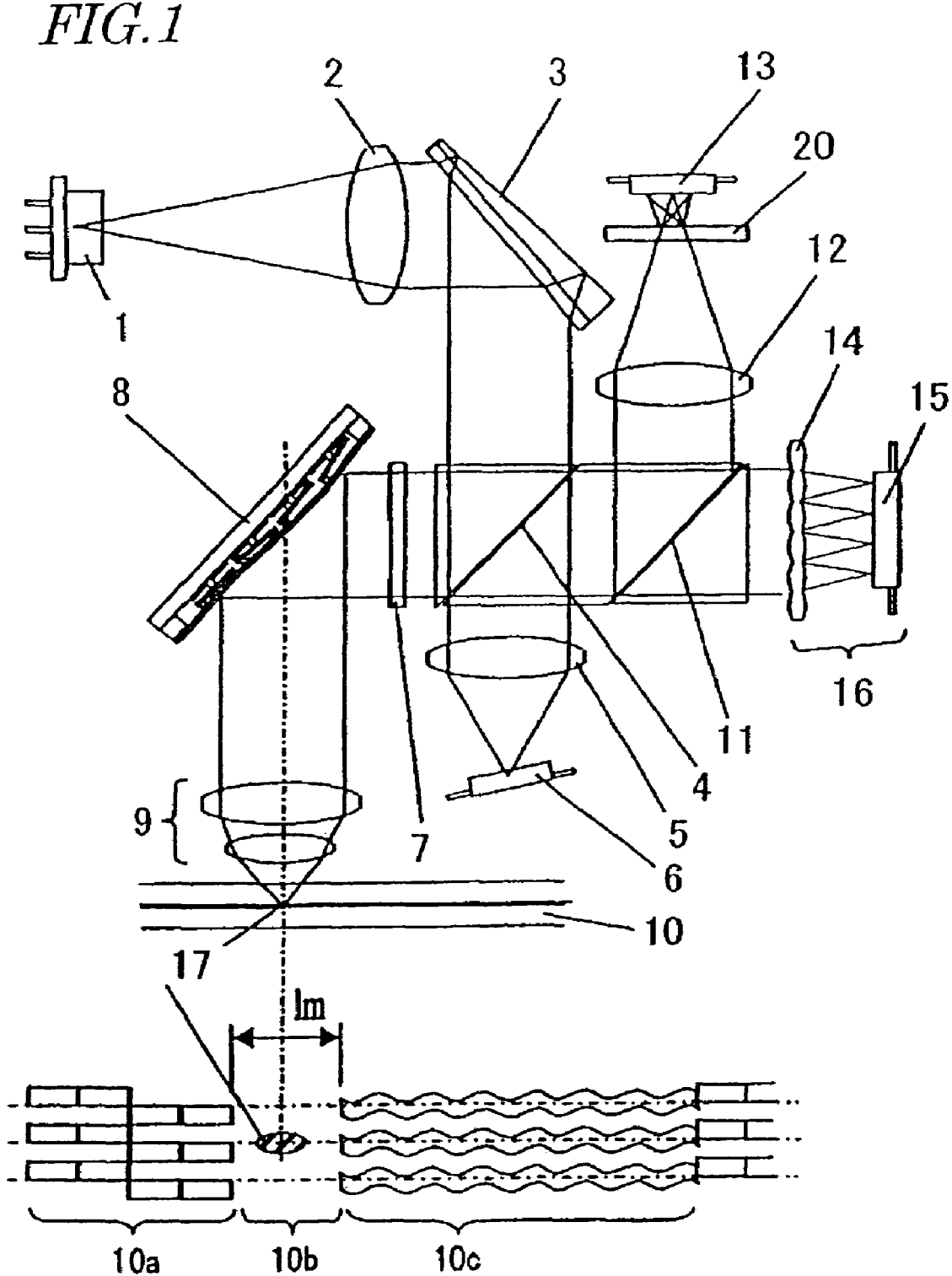
FIG. 1 is a schematic configurational diagram of an information device in Embodiment 1 of the present invention.

First, an information device according to a first embodiment of the present invention will be described with reference to FIG. 1. FIG. 1 is a schematic configurational diagram of this embodiment of the present invention. In the information device of FIG. 1, a GaN-based violaceous semiconductor laser 1 of 405 nm in laser wavelength, which serves as the light beam source, emits laser beams, which are to function as "write/read beams" for a recording medium. The beams emitted by the semiconductor laser 1, after being converted into substantially parallel beams by a collimating lens 2, are brought to incidence on a beam shaping prism 3. The beam shaping prism 3 is so configured by bonding together two glass members differing in refractive index as to reduce chromatic aberrations, and can shape oval beams into circular beams.

Light beams emitted from the beam shaping prism 3 are separated by a polarizing splitter 4 into P polarized beams and S polarized beams, and the P polarized beams are focused on a front optical monitor 6 by a lens 5. The front optical monitor 6 is an optical detector intended for power control to keep constant the luminous energy emitted by the semiconductor laser 1, and its output is fed back to a laser drive current control circuit (not shown) to control the drive current for the semiconductor laser 1.

On the other hand, the S polarized beams separated by the polarizing splitter 4 pass a ¼ wavelength plate 7 to be converted into circularly polarized beams. These circularly polarized beams, after their phase of wave front is corrected by a deformable mirror 8, are focused by an objective lens 9 on the recording layer of an optical disk 10.

The deformable mirror 8 comprises a deformable reflective film and a plurality of actuators for deforming it. The deformable mirror 8 can correct the phase of wave front by controlling the quantities of displacement in a plurality of positions on the reflective film and thereby adjusting the optical path lengths in different parts of light beams corresponding to the plurality of positions. Details of the configuration of the deformable mirror 8 will be described afterwards.

The objective lens 9 is a combined lens in which two lenses are paired, and the numerical aperture NA on the disk side is designed to be 0.75 trough 0.85.

The optical disk 10 used in this embodiment of the present invention is a single-face double-layered recording disk. This optical disk 10 comprises two disk substrates of 0.1 trough 0.6 mm each in thickness and a recording layer of a phase change recording material or a dye-based recording material provided over each disk substrate, and the two substrates are stuck to each other by a transparent adhesive layer of 30 trough 50 μm in thickness.

Each sector of the optical disk 10 has a header portion 10a, a mirror portion 10b and a data portion 10c. On the header portion 10a are formed in land pre-pits VFO signals, which serve as references of PLL synchronism for the read channel, and address signals. The mirror portion 10b, formed following the header portion 10a, is a flat area having neither land pre-pits nor grooves. The length lm of the mirror portion is so formed as to satisfy the relationship of Equation 1. As a result, a wave front phase detector 16 to be described afterwards can perform optical detection in a state in which at least the whole of a beam spot 17 that has been focused is accommodated in the mirror portion 10b. In this embodiment of the present invention the length lm of the mirror portion is set to be 5 trough 10 μm.

$$lm > \lambda/NA \qquad \text{(Equation 1)}$$

In the data portion 10c are formed grooves of ⅙λ in depth which wobble in fixed periodicity, and recording is done both on land pre-pits and in grooves. Periodic signals read out of the wobbles are used for clock synchronization at the time of recording.

Light beams reflected by the disk 10 are again converted into substantially parallel beams by the objective lens 9. Those, after being reflected by the deformable mirror 8, again pass the ¼ wavelength plate 7, further pass the polarizing splitter 4 and are divided by a half mirror 11. One of the beams having gone through division by the half mirror 11 is converted into a spherical wave by a condenser lens 12. This spherical wave is divided by a hologram 20 into a plurality of beams, and focused on an optical detector 13. The optical detector 13 detects control detection signals for performing the focusing control and the tracking control of the objective lens 9 and signals to be detected on the header portion 10a and the data portion 10c. The optical detector 13 has a plurality of divided light receiving areas (not shown), and generates the aforementioned signals by synthesizing output signals from these areas.

The focusing control signals are prepared by a spot size detection (SSD) method, and the tracking control signals, by a push-pull method. The grating pattern of the hologram 20 and the shape of the light receiving areas of the optical detector 13 are so designed that these signals can be appropriately obtained.

The other of the beams having gone through division by the half mirror 11 is guided to the wave front phase detector 16 comprising lens arrays 14 and optical detector arrays 15. Details of the wave front phase detector 16 will be described afterwards.

The output of the wave front phase detector 16 is sampled only at a prescribed timing at which the beam spot 17 is within the mirror portion 10b, and used for controlling the deformable mirror 8. This timing can be obtained by counting clock signals prepared from the VFO signals of the header portion 10a.

To add, the objective lens 9 is so designed that, in a state in which the actuators of the deformable mirror 8 are not driven, the aberrations be less when the light beams are focused on the first layer which is closer to their face of incidence, out of the two layers of the optical disk 10, than when they are focused on the second layer.

Next will be described in detail, while referring to FIGS. 2(a) through 2(d), the wave front phase detector 16 used in this embodiment of the present invention. FIGS. 2(a) through 2(d) illustrate a schematic configuration of the wave front phase detector 16.

Figure 2A:
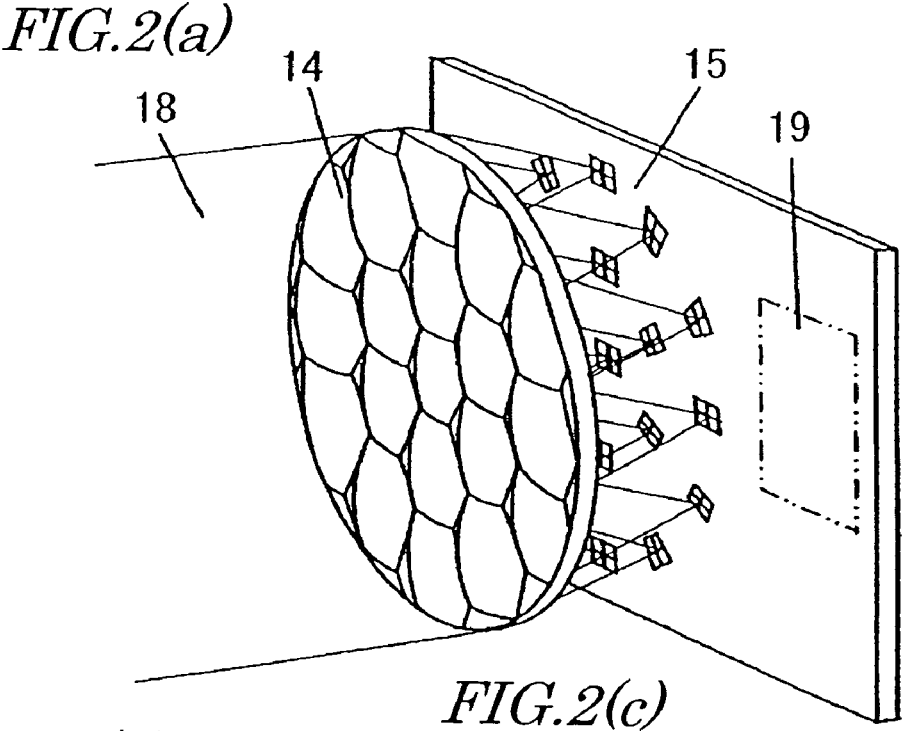
FIGS. 2(a) through 2(d) are schematic configurational diagrams of a wave front phase detector in Embodiment 1 of the invention.

The wave front phase detector 16, as shown in FIG. 2(a), comprises the lens array 14 for deflecting the backward light independently for each of a plurality of detection regions and the optical detector array 15 having a plurality of light receiving portions for receiving the backward light deflected by the lens array 14 for each of the detection regions.

Each lens array 14 is a deflector integrating 19 lenses having different focuses for one another, and can focus light beams 18 on localized areas (detection regions) separately from one another. Each optical detector array 15 has pin type quadrisected photodiodes arranged in positions corresponding to the focuses of the different lenses of each lens array 14.

In this embodiment of the present invention, the mutual positional relationship between each lens array 14 and each optical detector array 15 is so determined that the focus of each lens and the center of division of each quadrisected photodiode coincide with each other when the wave fronts of the light beams 18 constitute a plane normal to the optical axis, or in other words when the light beams 18 are complete plane waves.

Each the optical detector array 15 has, integrated with it, a preamplifier 19, and the output of the optical detector array 15 is amplified and computed by the preamplifier 19.

Figure 2B:
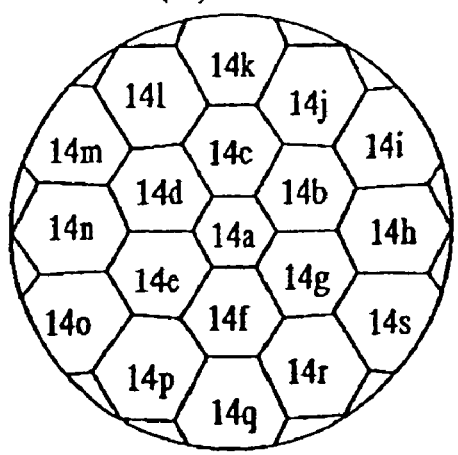
Figure 2C:
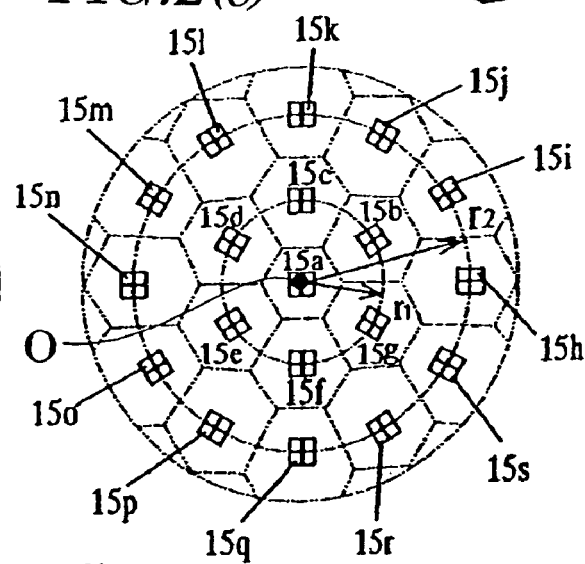

FIG. 2(b) shows a planar layout of the lens array 14. Lenses 14a trough 14s contained in the lens array 14 are substantially hexagonally shaped, but the areas of the lenses are not equal. The lens 14a positioned at the center of the lens array 14 is the smallest in area, and the farther the lens is in radial position from the lens array 14, the greater its area is. The lenses 14b trough 14g are equal to one another in shape and area, and the area of each lens is set greater than that of 14a. Further, the lenses 14h trough 14s, positioned farther out from the center of the lens array 14 than the lenses 14b trough 14g are laid out to be greater each in area than each of the lenses 14b trough 14g. The distribution of the area ratios of the lens with respect to the distance from the center of the lens array 14 set to be proportional to the reciprocal of the distribution of the luminous intensities of the light beams 18, with the result that the luminous energies focuses by the lenses 14a trough 14s are equal to one another. In further detail, as the central intensity is higher and the peripheral intensity is lower in the distribution of the luminous intensities of the light beams 18 as in the Gaussian distribution, the areas of the lenses 14a trough 14s are set to be smaller at the center and greater on the peripheries of the lens array 14 to match this distribution. As a result, the luminous energy focused by each lens expressed by the average luminous intensity×the area of the lens becomes substantially equal for every lens of the lens array 14. Therefore, as shown in FIG. 2(c), the quantity of light received by each of quadrisected photodetectors 15a trough 15s becomes substantially equal, the S/N ratios of the output signals of the quadrisected photodetectors 15a trough 15s are equalized. As a result, every one of the quadrisected photodetectors 15a trough 15s can be enhanced in the accuracy of detection.

In FIG. 2(c), the divided shapes of the corresponding lenses are also represented by two-dot chain lines to indicate the positional relationships between the quadrisected photodetectors 15a trough 15s and the lenses 14a trough 14s. As shown in FIG. 2(c), the quadrisected photodetectors 15a trough 15s are arranged in the respective focal positions of the lenses 14a trough 14s. More specifically, the quadrisected photodetector 15a is arranged at the origin O of the optical detector array 15, and the quadrisected photodetectors 15b trough 15g are arranged at 60° intervals on a concentric circle of a radius r1 around the origin O. The quadrisected photodetectors 15h trough 15s are arranged at 30° intervals on a concentric circle of a radius r2 around the origin O.

In the quadrisected photodetectors 15b trough 15s, the two dividing lines of quadrisect ion by each detector are formed along a radial direction towards the origin O and a tangential direction normal thereto. In the case of the quadrisected photodetector 15a, since it is impossible to define either the radial direction or the tangential direction, detector dividing lines are provided in the horizontal direction and the vertical direction in the diagram as an exceptional expedient.

As each of the quadrisected photodetectors 15a trough 15s individually outputs four-channel signals according to the luminous energy in each pertinent divided portion, a total of 19×4-channel signals are generated. Each four-channel signal is amplified and computed by a preamplifier, and converted into output signals of three channels in total consisting of a sum signal of one channel and difference signals of two channels indicating a displacement of light beams.

Figure 2D:
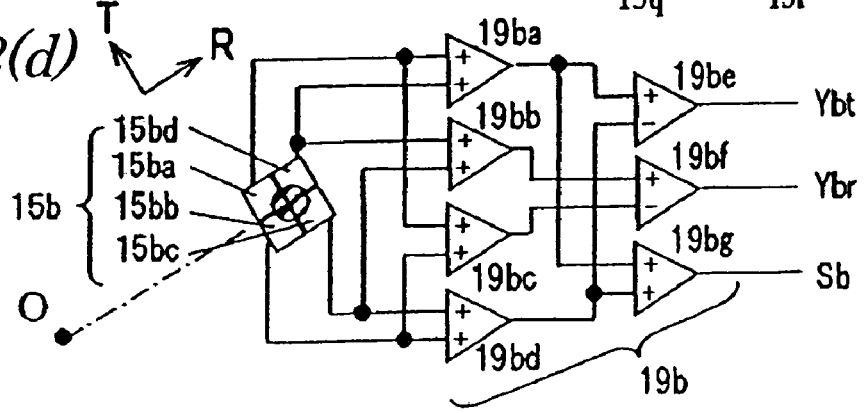

With the quadrisected photodetector 15b taken up as an example, the configuration for generating output signals will be described with reference to FIG. 2(d). FIG. 2(d) illustrates the configuration of the quadrisected photodetector 15b and a preamplifier 19b. In FIG. 2(d), reference sign "R" represents the radial direction towards the origin O, and reference sign "T" represents a tangential direction normal to the direction R. The quadrisected photodetector 15b is divided into areas 15ba trough 15bd by a dividing line extending in the R direction and a dividing line extending in the T direction. The preamplifier 19b consists of a group of seven amplifiers in total including four preamplifiers 19ba trough 19bd of a prior stage, two differential amplifiers 19be and 19bf, and one amplifier 19bg.

The output of the area 15ba is inputted to the preamplifiers 19ba and 19bc, the output of the area 15bb to the preamplifiers 19bc and 19bd, the output of the area 15bc to the preamplifiers 19bb and 19bd, and the output of the area 15bd to the preamplifiers 19ba and 19bb to be amplified and added. The output of the preamplifier 19ba is inputted to the + (plus) side of the differential amplifier 19be and the amplifier 19bg, the output of the preamplifier 19bb to the + side of the differential amplifiers 19bf, the output of the preamplifier 19bc to the − (minus) side of the differential amplifiers 19bf, and the output of he preamplifier 19bd to the − side of the differential amplifier 19be and the amplifier 19bg. The inputs cause the differential amplifier 19be to supply an output Ybt, the differential amplifier 19bf, an output Ybr, and the amplifier 19bg, an output Sb.

The output Ybt here is a signal that indicates the difference in luminous energy between the two sides along the dividing line extending in the radial direction R and pertains to the displacement of focal points in the tangential direction T. This signal will be hereinafter denoted simply by (15ba+15bd)−(15bb+15bc). The output Ybr is a signal that indicates the difference in luminous energy between the two sides along the dividing line extending in a tangential direction B pertains to the displacement of focal points in the radial direction R. This signal, too, will be hereinafter denoted simply by (15bc+15bd)−(15ba+15bb). The output Sb represents the total sum of luminous energy in the four areas, and this signal will also be hereinafter denoted simply by (15ba+15bb+15bc+15bd).

Though not shown, preamplifiers 19a trough 19s are provided for all the quadrisected photodetectors 15a trough 15s, and the respective input/output relationships are set similarly to the above-described relationship between 15b and 19b. This enables the preamplifier 19 to output signals Yat trough Yst, Yar trough Ysr and Sa trough Ss. On the basis of these signals, control signals for the deformable mirror 8 in FIG. 1 are prepared. Incidentally, while it is impossible to define either the radial direction R or the tangential direction T regarding the quadrisected photodetector 15a at the origin O, the horizontal direction and the vertical direction in the diagram are respectively determined to be the R direction and the T direction here for the sake of convenience.

Next will be described the configuration of the deformable mirror 8 while referring to FIG. 3 through FIG. 5. The deformable mirror 8 in this embodiment can be fabricated by using, for instance, a semiconductor manufacturing process technique. In this embodiment of the present invention, the deformable mirror 8 is fabricated by integrating a plurality of actuators and a drive circuit for driving each actuator over the same silicon substrate.

Figure 3:
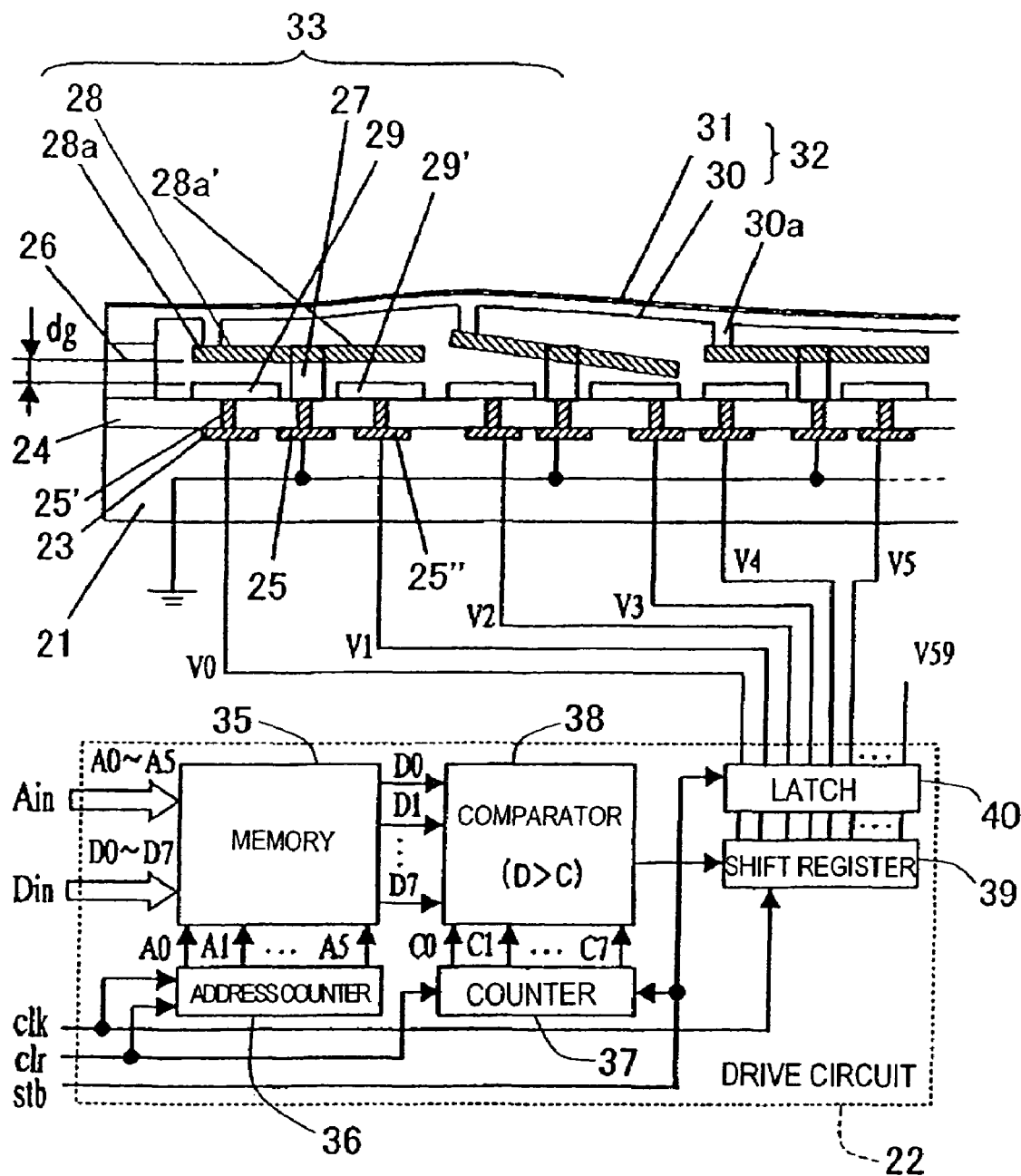
FIG. 3 is a schematic configurational diagram of a deformable mirror in Embodiment 1 of the invention.

First, FIG. 3 will be referred to. FIG. 3 is a schematic configurational diagram of the deformable mirror 8 in this embodiment.

The deformable mirror 8 in this embodiment comprises a substrate 21, a reflective film (reflector) 32 which is supported by the substrate 21 and the shape of whose reflective surface is variable, and a plurality of drive units (actuators 33) for driving a plurality of regions of the reflective film 32 independently and thereby controlling the distances between the plurality of regions and the substrate 21. When the plurality of regions of the reflective film 32 are driven by the actuators 33, the surface parts of the reflective film 32 corresponding to the driven regions vary in shape, and accordingly the state of reflection of light by those surface parts varies. Therefore, the continuous surface of the reflective film 32 can be regarded as comprising a plurality of light reflecting areas driven by the plurality of actuators 32. Thus in the deformable mirror in this embodiment, the reflective film 32 functioning as a reflector has a plurality of light reflecting areas which can be individually driven. Incidentally, the reflector of the deformable mirror according to the invention can as well be configured of a plurality of micromirrors separated from one another. In this case, the mirror face of each micromirror functions as a light reflecting area. An embodiment of the present invention such a type of deformable mirror will be described in detail afterwards.

Each of the actuators 33 includes a first fixed electrode 29 and a second fixed electrode 29' provided over the substrate 21, a rotating member (yoke 28) rotating around an axis of tilt, and an action member (coupling stub 30a) which varies the distance between a specific region of the reflective film 32 and the substrate 21 according to the motion of the yoke 28.

The yoke 28 has a supporting portion (supporting post 27) arranged on the axis of tilt and a planar portion coupled to the supporting post 27. The planar portion has a first electroconductive portion (first portion 28a) and a second electroconductive portion (second portion 28b), which are symmetric with respect to the axis of tilt. The first portion 28a and the second portion 28b of the yoke 28 are respectively opposite the first fixed electrode 29 and the second fixed electrode 29' with a gap in-between.

Each of the actuators 33 is coupled to the corresponding region of the reflective film 32, and can bidirectionally drive the position of a prescribed region of the reflective film 32. In other words, the prescribed region of the reflective film 32 is coupled to either the first portion 28a or the second portion 28b of the corresponding yoke 28 by a coupling stub 30a extending from the reflective film. The prescribed region of the reflective film 32 can be displaced by a stroke action in a direction substantially normal to the substrate. As the length of this stroke is no more than about twice the wavelength of the light, the phase of the reflected light can be modulated with a high degree of accuracy.

In operating the device, when a higher electric potential is provided to either one of the first fixed electrode 29 and the second fixed electrode 29' in the selected drive unit than to the other, the fixed electrode at the relatively high electric potential attracts with an electrostatic force the opposite one of the first portion 28a and the second portion 28b of the yoke 28. As a result, one of the spacing between the first portion 28a of the yoke 28 and the first fixed electrode 29 and the spacing between the second portion 28b of the yoke 28 and the second fixed electrode 29' becomes narrower than the other. In this way, the curvature of the pertinent region of the reflective film 32 coupled to the selected drive unit is altered. With an actuator of such a configuration, a local displacement of the reflective film 32 is promptly generated by the driving force of the actuator whether in a direction of moving away from the substrate or in a direction of moving towards the substrate.

The circumference of the reflective film 32 is formed of a deformable film fixed to the substrate 21, and the reflective film 32 is given a tensile force in advance. For this reason, when the first fixed electrode 29 and the second fixed electrode 29' become equal in electric potential, the reflective film 32 promptly returns to its original flat shape.

In this embodiment of the present invention, the substrate 21 is formed from a silicon wafer, and a CMOS drive circuit 22 is integrated over the substrate 21. FIG. 3 shows only the block configuration of the drive circuit 22, but does not shown any specific sectional configuration of the n-channel MOSFET and the p-channel MOSFET constituting the CMOS. However, an aluminum (Al) interconnection layer 23, which is the top layer of the drive circuit 22, is typically shown. Over the interconnection layer 23 is provided an insulating layer 24 that is made of an $SiO_2$-based or SiN-based material. The upper face of the insulating layer 24 is planarized by chemical mechanical polishing (CMP). The insulating layer 24 comprises openings (via holes) for bringing into electrical contact the electrodes above and the interconnection layer 23 underneath with each other.

While altogether 30 actuators are formed over the insulating layer 24 in this embodiment of the present invention, FIG. 3 illustrates only three actuators positioned near the periphery 26 of the substrate for the sake of simplicity.

Next will be described the structure of the actuators 33 in further detail with reference to FIG. 4. FIG. 4 is an exploded perspective view of the actuators 33 and the reflective film 32 in this embodiment of the present invention.

The actuators 33 in this embodiment of the present invention have a base 34 formed over the insulating layer of the substrate not shown in FIG. 4. The base 34 is formed of the same material as the first and second fixed electrodes 29 and 29', and preferably should be fabricated together with the first and second fixed electrodes 29 and 29' by patterning a film of metal, such as Al.

The base 34 comprises supporting post fitting portions 34a represented by one-dot chain lines and yoke contacting portions 34b and 34b' which come into contact with the yoke 28 when it has rotated to the maximum. This arrangement prevents the yoke 28 from coming into contact with the first and second fixed electrodes 29 and 29'.

The first fixed electrode 29 and the second fixed electrode 29' are provided in substantially symmetric positions around the tilt axis A of the yoke 28 formed by a supporting post 25. The yoke 28 has a substantially planar shape, and is connected to the supporting post 25 via a hinge portion 28b. The yoke 38 is rotatable a round the tilt axis A by a torsional deformation of the hinge portion 28b.

The yoke 28 has the first portion 28a and a second portion 28a' divided into right and left opposing positions with the tilt axis A in-between, the first portion 28a in a position opposite the first fixed electrode 29 with a gap between them and the second portion 28a' in a position opposite the second fixed electrode 29' with a gap between them. The yoke 28 is also coupled to the coupling stub 30a at a yoke free end 28c represented by one-dot chain lines.

The yoke free end 28c is within the area of the first portion 28a of the yoke 28 and in a position at a prescribed distance from the tilt axis A. As will be described afterwards, this distance can be differentiated from one actuator to another. The yoke 28 and the supporting post 25 can be formed by etching the same Al layer. Since the yoke 28 and the supporting post 25, as well as the base 34, are electroconductive and, moreover, electrically connected to one another, the electric potential of the yoke 28 is the same as that of the base 34.

The reflective film 32 in this embodiment of the present invention comprises a base film 30 made of an $SiO_2$-based or an SiN-based insulator and a reflective layer 31 of an Al or Au material formed over its upper face. The reflective layer 31 can be fabricated by vapor-depositing a thin layer of metal over the base film 30.

The coupling stubs 30a, formed in the same film formation process as the base film 30, have a function to couple the base film 30 to the yoke 28. Elsewhere than in the positions where the coupling stubs 30a are provided, a gap is provided between the yoke 28 and the base film 30. The presence of this gap can prevent the base film 30 and the yoke 28 from coming into direct contact with each other elsewhere than the positions of the coupling stub 30a even though the yoke 28 rotates.

The gap between the yoke 28 and the base film 30 and that between the yoke 28 and the first and second fixed electrodes 29 and 29' are produced in the following manner, for instance. Thus at the mirror fabrication stage, after forming sacrificial layers made of an organic material in the parts corresponding to the gaps, the sacrificial layers are removed at the final step by plasma etching or otherwise. Here, the reflective surface of the base film 30 is planarized by CMP before these sacrificial layers are removed. In the processing of CMP, stresses are generated in the base film 30 in a direction normal to the film surface, but the presence of the sacrificial layers serves to suppress the deformation of the base film 30, making it possible to enhance the machining accuracy of the reflective surface after the process step of CMP. By removing the sacrificial layers after the planarization process step, the reflective surface can be machined to a high degree of flatness.

When a difference in electric potential is provided between the first fixed electrode 29 and the yoke 28, as described above, the first portion 28a is attracted by an electrostatic force in the direction of approaching the first fixed electrode 29 with the result that the yoke 28 rotates in the counterclockwise (CCW) direction around the tilt axis A. Or when a difference in electric potential is provided between the second fixed electrode 29' and the yoke 28, the second portion 28a' is attracted by an electrostatic force in the direction of approaching the second fixed electrode 29', and the yoke 28 rotates in the clockwise (CW) direction around the tilt axis A.

The tilts of the yoke 28 in the CCW direction and in the CW direction are transmitted via the coupling stub 30a as driving forces to drive the reflective film 32 upwards and downwards; the reflective film 32 is provided to be deformable bidirectionally, in the direction of approaching the substrate and in the direction of moving away from the substrate.

As described above, in this embodiment of the present invention, the yoke 28 comprises the first portion 28a and the second portion 28a' separated into opposing position with the tilt axis A in-between and, moreover, the first fixed electrode 29 is opposed to the first portion 28a while the second fixed electrode 29' is opposed to the second portion 28a'. Furthermore, the first portion 28a is coupled to the reflective film 32 via the coupling stub 30a. The use of this configuration makes it possible to bring prescribed regions of the reflective film 32 close to the substrate 21 or away from the substrate 21, and to actively drive bidirectionally a plurality of localized regions of the reflective surface 3. In this manner, this embodiment of the present invention can provide a deformable mirror having a high degree of symmetry of drives and excelling in control accuracy and responsiveness.

In a state in which no difference in electric potential from the yoke 28 is provided to the first fixed electrode 29 and the second fixed electrode 29', i.e. in a state in which no drive signal is provided (neutral state), the reflective film 32 holds a reflective fact having a high degree of planar accuracy obtained by the machining for CMP. In the displaceable mirror in this embodiment of the present invention, the position of the reflective surface in the neutral state described above is deemed to be the neutral point, and the position of the reflective surface is driven bidirectionally with respect to this neutral point. Although it is necessary to give an initial deformation to the reflective film in the conventional deformable mirror in order to arrange the reflective surface at the neutral point, such initial information becomes unnecessary in this embodiment of the present invention. Therefore, this embodiment of the present invention is free from the problem of deterioration of the repeatability of the neutral point due to fluctuations in drive sensitivity or the like at the time of initial deformation, and can provide a deformable mirror excelling in correction accuracy.

Incidentally, as the yoke contacting portions 34b and 34b' prevent the yoke 28 from coming into contact with the first and second fixed electrodes 29 and 29', short-circuiting between them can be prevented without fail.

FIG. 3 is referred to again.

The yoke 28 is connected to the interconnection layer 23 by way of the supporting post 27 and via holes 25, and the electric potential of the yoke 28 when in operation is always kept at the ground potential (hereinafter this electric potential will be referred to as "L") all the time. As the first and second fixed electrodes 29 and 29' are connected to the interconnection layer 23 by via holes 25' and 25", respectively, the electric potential of the first fixed electrode 29 is controlled to V0 and that of the second fixed electrode 29', to V1.

The electric potentials of the first and second fixed electrodes 29 and 29' can be switched between the ground potential L and a relatively high electric potential (electric potential H) by the drive circuit 22. The "relatively high electric potential" can be set to, for instance, 5 V. Only one of the electric potentials V0 and V1 is controlled to the electric potential H. The yoke 28 is attracted by an electrostatic force towards the fixed electrode of the electric potential H with the result that a rotational force generates in the clockwise or the counterclockwise direction. The magnitude of the rotational force can be adjusted by controlling the length of time during which a state of H in electric potential is maintained at a plurality of levels (256 steps) expressed in eight bits. When no rotational force is let generate, the electric potentials V0 and V1 are set to the electric potential L.

To add, it is preferable to set the gap between the base film 30 and the yoke 28 and the gap dg between the yoke 28 and the first and second fixed electrodes 29 and 29' to about 2 trough 15 $\mu$m each. In this embodiment of the present invention, the designed width of the gap dg is set to 5 $\mu$m for both. Further, it is preferable to set the thickness the base film 30 to 0.5 trough 3 $\mu$m. The designed thickness in this embodiment of the present invention is 1.2 $\mu$m. The thickness of the reflective film 31 is set to, for instance, 0.1 $\mu$m or less.

The drive circuit 22 receives the address Ain of each fixed electrode of each actuator and control data Din expressing driving force, and performs time control over H/L of the output voltages V0 trough V59 of each fixed electrode. The drive circuit 22 is configured of a memory 35, an address counter 36, a counter 37, a comparator 38, a shift register 39 and a latch 40.

The memory 35 is a memory device of an eight-bit width for storing control data for 60 fixed electrodes (=the number of actuators 30×2). Each address consists of six bits (=64), of which only 60 are validly used. The address counter 36 gives six-bit addresses to the memory 35, and causes 60 sets of control data to be sent out serially. The address counter 36 is reset with an initialization (clr) signal, and counted up with a clock (clk) signal. The counter 37 is an eight-bit incremental counter which is reset with an initialization (clr) signal and counted up with a strobe (stb) signal after having read 60 sets of control data.

The comparator 38 compares the output of the counter 37 with the eight-bit data of the memory 35, and sends out to the shift register 39 one-bit serial data. If the data of the memory 35 are found greater than the output of the counter 37, it will output 1(H) or otherwise 0(L). The shift register 39 is a 64-bit shift register operating in response to a clk signal, and validly uses 60 of the 64 bits. The latch 40 is a 64-bit latch which latches the value of the shift register 39 in response to a stb signal and, like the shift register 39, validly uses 60 bits.

The operation of this drive circuit 22 will be described. Eight-bit control data written in the memory 35 are read out, the 64 sets (of which 60 are valid) consecutively, according to six-bit addresses given by the address counter 36. When the address counter 36 has completed a round and all the control data in the memory 35 have been read, data accumulated in the shift register 39 are stored into the latch 40 in response to an stb signal, the output of the counter 37 is counted up at the same time, and the contents of the memory 35 are read out again from the beginning. This cycle being denoted by T, constitutes the minimum unit of the duration of electricity flow to the actuator. The control over the duration of electricity flow is accomplished by repeating this cycle T 256 times, which is determined by the number of steps of the counter 37.

Then, while the same control data are read out of the memory 35 every cycle, each output of the comparator 38 becomes 0 as the corresponding output of the memory 35 becomes no greater than the count of the counter 37 because the count of the counter 37 increases every cycle. Therefore, the output of the latch 40 has come to permit control of the duration of electricity flow to the fixed electrodes of all the actuators at the minimum resolution T in proportion to the inputted control data Din. The ratio of the electricity flow duration Din·T to the control cycle 256·T will be referred to as the electricity flow duration duty U, and U takes a value in the range of 0 trough 255/256.

The shape of the reflective film and the arrangement of actuator drive points of the deformable mirror 8 will be described below with reference to FIG. 5. FIG. 5 are plans of the deformable mirror 8 in this embodiment of the present invention.

First, reference will be made to FIG. 5(a). Thirty points represented by black dots 8a trough 8ad are the drive points of the actuators. The drive points of the actuators correspond to the positions of the coupling stubs (30a in FIG. 3), the points where the reflective film is actually driven up or down. The x marks represent the positions corresponding to the 19 quadrisected photodetectors described with reference to the optical detector array, and are shown here as supplementary information. While only three points 15a, 15b and 15s, which are to be taken up again in the subsequent description of the operation, are assigned reference numbers here to avoid complicating the illustration, they are arranged in positions reverse to those shown in FIG. 2(c) in a mirroring way. The reason for the mirroring is quite simple; merely that corresponding paired points pertaining to the same light beam results in the relationship between the right and left hands because the deformable mirror 8 and the optical detector array are arranged opposite each other. The origin O and the radiuses $r_1$ and $r_2$ also match what were described with reference to FIG. 2(c).

Reference is again made to FIG. 5(a). The drive points 8a trough 8f are at the vertexes of a hexagon circumscribing a circle of the radius r1 around the origin O, and the middle point between two adjoining vertexes substantially coincides with the central point of a quadrisected detector marked with x. The drive points 8g trough 8r are at the vertexes of a dodecagon circumscribing a circle of the radius $r_2$ around the origin O, and the middle point between two adjoining vertexes substantially coincides with the central point of a quadrisected detector marked with x. Further the 12 drive points 8s trough 8ad are configured on a circle of the radius $r_3$ around the origin O. By displacement control on these 30 drive points, the surface shape of the reflective film 32 is set. To add, the reflective film 32 is integrated with the substrate on the circular periphery 26 and in an infinitesimal area near the origin O, and its displacement is thereby regulated.

The radius r3 here is set to a greater value than the radius of the light beam coming incident on the deformable mirror. The reason is to minimize the impact of the condition of displacement restriction by the fixation of the reflective film 32 on the periphery 26 upon the correction accuracy of the wave front phase. Further, there are bored holes 32a in the reflective film 32 near the periphery 26. They can serve to reduce the deterioration of correction accuracy due to the condition of restricting the displacement of the periphery 26.

The reflective film 32 comprises many small holes 32b of 1 trough 2 μm in radius in order not to cause a significant drop in the luminous energy of the reflected light beams. The presence of the small holes 32b provides the following two advnatagous effects.

A first advantageous effect is improvement in control responsivity. As the small holes 32b constitute ventilation ports for air, the effect of the air around the reflective film 32 to obstruct the shifting of the reflective film 32 can be alleviated. A second advantagous effect is improvement in the productivity of the etching process as the small holes 32b disperse the etchant inflow paths. In further detail, in the process of producing gaps around the yoke by removing the sacrificial layer, the small holes 32b work together with the holes 32a to function as inlet holes for the etchant, effects to prevent incomplete removal of the sacrificial layer and to reduce the length of time required for the etching process can be achieved.

Figure 5A:
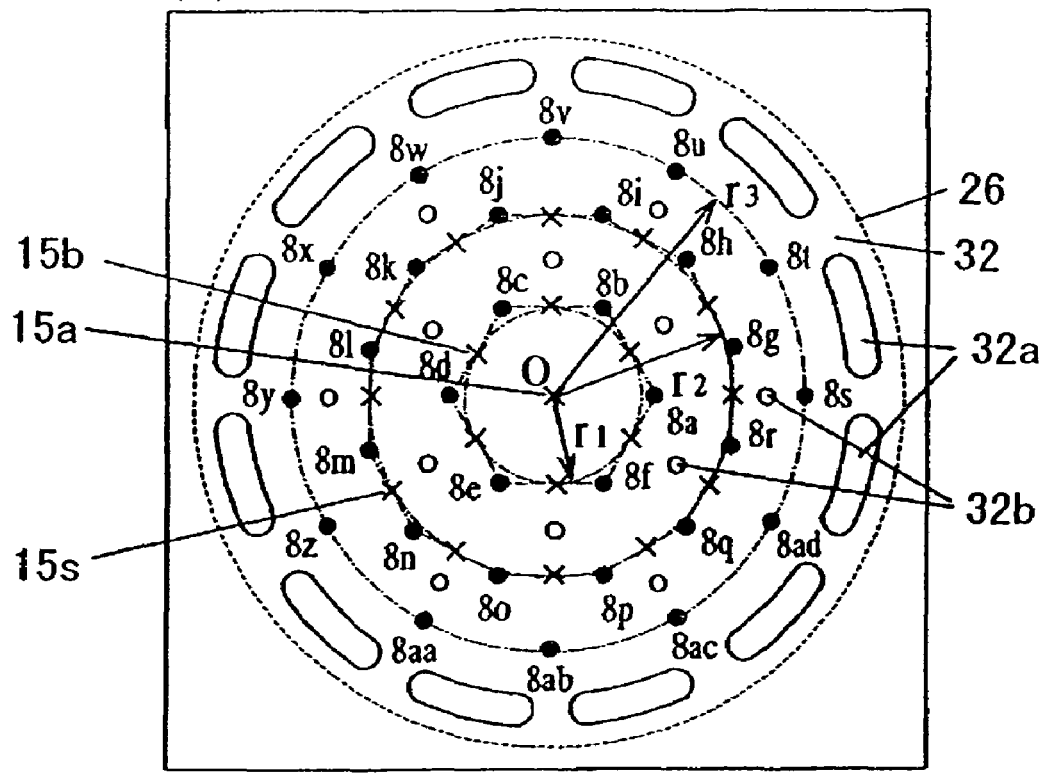
FIGS. 5(a) and 5(b) are plans of the deformable mirror in Embodiment 1 of the invention.
Figure 5B:
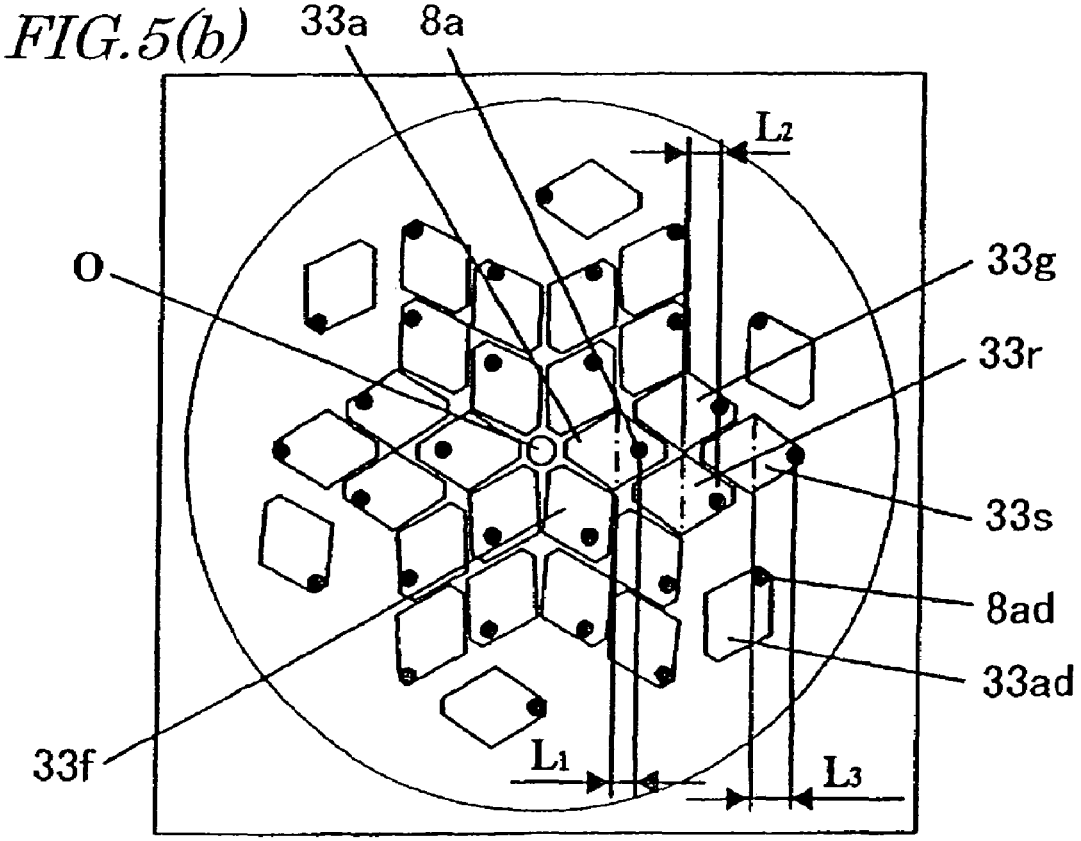

FIG. 5(b) shows a layout of planar arrangement of the actuators; this illustrated state corresponds to the state shown in FIG. 5(a) minus the reflective film 32. Suffixes a trough ad in FIG. 5(b) to identify each of the 30 actuators respectively correspond to the identifying suffixes of the drive points 8a trough 8ad in FIG. 5(a). Not all the signs are stated with a view to preventing the drawing from becoming too complex.

As is seen from FIG. 5(b), the actuators 33a trough 33ad are substantially rhombic, and have exactly the same dimensions and shape to one another except in the positions of the drive points 8a trough 8ad of the respective actuators. Thus, the shapes of the fixed electrode, the supporting post and the yoke are equal among the actuators. The vertical angles of the rhombus are substantially 60 degrees at acute vertexes and substantially 120 degrees at obtuse vertexes. Such a shape enables the actuators to be efficiently arranged when six of them are disposed around the origin O.

Next will be explained the position of the drive point in each actuator. The distance from the rotational center of the actuator to the drive point represented by a one-dot chain line is supposed to be set to $L_1$ in the actuators 33a trough 33f on the inner circumference, $L_2$ in the actuators 33g trough 33r on the middle circumference and L3 in the actuators 33s trough 33ad on the outer circumference. In this embodiment of the present invention, a relationship of $L_1<L_2<L_3$ holds. The range of displacement setting for the actuators is made variable by individually setting the distance from the axis of tilt to the drive point for each actuator instead of fixing it. It is relatively easy to provide each individual actuator a different planar shape because its planar shape is determined by the pattern of the mask in the manufacturing process for the actuators, which are fabricated as micromachines in this embodiment of the present invention.

On the other hand, the dimension in the direction of the film thickness, because of the nature of the process, is difficult to differentiate from one actuator to another. Therefore, where the range of displacement setting in the direction of the film thickness of the actuator is to be determined by the film thickness of the sacrificial layer, it is inevitable to set every actuator in the same range. However, according to the configuration in this embodiment of the present invention, the rotational motion of the actuator is converted into a motion to displace the distance from the substrate. For this reason, it is possible to set the displacement range of the distance from the substrate for each actuator by differentiating the distance from the rotational center of the actuator to the drive point.

In this embodiment of the present invention, the reflective film 32 is fixed to the substrate in the vicinity of the origin O. And the deformable mirror can control the shape of the reflective surface with high accuracy by smoothly deforming the reflective film 32 with reference to this origin O. For this reason, it is preferable for the displacement of the actuators towards the inner circumference closer to the origin O to be smaller and that of the actuators towards the outer circumference farther from the origin O to be greater, and this condition is met in this embodiment of the present invention by setting the aforementioned relationship of $L_1 < L_2 < L_3$.

In this embodiment of the present invention, even if any erroneous operation arises in the control system for the actuators 33a trough 33f towards the inner circumference, because of the smaller displacement of the actuators, it is possible to reduce the impact of the erroneous operation on the whole mirror. The narrower the displacement range of the actuators is set, the easier it is to improve the resolution and the driving force, and accordingly it is made possible to perform highly responsive and accurate control.

Figure 6A:
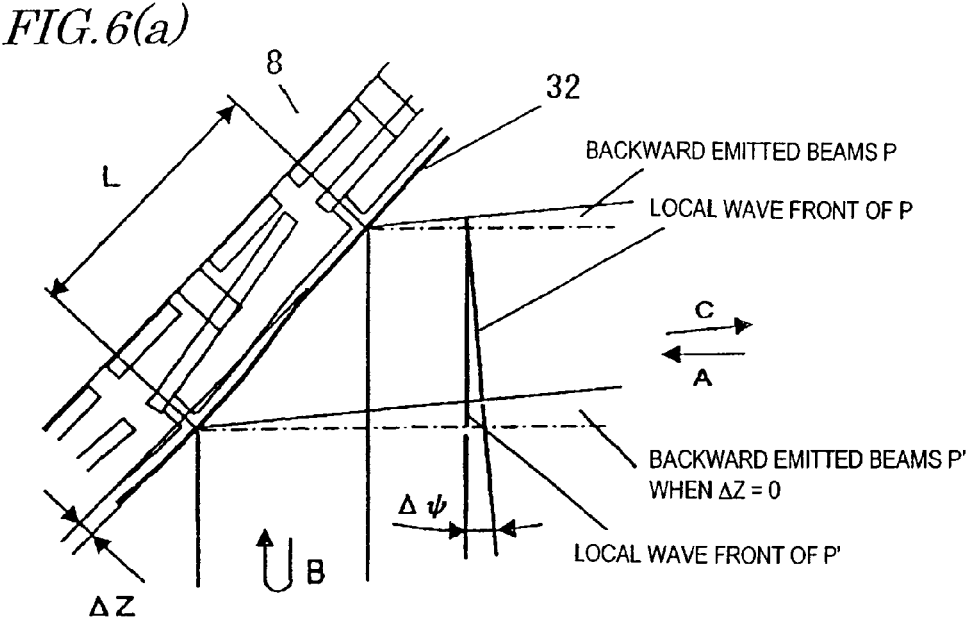
FIGS. 6(a) and 6(b) are diagrams for describing the action to deflect light beam wave fronts in Embodiment 1 of the invention.

The relationship between the light beam deflecting action of the deformable mirror 8 and the output of the quadrisected photodetectors of the optical detector array will be described below while referring to FIG. 5 and FIG. 6. FIG. 6 are diagrams for describing the action to deflect light beam wave fronts in Embodiment 1 of the present invention.

First will be explained the local wave front variation $\Delta\phi$ of the backward beam P when the reflective film 32 of the deformable mirror 8 is displaced with reference to FIG. 6(*a*). To facilitate understanding, the explanation will concern a one-dimensional model.

Light beams come incident in the direction of arrow A as forward beams, are reflected by the reflective film 32 to travel towards an optical disk (not shown), reflected as indicated by arrow B to come incident as backward beams, and again reflected by the reflective film 32 to be emitted in the direction of arrow C. These backward emitted beams will be represented by P. The wave fronts of the backward emitted beams P, i.e. the equi-phase surface of the electric field constitutes, in an overall outlook, a curved surface of a higher order consisting of a plane wave augmented with aberration components, it is possible to perform approximation in which that curved surface is divided into a plurality of localized units and higher-order components are ignored in each individual localized unit. Here it is approximated to a Linear plane wave, and variations in the local wave fronts of the backward emitted beams P are treated as variations $\alpha\phi$ in the inclination of the plane wave. Regarding the deformation of the reflective film 32, too, if only its linear components are considered, the local inclination of the reflective film 32 can be represented by $\theta = \Delta Z/L$ where, for instance, L is the distance between adjoining drive points and $\Delta Z$, the difference in the displacements of their respective drive points. As the variation in the reflection angle of light beams is double the variation in the inclination of the reflective film 32, the light beams are reflected by the reflective film 32 twice, forward and backward, and $\Delta\phi$ is an infinitesimal quantity the relationship of Equation 2 holds.

$$\Delta\phi = 4\theta = 4\Delta Z/L \tag{Equation 2}$$

Since the actual surface of the reflective film 32 is two-dimensional, it is necessary to control the local inclinations $\theta$ of the two orthogonally crossing directions. The radial direction and tangential direction of the circle are selected as the two orthogonally crossing directions to match the divided shape of the quadrisected photodetectors of the optical detector array. This relationship between the two-dimensional inclination of the reflective film 32 and the displacements of the drive points will be explained with reference to FIG. 5(*a*). First to define the signs to be used, the displacements of the reflective film 32 at the drive points 8a trough 8ad will be represented by Za trough Zad, respectively. In a state in which none of the actuators is driven, the displacements Za trough Zad are zero, the reflective film 32 is substantially on the same plane at the drive points 8a trough 8ad, the origin O and all the points on the periphery 26. The displacements Za trough Zad can take either positive or negative values; displacements in the direction towards the viewer of the drawing are supposed to be positive, and displacements in the direction towards behind the drawing, negative.

Regarding local inclinations, a total of 38 values including radial direction components θar trough θsr and tangential direction components θat trough θst are defined for the positions 15a trough 15s, marked with x, corresponding to the 19 quadrisected photodetectors as average inclinations near the x marks. The relationships among these displacements Za trough Zad and the radial and tangential local inclinations θar trough θsr and θat trough θst will be described with respect to three typical points 15b (inner circumference), 15s (outer circumference) and 15a (original) by way of example.

As the local inclination near the point 15b on the inner circumference, the tangential direction θbt used here is the quotient of the difference in displacement between the drive points 8d and 8c by the distance between the two points as expressed in Equation 3. The radial direction θbr used here is the average of the inclination formed by the middle point between the drive points 8c and 8d (i.e. the point 15b itself) to the origin O and of the inclination formed by the middle point between the drive points 8k and 8l to the origin O as expressed in Equation 4. In exactly the same way, $\Delta$t trough θgt and θcr trough θgr are given to the five other points 15c trough 15g on the inner circumference.

$$\theta bt = \frac{Zd - Zc}{2 \cdot r_1 \cdot \tan(\pi/6)} = \frac{Zd - Zc}{1.15 \cdot r_1} \tag{Equation 3}$$

$$\theta br = -\frac{Zc + Zd}{4 \cdot r_1} - \frac{Zk + Zl}{4 \cdot r_2} \tag{Equation 4}$$

As the local inclination near the point 15s on the outer circumference, the tangential direction θst used here is the quotient of the difference in displacement between the drive points 8n and 8m by the distance between the two points as expressed in Equation 5. The radial direction θsr used here is the average of the inclination formed by the middle point between the drive points 8m and 8n (i.e. the point 15s itself) to the drive point 8z and of the inclination formed by the middle point between the drive points 8d and 8e to the drive point 8z as expressed in Equation 6. In exactly the same way, θht trough θrt and θhr trough θrr are given to the five other points 15h trough 15r on the outer circumference.

$$\theta st = \frac{Zn - Zm}{2 \cdot r_2 \cdot \tan(\pi/12)} = \frac{Zn - Zm}{0.54 \cdot r_2} \quad \text{(Equation 5)}$$

$$\theta sr = \frac{Zd + Ze - 2 \cdot Zz}{2(r_3 - r_1)} + \frac{Zm + Zn - 2 \cdot Zz}{2(r_3 - r_2)} \quad \text{(Equation 6)}$$

As the local inclination near the point 15a which falls on the origin O, the tangential direction θat used here is the quotient of the difference in displacement between the drive points 8d and 8a by the distance between the two points as expressed in Equation 7. The radial direction θar used here is the average of the inclination formed by the middle point between the drive points 8b and 8c to the origin O and of the inclination formed by the middle point between the drive points 8e and 8f to the origin O as expressed in Equation 8.

$$\theta at = \frac{Zd - Za}{2 \cdot r_1 / \cos(\pi/6)} = \frac{Zd - Za}{2.31 \cdot r_1} \quad \text{(Equation 7)}$$

$$\theta ar = \frac{Ze + Zf - Zb - Zc}{4 \cdot r_1} \quad \text{(Equation 8)}$$

As described above, the relationships among these displacements Za trough Zad and the local inclinations θar trough θsr and θat trough θst are figured out. Further by expressing the wave front variations Δφ of the backward emitted beams P in radial direction components Δφar trough Δφsr and tangential direction components Δφat trough Δφst by using the same suffix expressions as for the local inclinations θ, the relationships among the displacements Za trough Zad and the wave front variations Δφpar trough Δφsr and Δφat trough Δφst can be figured by applying Equation 2.

Figure 6B:
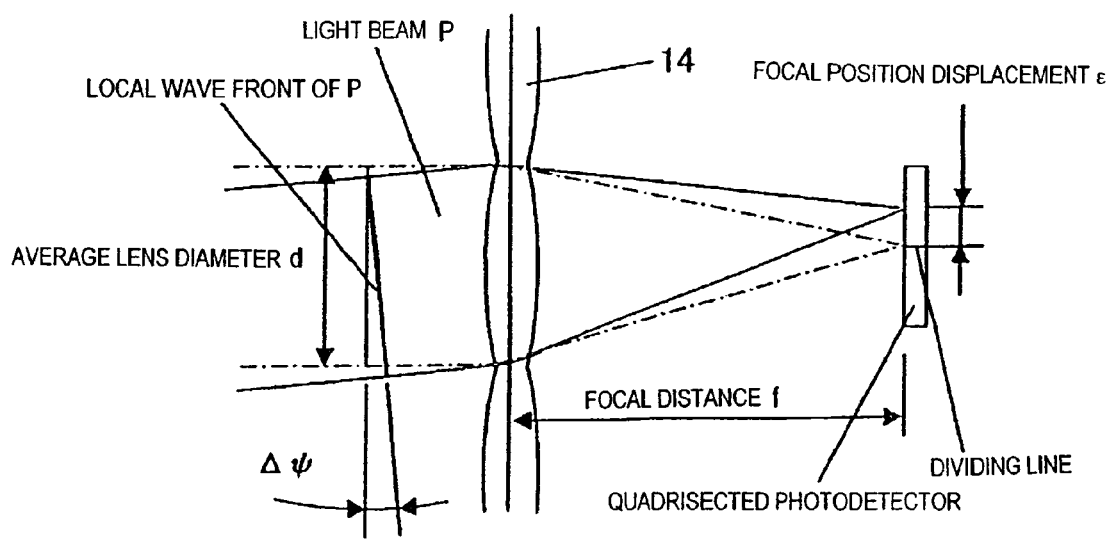

Next will be explained the relationship between the local wave front variations Δφ of the backward beams P and the outputs of the quadrisected photodetectors of the optical detector array with reference to FIG. 6(b). Here again, a one-dimensional model is used for the sake of simplicity. The average diameter of one lens of the lens array 14 is represented by d, and its focal distance, by f. The focus of the light beams P by this lens is adjusted to coincide with the dividing line of the quadrisected photodetectors of the optical detector array as indicated by one-dot chain lines if the light beams P consist of a plane wave with no aberration. The local wave fronts of the light beams P being approximated to a plane wave and the displacement of the focal position when this variation Δφ in inclination being represented by ∈, ∈ is given by Equation 9.

$$\in = f \cdot \Delta\phi \quad \text{(Equation 9)}$$

The output of the quadrisected photodetectors is expressed by using as they are the signs explained with reference to FIG. 2(d), the difference signal being represented by Y and the sum signal, by S. Equation 10 and Equation 11 can be approximated, with the radius of the diffraction limit of the light beams P being represented by ω, where λ is the wavelength of the light beams P.

$$\omega = f \cdot \lambda / (\pi \cdot d) \quad \text{(Equation 10)}$$

$$Y/S = \in/\omega = (\lambda \cdot d)/\lambda \cdot \Delta\phi \quad \text{(Equation 11)}$$

As is apparent from Equation 11, regarding the output of the quadrisected photodetectors, the ratio Y/S between the difference signal and the sum signal can be approximated to a proportional relationship to the local wave front variations Δφ. To expand this into two dimensions, the difference signal/sum signal ratios Yar/Sa trough Ysr/Ss and Yat/Sa trough Yst/Ss of the 19 individual quadrisected photodetectors 15a trough 15s can be related to the local wave front variations Δφar trough Δφsr and Δφat trough Δφst.

As is seen from Equation 2 trough Equation 11 and equivalent formulas whose statement is dispensed with, the difference signal/sum signal ratio Y/S of each quadrisected photodetector of the optical detector array is proportional to the local wave front variations Δφ of the light beams P and, since these local wave front variations Δφ can be expressed in a linear formula of the displacement Z of the reflective film 32 of the deformable mirror 8, Y/S can be represented by a linear expression of Z by eliminating Δφ from these equations.

Next, the driving forces of the actuators and the displacements Za trough Zad will be explained with continued reference to FIG. 5(a). The driving forces of the actuators at the drive points 8a trough 8ad are represented by Fa trough Fad, respectively. The driving forces Fa trough Fad can take either positive or negative values; driving forces driving the reflective film 32 in the direction towards the viewer of the drawing are supposed to be positive, and driving forces in the direction towards behind the drawing, negative. A coefficient of a fixed value determined by the configuration of the reflective film 32 being represented by k, Equation 12 holds true of every the drive point as a basic idea. Statement of suffixes (a trough ad) to F, Z, m and γ is dispensed with here; m is an equivalent mass pertaining to the motion of a drive point in the Z direction, and γ a viscosity coefficient including the resistance of air as well. Further, ΔZ/L is an inclination relative to a point around, of which details will be explained below.

$$F = m \cdot \frac{d^2}{dt^2} Z + \gamma \cdot \frac{d}{dt} Z + k \cdot \frac{\Delta Z}{L} \quad \text{(Equation 12)}$$

Figure 7A:
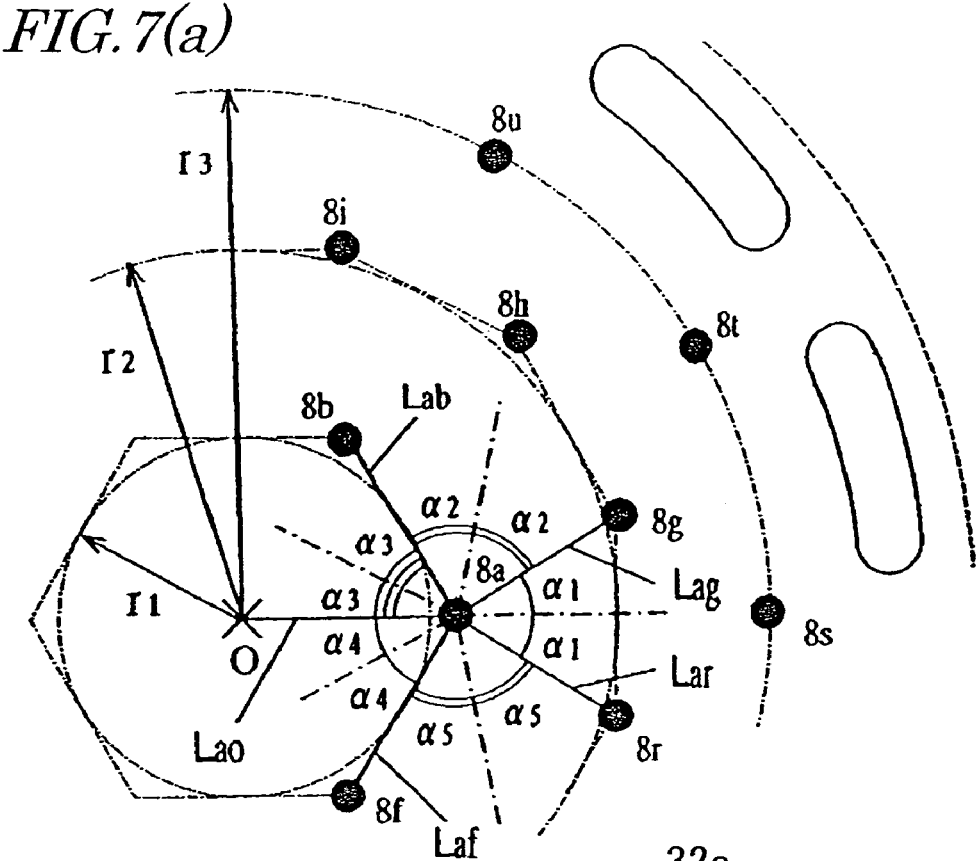
FIGS. 7(a) and 7(b) are enlarged plans of the deformable mirror in Embodiment 1 of the invention.

Regarding details of the term expressed in ΔZ/L, three typical points 8a (inner circumference), 8g (outer circumference) and 8t will be taken up by way of example, and explained with reference to FIG. 7. FIG. 7 are enlarged plans of the deformable mirror 8 in Embodiment 1 of the present invention. First will be explained the details of ΔZa/L regarding the drive point 8a on the inner circumference with reference to FIG. 7(a). Five points including the origin O and the drive points 8b, 8f, 8g and 8r will be taken up as points around the drive point 8a, and the distances from these points to the drive point 8a are supposed to be Lao, Lab, Laf, Lag and Lar, respectively. The angle resulting from equal bisecting of the angle formed by the drive points 8r, 8a and 8g will be represented by a α1; that resulting from equal bisecting of the angle formed by the drive points 8g, 8a and 8b, by α2; that resulting from equal bisecting of the angle formed by the drive point 8b, the drive point 8a and the origin O, by α3; that resulting from equal bisecting of the angle formed by the origin O and the drive points 8a and 8f, by α4; and that resulting from equal bisecting of the angle formed by the drive points 8f, 8a and 8r, by α5. For instance, the average inclination between the drive point 8g and the drive point 8a is (Zg−Za)/Lag, and the angle of view (α1+α2) seen from the drive point 8a approximates what this average inclination is applicable to. Considering other points around in the same way would give Equation 13.

$$\frac{\Delta Za}{L} = \frac{\alpha_1 + \alpha_2}{2\pi} \cdot \frac{Za - Zg}{Lag} + \frac{\alpha_2 + \alpha_3}{2\pi} \cdot \frac{Za - Zb}{Lab} + \frac{\alpha_3 + \alpha_4}{2\pi} \cdot \frac{Za}{Lao} + \frac{\alpha_4 + \alpha_5}{2\pi} \cdot \frac{Za - Zf}{Laf} + \frac{\alpha_5 + \alpha_1}{2\pi} \cdot \frac{Za - Zr}{Lar}$$

(Equation 13)

All of Lao, Lab, Laf, Lag, Lar and α1 trough α5 are constants that can be figured out from the shape of the arrangement of the drive points, and can be represented by functions of r1 and r2. The inclinations ΔZb/L trough ΔZf/L of the other drive points 8b trough 8f, respectively, on the inner circumference can be figured out in the same way. Regarding ΔZg/L of the drive point 8g on the middle circumference, the way of thinking is exactly the same as concerning the drive point 8a on the inner circumference. As points around the drive point 8g, five drive points 8a, 8h, 8r, 8s and 8t are taken up, and ΔZg/L can be formulated by figuring out the distances between these points and the drive point 8g and the angle of view seen from the drive point 8g. The inclinations ΔZh/L trough ΔZr/L of the other drive points 8h trough 8r, respectively, on the middle circumference can be figured out in the same way.

Figure 7B:
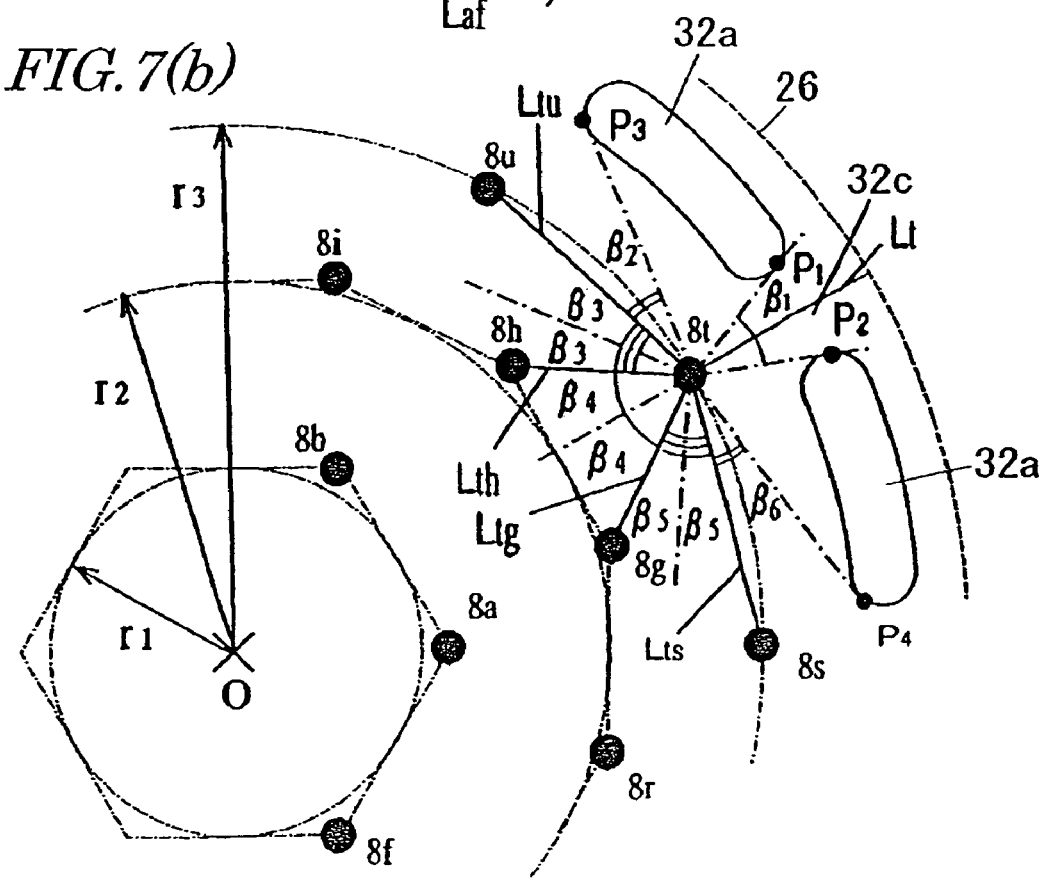

While the basic idea is the same regarding ΔZt/L of the drive point 8t on the outer circumference, here it is needed to take into account the influences of the periphery 26 and the holes 32a, and accordingly explanation will be made with reference to FIG. 7(b). As points around the drive point 8t, four drive points 8h, 8g, 8s and 8u and the periphery 26 are taken up, and their distances from the drive point 8t are represented by Lth, Ltg, Lts, Ltu and Lt, respectively. Further, the angle formed by an end points P1 and P1 of the connecting portion 32c between the two holes 32a to the drive point 8t will be represented by $\beta_1$; the angle formed by another end point P3 and the drive points 8t and 8u, by $\beta_1$; that resulting from equal bisecting of the angle formed by the drive points 8u, 8t and 8h, by $\beta_3$; that resulting from equal bisecting of the angle formed by the drive point 8h, 8t and 8g, by $\beta_4$; that resulting from equal bisecting of the angle formed by the drive points 8g, 8t and 8s, by $\beta_5$; and that formed by the drive points 8s and 8t and still another end point $\beta_4$, by $\beta_6$. By using these signs, ΔZt/L is expressed in Equation 14.

$$\frac{\Delta Zt}{L} = \frac{\beta_1}{2\pi} \cdot \frac{Zt}{Lt} + \frac{\beta_2 + \beta_3}{2\pi} \cdot \frac{Zt - Zu}{Ltu} + \frac{\beta_3 + \beta_4}{2\pi} \cdot \frac{Zt - Zh}{Lth} + \frac{\beta_4 + \beta_5}{2\pi} \cdot \frac{Zt - Zg}{Ltg} + \frac{\beta_5 + \beta_6}{2\pi} \cdot \frac{Zt - Zs}{Lts}$$

(Equation 14)

Lt, Ltu, Lth, Ltg, Lts and $\beta_1$ trough $\beta_6$, like the drive points on the inner circumference, are constants can be figured out from the shape of the arrangement of the drive points, and can be represented by functions of $r_2$ and $r_3$. The inclinations ΔZu/L trough ΔZad/L of the drive points 8u trough 8ad, respectively, on the outer circumference can be figured out in the same way. By applying ΔZa/L trough ΔZad/L provided in this way to Equation 12, the driving forces Fa trough Fad of the actuators can be represented by the linear expressions of displacements Za trough Zad including the accelerations $d^2(Za)/dt^2$ trough $d^2(Zad)/dt^2$ of the drive points, the velocities d(Za)/dt trough d(Zad)/dt of the drive points, and the drive points around.

Finally, the relationship between the flow duration duty U of the drive voltage (in the H state) and the driving force F given to the fixed electrodes of the actuators. The flow duration duty U is the quotient of the duration of electricity flow in the H state by the control cycle as described with reference to FIG. 3. As is apparent from the configurational diagram of the actuators shown in FIG. 3, a fixed electrode 29 (or 29') and a yoke 28 constitute a capacitor, whose electrostatic capacitance Ca is a function of its own displacement Z represented by the approximation of Equation 15, where $\epsilon_0$ is a vacuum dielectric constant; S, an effective area; and k' is a positive constant of not greater than 1. The sign ± before k'·Z is negative when the fixed electrode 29 is to be driven, and positive when the fixed electrode 29' is to be driven.

$$Ca = \frac{\varepsilon_0 S}{dg \pm k'Z}$$

(Equation 15)

The driving force F is approximated by Equation 16 as the product of multiplication of the partial differential of electrostatic energy $CaV^2/2$ in the distance direction by the flow duration duty U. Where the time constant CaR, which is the product of the electrostatic capacitance Ca and the resistance R of the current path, is great and shifting the electric charge takes time, the nonlinearity of F and U is great, but in any case it is possible to give the driving force F as a function of the flow duration duty U of the drive voltage for the fixed electrodes and of the displacement Z according to the drive direction.

$$F = \pm \frac{-\varepsilon_0 S V^2}{(dg \pm k'Z)^2} \cdot U$$

(Equation 16)

The above-described series of relationships from the flow duration duty U of the drive voltage for the actuators, which is the control input, to the output signal of the detector array, which is the detection output are set in a control unit to be described afterwards, and the control unit utilizes these to perform wave front phase control. As it is simpler to describe multi-input/multi-output control by the control unit in vector expressions, first the signs will be defined. However, as the relationship between the driving force F for an actuator and the flow duration duty U of the drive voltage for the fixed electrodes to the displacement Z is an independent relationship with no interference by any other actuator and is nonlinear, the efficiency of computation needed for control is enhanced by using a method by which the relationship from the driving force to the output of the optical detector array is first figured out in a linear matrix expression and after that the driving force is individually converted into a flow duration duty on a nonlinear basis. The output vector y of the optical detector array, defined by Equation 17, is a column vector having 38 components.

$$y = \left[\frac{Yar}{Sa}, \frac{Yat}{Sa}, \frac{Ybr}{Sb}, \frac{Ybt}{Sb}, \cdots \frac{Ysr}{Ss}, \frac{Yst}{Ss}\right]^T$$

(Equation 17)

It has to be noted that superscript T at the right end signifies a transposition. The state vector x of the deformable mirror 8, defined by Equation 18, is a column vector having 60 components including the displacements Za trough Zad and velocities d(Za)/dt trough d(Zad)/dt.

$$x = \left[Za, Zb, \ldots, Zad, \frac{dZa}{dt}, \frac{dZb}{dt}, \ldots, \frac{dZad}{dt}\right]^T \quad \text{(Equation 18)}$$

The driving force vector f of the actuator, defined by Equation 19, is a column vector having 30 components including the driving forces Fa trough Fad.

$$f=[fa, Fb, \ldots, Fad]^T \quad \text{(Equation 19)}$$

The flow duration duty vector u of the actuator, defined by Equation 20, is a column vector having 30 components including the flow duration duties Ua trough Uad.

$$u=[Ua, Ub, \ldots, Uad]^T \quad \text{(Equation 20)}$$

Equation 21 gives d, which is a disturbance vector, which is a column vector having 38 components generated by the wave front aberrations of the disk and other causes, and is subject to correction control.

$$d=[Dar, Dat, Dbr, Dbt, \ldots Dsr, Dst]^T \quad \text{(Equation 21)}$$

Vectors y, x and f conform to the state formulas of Equation 22 trough Equation 23.

$$\frac{dx}{dt} = Ax + Bf \quad \text{(Equation 22)}$$

$$y = Cx + d \quad \text{(Equation 23)}$$

Matrix A is a 60×60 type matrix function, matrix B is a 60×30 type one and matrix C is a 38×60 type one, and the components of matrixes A, B and C are determined by Equation 2 trough Equation 14 already explained and equivalent formulas whose explanation has been dispensed with. The components of matrixes A, B and C contain many zeros and, to indicate this, expressions using submatrixes are represented by Equation 24 trough Equation 26.

$$A=\begin{bmatrix}0 & I\\ A_1 & \lambda_1\end{bmatrix} \quad \text{(Equation 24)}$$

$$B=\begin{bmatrix}0\\ \lambda_2\end{bmatrix} \quad \text{(Equation 25)}$$

$$C=[C_1\, 0] \quad \text{(Equation 26)}$$

where 0 is a zero matrix; I, a 30×30 type unit matrix; $A_1$, a 30×30 type non-diagonal matrix; $\lambda_1$, and $\lambda_2$, 30×30 type diagonal matrixes; and $C_1$, a 38×30 type non-diagonal matrix. It is further expressly shown that a vector x, as indicated by Equation 27, consists of a displacement vector Z and a velocity vector V.

$$X = \begin{bmatrix} Z \\ V \end{bmatrix} \quad \text{(Equation 27)}$$

Now to describe the configuration for control: the purpose of wave front phase control is, if any disturbance d is cause to arise by a disk tilt, a variation in base thickness or the like, to provide appropriate driving forces f to the actuators of the deformable mirror, thereby vary the state x of the mirror to achieve conversion so that the output y be always a zero vector. The configuration to realize this control operation will be described with reference to FIG. 8.

Figure 8:
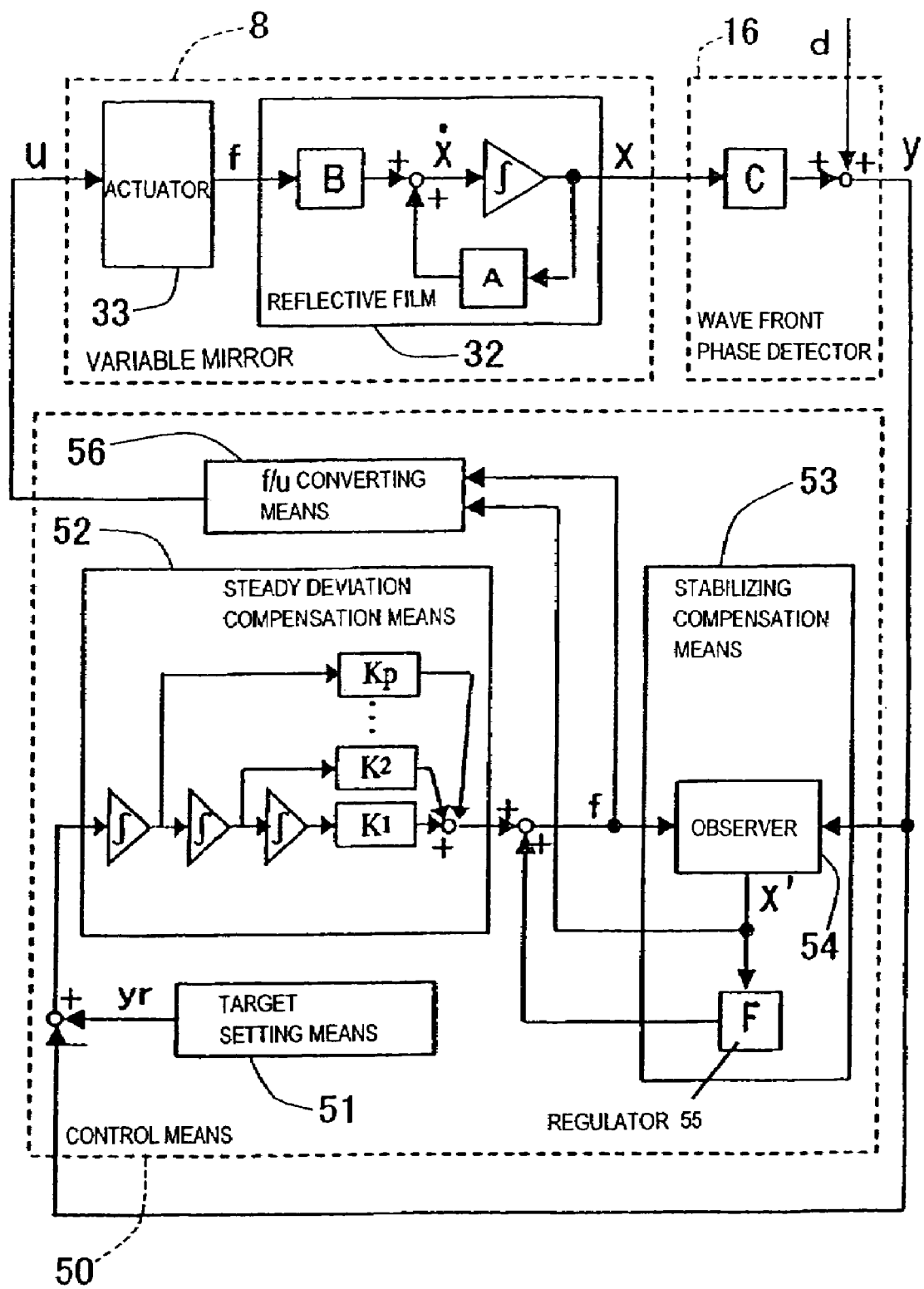
FIG. 8 is a schematic configurational diagram of a control unit in Embodiment 1 of the invention.

FIG. 8 is a schematic configurational diagram of the control unit in Embodiment 1 of the present invention. In the drawing, the control unit 50 is configured of a target setting unit 51, a steady deviation control unit 52, a stabilizing compensation unit 53 and an f/u conversion unit 56; the output vector y of the wave front phase detector 16 is inputted, and the flow duration duty vector u of the actuator is outputted.

The target setting unit 51 sets a target vector yr which serves as the target of the output vector y of the wave front phase detector 16. During usual recording and reproduction, the target vector yr is set to a zero vector. However, if it is possible to foresee the occurrence of a wave front aberration and to estimate the variation in the output y due to that aberration as in, for instance, switching the in-focus layer of a two-layered optical disk, the target setting unit 51 carries out feed forward control by setting the target vector yr to that estimated vector.

The method of setting the target vector yr in switching the in-focus layer of a two-layered optical disk will be described. First, where a disk of which the refractive index, adhesive layer thickness and other factors are standard is supposed, the standard variation Δd of the disturbance vector d arising at the time of an inter-layer jump is preset in an ROM. The target vector yr is set to a value calculated back in such a way that the predicted variation in the output vector y coincide with Δd when the system is subjected to open loop control only for a prescribed length of time tj. The required length of time tj is set to a relatively large value in order to prevent overshooting, which is the length of time the objective lens requires to shift its focus, i.e. two to three times as long as the standard length of time taken from the time the shifting is started until the address of the header portion of another layer is read out. For this required length of time tj, too, a predetermined value is set in an ROM.

The steady deviation control unit 52 is an integral compensator configured to coupling p integrators in series, multiplying the outputs of the respective integrators by gain matrixes K1 trough Kp and adding the resultant products in order to realize the number of types p required to comply with an error signal yr-y with no steady deviation. The number of types p and the values of the gain matrixes K1 trough Kp are figured out in the design process in accordance with the relationship between the degree of the function of the vector y to be responded to and the matrix functions A, B and C, and set as predetermined functions.

The stabilizing compensation unit 53 is a differential compensator for stabilizing a closed loop system asymptotically, and is configured here of an observer 54 and a regulator 55. The observer 54 is a least-dimensional observer, to which the output vector y of the wave front phase detector 16 and the driving force vector f of the actuator are inputted, for outputting an estimated value x' of the state vector x. The regulator 55 outputs the result of linear computation of the estimated state vector x', which is inputted, according to a feedback gain matrix F. Values designed in advance so that the poles of the closed loop system be arranged in appropriate positions of a complex left plane to be stabilized asymptotically are set in the matrix F. The sum of the addition of the output the regulator 55 and the output of the steady deviation compensation unit 52 is the driving force vector f of the actuator.

The f/u conversion unit 56 is a nonlinear conversion unit for converting the driving force vector f of the actuator into the flow duration duty vector u, which is the actual control signal. To the f/u conversion unit 56 are inputted driving force vector f and the estimated state vector x', and the flow duration duty U is figured out with respect to 30 components corresponding to the individual actuators from the estimated values of the driving force F and the displacement Z in accordance with Equation 16. In further detail, the f/u conversion unit 56 has a selector circuit for selecting either one of the two fixed electrodes each actuator has and a conversion table in which are stored values predetermined as nonlinear functions in a memory. The configuration is such that first the fixed electrode to be driven is selected according to the positive or negative sign of the driving force F, and then the flow duration duty U is obtained by inputting Z and F to the conversion table as addresses. This procedure is performed for the 30 actuators, and the flow duration duty vector u is obtained.

The control unit 50 constitutes a closed loop system together with the deformable mirror 8 and the object of control of the wave front phase detector 16 mentioned above. Thus, the flow duration duty u is inputted to the deformable mirror 8, and first the actuators 33 generate driving forces f. The state x of the reflective film 32 is varied by the driving forces f, and the wave front phase of the reflected light beams is thereby changed to vary the output y of the wave front phase detector 16. The wave front phase of the light beams is also changed by a disk tilt, a variation in base thickness, sticking of a fingerprint or the like, and these affect the output y as the disturbance d. Against them, the control unit 50 outputs the flow duration duty u, corrects it in compliance with variations in the disturbance d, and performs control so as to keep the output vector y at zero all the time.

The operation of the information recording device configured as described above will be explained with reference again to FIG. 1. In the initial action, the optical disk 10 is fitted to a disk motor (not shown) and rotated, and focusing of the objective lens 9 and tracking control over the target track are carried out. At this point of time, no drive voltage is given to the deformable mirror 8 as yet, and the mirror surface is flat, with no correction of the wave front phase being performed. However, as this operation takes place towards the inner circumference of the disk where the tilt of the disk 10 is less and towards the first layer where the spherical aberration is less, it is possible to take the VFO signals of the header portion 10a into PLL and address reading with sufficient stability. The information recording device counts clock signals prepared from the VFO signals, and samples the output of the wave front phase detector 16 at a timing when the beam spot 17 is within the mirror portion 10b.

A control unit (not shown) sets the target vector yr to a zero vector, generates the flow duration duty u to the deformable mirror 8 so as to make this sampled output y zero, and performs control to correct the wave front phase by varying the shape of the mirror. The configuration is such that, in case of failure to validly sample the output of the wave front phase detector 16 on account of a failure in address reading or the like, the previous valid output can be held as it is. In this way, the detection of the wave front phase by the wave front phase detector 16 takes place in a state in which the beam spot 17 is securely within the mirror portion 10b, and accurate wave front phase detection can be accomplished without being affected by any pre-pit or groove. Further, the control band of the objective lens 9 is set sufficiently higher than the control band of the deformable mirror 8 in a configuration that can suppress deterioration in the accuracy of wave front phase detection due to control errors of the objective lens 9.

In carrying out a seek, a rough seek is performed in a state in which the last valid output of the wave front phase detector 16 in the seek start position is held, and the output the wave front phase detector 16 is sampled from the mirror portion 10b in which an address was first read in to control wave front phase correction. The target vector yr remains at a zero vector. If a state in which no address can be read after the rough seek continues for a prescribed length of time or longer, all the drive voltages to the deformable mirror 8 are reduced to zero, and the seek source is once released from its corrected state and the address reading action is tried again.

When the in-focus layer of the two-layered optical disk 10 is to be switched from the first layer to the second layer, the objective lens 9 is forcibly shifted in the direction towards the second layer; in this procedure, the control unit first holds the last valid output vector y of the wave front phase detector 16 on the first layer, and then the target setting unit sets a prescribed target vector yr. Since a non-zero target vector yr is given with the output vector y held, error vectors yr-y increase and, along with a variation in the flow duration duty u to the deformable mirror 8, the state vector x of the deformable mirror 8 is forcibly varied, and feed forward control is performed by an open loop in the direction of correcting wave front aberrations. After the address of the second layer is read in, the target setting unit again sets the target vector yr to a zero vector, and the last valid output vector of the wave front phase detector 16 on the first layer is released from the held state, and closed loop control is started on the basis of a newly sampled valid output vector of the second layer.

By performing feed forward control by having the target setting unit provide an appropriate target vector yr where the occurrence of any wave front aberration is predictable, prompt control of wave front phase correction can be accomplished with little transient error. Incidentally, if the address of the second layer cannot be read, the target setting unit again returns the target vector yr to a zero vector after the lapse of the prescribed length of time tj, and interrupts the forced variation of the state vector x of the deformable mirror 8. After preventing a hang-up in this way, address reading is tried again.

When address reading has been normally accomplished, the target vector yr is held at a zero vector, and the deformable mirror 8 is controlled by the closed loop system which the control unit 50 constitutes so that the output vector y of the wave front phase detector 16 be kept at a zero vector all the time even if there is a disturbance d.

It is also possible to realize a configuration which is intended to simplify control by enabling the displacement vector z to be provided without lagging behind the drive vector f where the equivalent mass m and the viscosity coefficient γ are negligibly small in Equation 12. In this case, Equation 22 trough Equation 27 can be simplified like Equation 28 and Equation 29.

$$f = -\lambda_2^{-1} A_1 z \qquad \text{(Equation 28)}$$

$$y = C_1 z + d \qquad \text{(Equation 29)}$$

Further, $C_1^-$, being a Moore-Penrose type general inverse matrix of $C_1$, Equation 30 is obtained from Equation 28 and Equation 29.

$$f = -\lambda_2^{-1} A_1 C_1^- (y - d) \qquad \text{(Equation 30)}$$

Here control is performed so that y=0 hold and, considering that the disturbance d is actually observed as the output y, direct conversion from the output vector y to the driving force vector f is possible as indicated by Equation 31, and proper compensation for steady deviation and stabilizing compensation can be performed so as to keep this driving force vector f always at zero.

$$f = \lambda_2^{-1} A_1 C_1^- y \quad \text{(Equation 31)}$$

The reason for the using the inverse matrix $C_1^-$ here is that there is no inverse matrix $C_1^{-1}$ because is not a square matrix. However, the general inverse matrix $C_1^-$ which minimizes the norm $\|y\|=\|C_1 z-d\|$ of an error in the output and at the same time minimizes the norm $\|z\|$ of the displacement can hold with any $C_1$ and can provide z as the optimal approximate solution. Furthermore, even if Equation 29 itself is a formula which does not necessarily have an actual solution on account of a modeling error, measurement noise or the like, $C_1$ does exist, and it is possible to compute a displacement vector z that can give the optimal approximation, such as the above-mentioned. Since $C_1^-$ is uniquely determined from $C_1$, it can be set in the control unit as a matrix wherein the values are known in advance. Thus Equation expressly shows that wave front information $C_1^- y$ on the whole backward light is computed from the wave front information y on each detection region by a matrix computing unit $C_1^-$. Although Equation 12 trough Equation 27, which constitute the basis of this approximation, cannot state wave front information on the whole backward light in such a simple expression, it is apparent that computation to reconstruct wave front information on the whole backward light is conducted.

As hitherto described, in this embodiment of the present invention, since the wave front detector 16 detects local wave fronts of backward light and the control unit outputs to the deformable mirror 8 drive signals for reconstructing wave front information on the whole backward light on the basis of this detector output, detection and correction of wave front aberrations can adapt to any wave front abberation instead of being limited to any specific type, and accurately correct complex wave front aberrations resulting from tilts, fluctuations in disk substrate thickness, double refraction, smear with fingerprints and the like.

Further, as the areas of the individual lenses of the lens array 14 are made unequal and, in particular, the square measures of detection regions arranged in parts where the intensity of backward light is greater are made stronger than those of detection regions arranged in parts where the intensity of backward light is weaker, differences in condensed luminous energy from detector to detector ensuing from the uneven distribution of backward light intensity can be compensated for, and accordingly the accuracy of reconstruction of the whole wave fronts can be improved by uniformizing the S/N ratios of the output signals of individual optical detectors.

Also, as the timing of detection by the wave front detector 16 is generated on the basis of the output of a medium information detecting part for detecting information stored by a medium, it is possible to securely detect wave fronts when the medium is in a suitable state for wave front detection, and accordingly accurate wave front phase detection can be accomplished.

Further, since the yoke of the deformable mirror 8 has the first portion and the second portion separated to mutually opposite positions around the axis of tilt, with the first fixed electrode opposing the first portion and the second fixed electrode opposing the second portion, and the reflective film is coupled to the first portion via the coupling stubs, the reflective film can be actively driven in two directions, and the symmetry of the driving force can be improved to enhance control accuracy and responsiveness.

Also, as the reflective film holds the reflective surface having a high degree of planar accuracy in a state in which no drive signal is given to either the first electrode or the second fixed electrode, and bidirectional driving is performed with this state serving as the neutral point as it is, no initial deformation in advance to obtain the neutral point is required as according to the prior art, with the result that problems in the repeatability of the neutral point and the like due to fluctuations of drive sensitivity at the time of initial deformation and other causes, and accordingly the accuracy of correction can be improved.

Further, as the distance from the axis of tilt of each actuator to the coupling stub is individually set, differentiated from one actuator to another and the setting range of displacement of the actuator in the direction of film thickness is set variably for individual actuators, the setting range of displacement of the actuator can be made variable even if the dimension in the direction of film thickness is formed for every actuator in a uniform process.

Also, since the reflective film is fixed near the origin, the displacements of actuators towards the inner circumference near the origin are set smaller, and the displacements of actuators towards the outer circumference farther from the origin are set greater, even if there is any erroneous operation in the control system over the actuators towards the inner circumference, the impact on the whole device can be suppressed because they are limited in displacement and, moreover the smaller range of displacement that is set facilitates improvement in actuator performance in terms of resolution and driving force, making possible highly response and accurate control.

(Embodiment 2)

Figure 9:
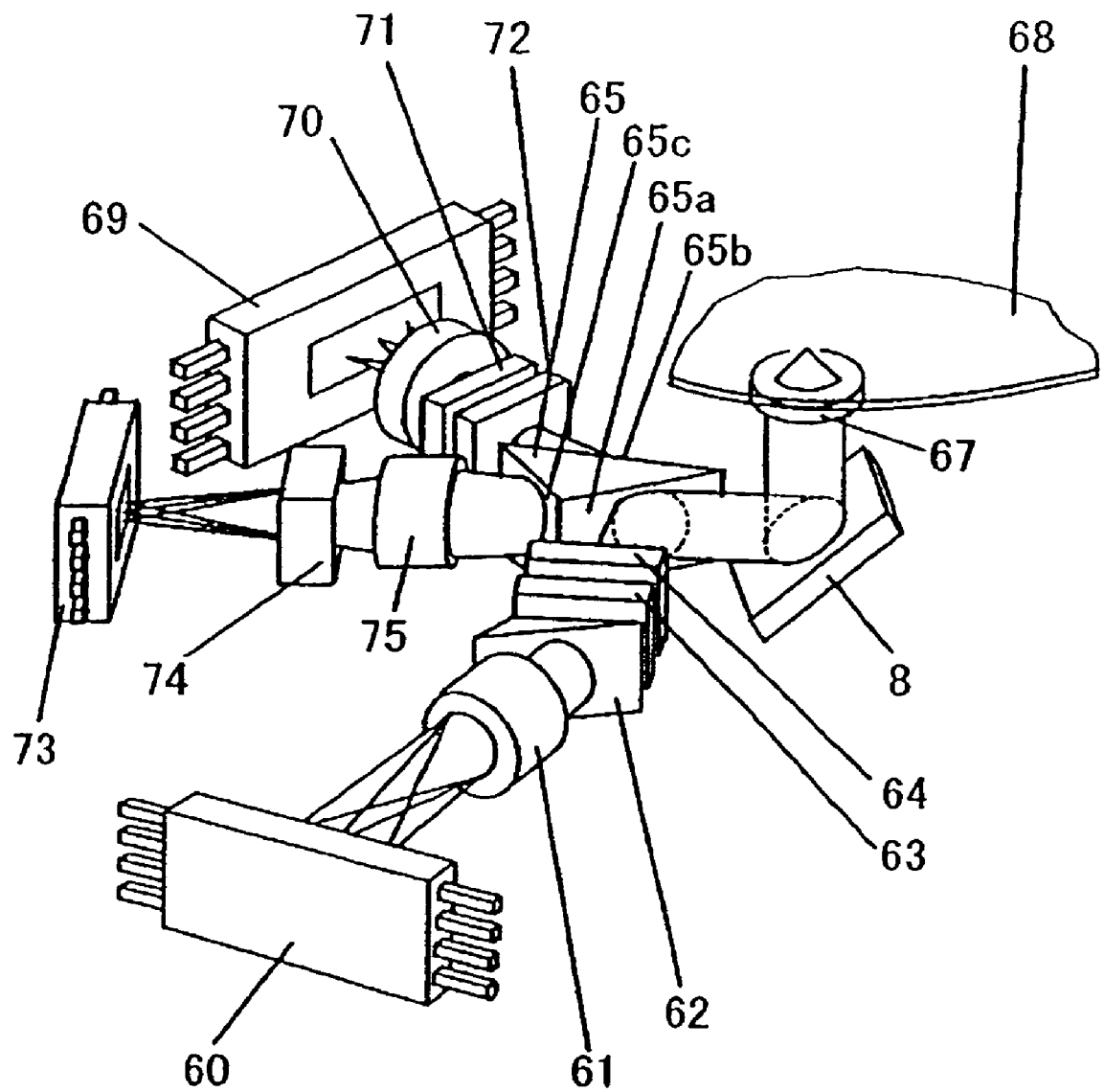
FIG. 9 is a schematic configurational diagram of an information device in Embodiment 2 of the invention.

Next, an information device according to a second embodiment of the present invention will be described with reference to FIG. 9. FIG. 9 shows a schematic configuration of this embodiment of the present invention.

The deformable mirror 8 according to this embodiment of the present invention has the same configuration as that described with reference to Embodiment 1.

The information device according to this embodiment of the present invention uses a plurality of light sources.

First will be described light emitted from a laser module 60 which integrates a photodetector and a GaN-based semiconductor laser of 405 nm in wavelength, which serves as a light source for a blue light recording disk.

Blue light beams emitted from the laser module 60 are converted into parallel beams by a collimator lens 61. A beam shaping prism 62 shape oval blue light beams into a circular shape. The shaped beams come incident on a polarization hologram 63. The polarization hologram 63, which is a diffraction grating comprising a substrate of a birefringent material such as $LiNbO_3$ over which a hologram pattern is formed, does not provide any phase difference to extraordinary rays, but provide a phase difference to ordinary rays by adjusting refractive indexes in the groove parts of the pattern by proton exchange or otherwise. As a result, when being transmitted by the polarization hologram 63, extraordinary rays are not diffracted, but ordinary rays are diffracted and deflected according to the hologram pattern. The groove depth is so designed to maximize the proportion of ±1st order beams for ordinary rays and to reduce that of zero-order beams substantially to zero. The extraordinary rays and the ordinary rays are linearly polarized beams polarized at a right angle to each other.

The linearly polarized beams emitted from the polarization hologram 63 are converted into circularly polarized beams by a quarter-wave plate 64, and brought to incidence on a dichroic prism 65. The dichroic prism 65 comprises a blue light reflective surface 65a and a red light reflective surface 65b, and these surfaces selectively reflect or transmit beams according to the laser wavelength. The blue light reflective surface 65a, irrespective of the direction of polarization, almost totally reflect blue light of 405 nm in wavelength and almost totally transmit red to infrared light of 650 nm in wavelength. The red light reflective surface 65b, again irrespective of the direction of polarization, almost totally reflect infrared light of 780 nm in wavelength and almost totally transmit red to blue light of 650 nm in wavelength. The one other face is a usual face 65c having no wavelength-selectivity.

An the objective lens 67 made of a glass material having a high refractive index designed in a single lens configuration of 0.85 in NA. An optical disk 68 is provided to be able to accept a blue light recording disk, a DVD disk or CD disk permitting recording/reproduction by the laser module 60 and to record or reproduce thereon or therefrom.

The blue light recording disk is a single-side two-layered recording disk provided with recording layers comprising a phase change recording material or dye-based recording material over a disk substrate of 0.6 mm in thickness, the two constituent substrates being stuck together with a transparent adhesive layer of 30 trough 50 μm in thickness in-between, and its format permits recording only in the grooves or on the lands. The groove pitch p, i.e. the distance between adjoining grooves is prescribed as stated in Equation 32, so that the interference region between the zero-order and +1st order diffracted beams and the interference region between the zero-order and −1st order diffracted beams of backward light in the grooves do not substantially overlap each other.

$$p<\lambda/NA \quad \text{(Equation 32)}$$

For recording and reproduction to and from a DVD disk, such as a DVD-ROM disk or a DVD-RAM disk, are used red laser beams emitted from a DVD laser module 69. The DVD laser module 69 is an integrated product of a GaInP/AlGaInP-based semiconductor laser of 650 nm in wavelength, which serves as the light source, and a photodetector.

A lens 70 converts the red light beams emitted from the DVD laser module 69 into a finite optical system having a desired angle of expansion. A polarization hologram 71 has a similar configuration to the polarization hologram 63. The polarization hologram 71, though not diffracting extraordinary rays, does diffract ordinary rays so as to maximize the proportion of ±1st order beams for ordinary rays and to reduce that of zero-order beams substantially to zero. Red light beams emitted from a quarter-wave plate 72 for converting linearly polarized beams into circularly polarized beams come incident, transmitted by the red light reflective surface 65b of the dichroic prism 65 and, after being transmitted by the blue light reflective surface 65a and emitted, are directed towards the deformable mirror 8. The dichroic prism 65 performs the role of a beam shaping prism to shape oval blue light beams into circular beams.

For recording and reproducing onto and from a CD disk are used infrared laser beams emitted from a CD laser module 73. The CD laser module 73 is an integrated product of a GaAlAs-based semiconductor laser of 780 nm in wavelength, which serves as the light source, and a photodetector. A glass hologram 74 has a hologram pattern for making three beams for tracking control use on its face closer to the CD laser module 73 and, on the other face, another hologram pattern for deflecting backward light to the photodetector of the CD laser module 73. A lens 75 converts light beams emitted from the CD laser module 73 into a finite optical system having a desired angle of convergence.

Figure 10A:
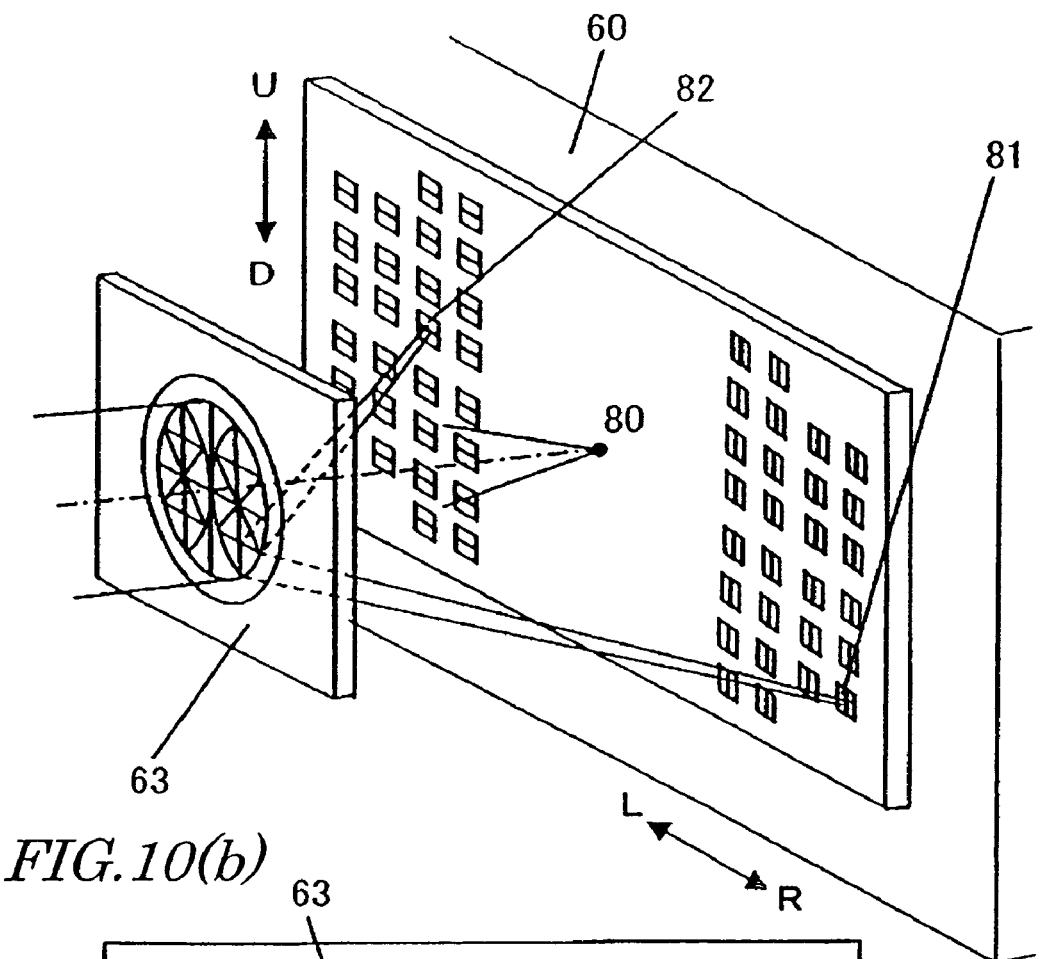
FIGS. 10(a) and 10(b) are schematic configurational diagrams of a blue laser module and a polarization hologram in Embodiment 2 of the invention.

Next will be described the laser module 60 and the polarization hologram 63 while referring to FIG. 10. FIG. 10 are schematic configurational diagrams of the laser module 60 and the polarization hologram 63 in this embodiment of the present invention.

Figure 10B:
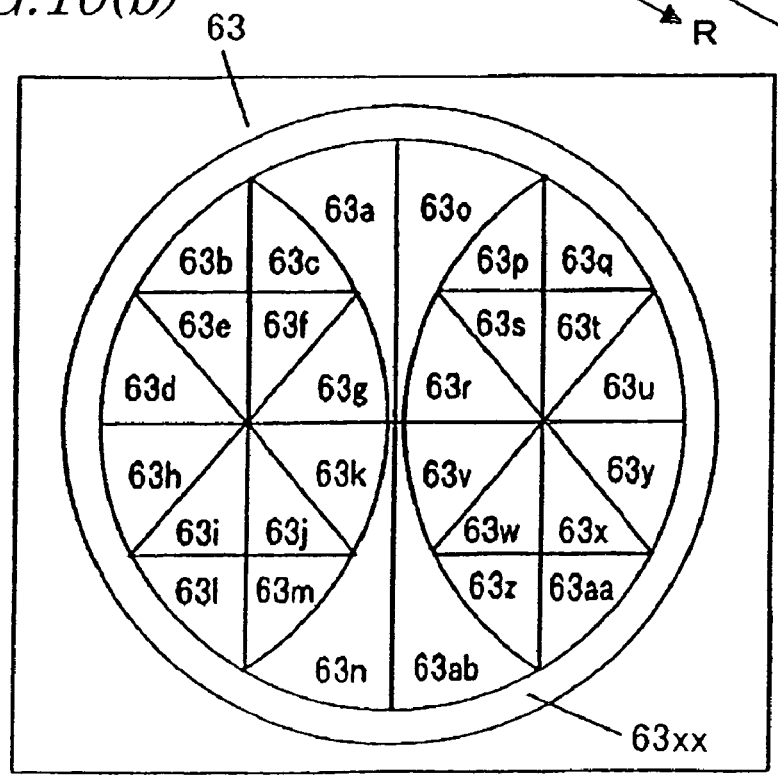

Blue light beams emitted from the light source 80 of the laser module 60 pass a collimator lens and a beam shaping prism not shown in FIG. 10 and come incident on the polarization hologram 63. The polarization hologram 63, as shown in FIG. 10(b), is divided into a total of 29 regions comprising 28 regions 63a trough 63ab for deflecting backward light to the photodetector and a region 63xx for limiting the aperture to a certain size and in particular preventing backward light from returning to the light source. On each of these regions is formed the optimal diffraction grating pattern for deflecting backward light in each intended direction.

The shapes of the regions 63a trough 63ab are designed in accordance with respective interference patterns formed by the grooves of the blue light recording disk. The regions 63a, 63n, 63o and 63ab correspond to the region of the zero-order reflected beams of the blue light recording disk. The regions 63b trough 63m correspond to the interference region between the zero-order reflected beams and the +1st order reflected beams, and the regions 63p trough 63aa correspond to the interference region between the zero-order reflected beams and the −1st order reflected beams.

As the groove pitch p of the blue light recording disk is prescribed as stated in Equation 32, there is no interference region between the +1st order reflected beams and the −1st order reflected beams, and no regions corresponding to the are provided on the polarization hologram 63.

Forward blue light beams having passed the polarization hologram 63 travel straight ahead without diffraction of extraordinary rays, but ordinary rays are diffracted and deflected. The deflected ordinary rays deviate out of the optical path to become invalid stray beams, and only extraordinary rays are reflected by the optical disk 68 as valid blue light beams to become backward light. As backward light beams have become ordinary rays by passing a quarter-wave plate (not shown) twice, back and forth, almost the whole luminous energy is diffracted by the polarization hologram 63, and ±1st order beams deflected to the photodetectors of the laser module 60.

The photodetectors of the laser module 60 consists of vertically divided photodetectors 81 bisected by a vertical dividing line corresponding to the recording track tangential direction of the blue light recording disk and horizontally divided photodetectors 82 bisected by a horizontal dividing line in a direction orthogonal thereto. There are 28 each of the vertically divided photodetectors 81 and the horizontally divided photodetectors 82 in a one-to-one correspondence to the respective regions 63a trough 63ab of the polarization hologram 63. It is so designed that light beams emitted from the regions 63a trough 63ab of the polarization hologram 63 be focused on the respectively corresponding dividing lines of the vertically divided photodetectors 81 and the horizontally divided photodetectors 82. The hologram configuration regarding the focal position is not one of separating focal positions before and behind along the direction of the normal of the as is the usual practice by the SSD method, but one of positioning the focuses on the photodetector surface for both ±1st order beams. However, in order to secure margins for adjustment errors of optical elements, such as the error in the relative positions of the polarization hologram 63 and the laser module 60, a relatively large spot diameter at the focus is provided, such as 50 trough 100 µm. This can be realized without strain because the division is very finely made into the 28 regions 63a trough 63ab, resulting in a small size of each region, and accordingly the NA as viewed from each photodetector is small. It will be explained afterwards that even such a configuration allows focusing error signals of the objective lens to be generated.

In the drawing, L and R represent the left and right directions; U and D, the upward and downward direction; La trough Lab, the outputs of the left divided part of the vertically divided photodetectors 81; and Ra trough Rab, the outputs of the right divided part of the same. The small letters a trough ab respectively match the regions 63a trough 63ab of the polarization hologram 63. Similarly, Ua trough Uab represent the outputs of the upper divided part of the horizontally divided photodetectors 82; and Da trough Dab, the outputs of the lower divided part of the same. The outputs La trough Lab, Ra trough Rab, Ua trough Uab and Da trough Dab from the divided parts of the photodetectors are subjected to amplification, differential computation and adding computation by a preamplifier and a computing circuit (neither shown) to generate control signals and recording signals for the objective lens and the deformable mirror.

First, a tracking error signal TE of the objective lens is generated as a luminous energy difference between right and left in the polarization hologram 63 by a push-pull method. Its contents are represented by Equation 33; where Σ( ) is a sign denoting the total sum of the outputs in the parentheses.

$$TE = \sum (La \sim Ln, Ra \sim Rn, Ua \sim Un, Da \sim Dn) - \sum (Lo \sim Lab, Ro \sim Rab, Uo \sim Uab, Do \sim Dab)$$

(Equation 33)

Next will be explained the principle of generating a focusing error signal FE of the objective lens with reference to FIG. 11. FIG. 11 are diagrams for illustrating the principle of the relationship between focusing errors and the focal position on the photodetector in Embodiment 2. Although the explanation here is simplified by ignoring the effects of diffraction by the grooves in the optical disk and the like, but such a condition, if any, will make no difference to the basic concept. Also for the sake of simplification, the explanation refers to a one-dimensional mode, this can be easily expanded to a two-dimensional model.

Figure 11A:
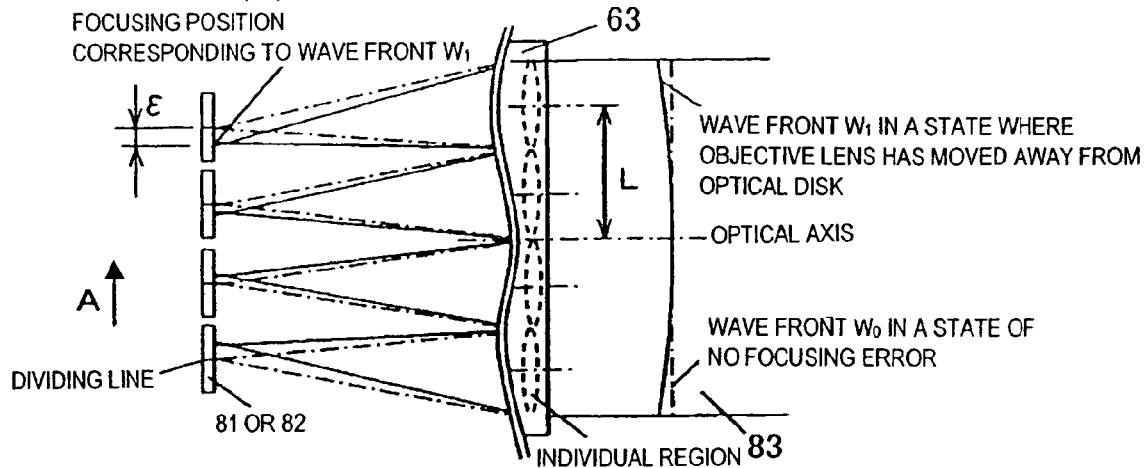
FIGS. 11(a) through 11(c) are diagrams for explaining the principle of the relationship between focusing errors and the position of focusing on the photodetector in Embodiment 2 of the invention.

FIG. 11(a) shows the positions of focusing on photodetectors in a state in which there are focusing errors in the direction in which the objective lens moves away from the optical disk. On the right-hand side of the drawing is typically shown a wave front in which light beams 83 are in a state of parallel beams. While a wave front W0 in the absence of a focusing error is planar indicated by a one-dot chain line, a wave front W1 in the presence of a focusing error as mentioned above presents a concave surface which is symmetric with respect to the optical axis as indicated by a solid line. Whereas regions of the polarization hologram 63 on which these parallel light beams 83 come incident are typically represented by wavy lines, the distance between the center of each of these regions and the optical axis is represented by L. The distances L are predetermined values differing from region to region and, in an expansion to a two-dimensional model, constitute coordinates representing the central positions of the respective regions. The distances L may be either positive or negative, and here direction A in the drawing is supposed to be positive.

The light beams 83 having passed the polarization hologram 63, after passing a beam shaping prism and a collimator lens (neither shown), are focused on the divided photodetectors. This state is illustrated on the lefthand side of the drawing. The divided photodetectors can be treated in the same way, whether they are the vertically divided photodetectors 81 or the horizontally divided photodetectors 82, and in the drawing a glimpse of dividing lines can be seen in the middle. Therefore, if FIG. 11(a) is regarded as showing a view in the vertical direction, this will illustrate the vertically divided photodetectors 81, or if it is regarded as showing a view in the horizontal direction, the horizontally divided photodetectors 82. In the following description, they will be commonly referred to as divided photodetectors. While adjustment is so made that the position of focusing on each divided photodetector fall on the dividing line in the absence of a focusing error as indicated by a one-dot chain line, the focusing position deviates from the dividing line in the presence of a focusing error as indicated by a solid line. This deviation ∈ of the focusing position is individually measured for each of the divided photodetectors. The deviation ∈ of the focusing position may also be either positive or negative, and here again direction A in the drawing is supposed to be positive. Whereas sign ∈ denoting a deviation of the focusing position has a negative correlation with the sign of the distance L, this correlation is due to the concave shape of the wave front W1.

Figure 11B:
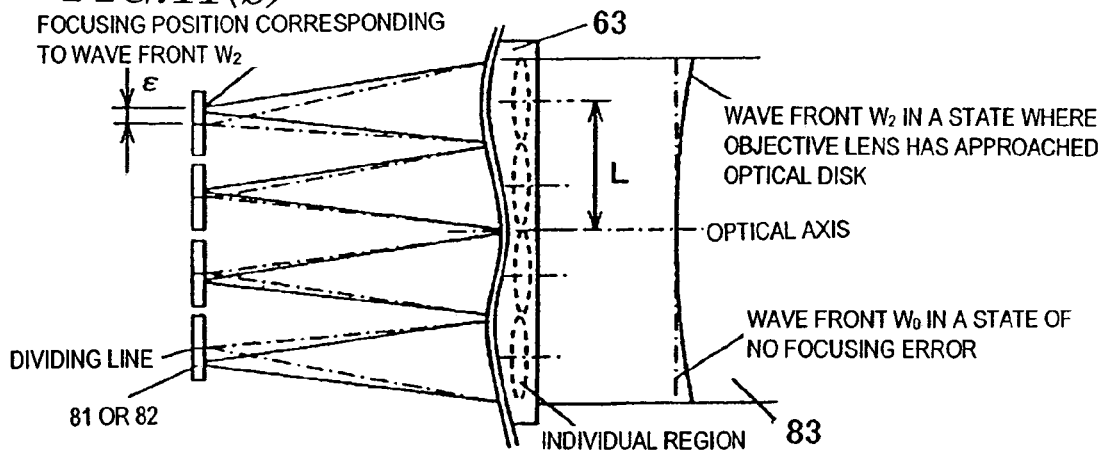

FIG. 11(b) shows the positions, of focusing on photodetectors in a state in which there are focusing errors in the direction in which the objective lens approaches the optical disk. The constituent elements and signs in the drawing are the same as their respective counterparts in FIG. 11(a). On the right-hand side of the drawing is shown a wave front W2 in the presence of a focusing error as indicated by a solid line, and this presents a convex surface which is symmetric with respect to the optical axis. Whereas sign ∈ denoting a deviation of the focusing position has a positive correlation with the sign of the distance L in this state, this correlation is due to the convex shape of the wave front W2.

Figure 11C:
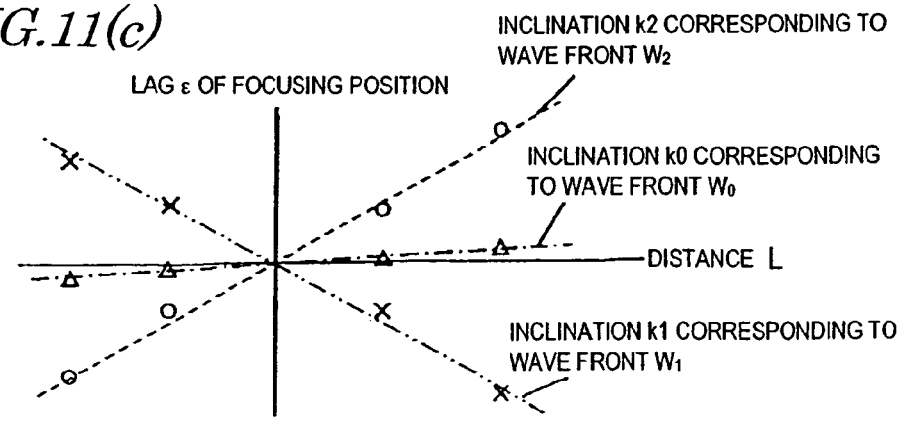

Plotting the relationships stated on a graph gives what is shown in FIG. 11(c). The distance L being represented by the horizontal axis and the deviation ∈ of the focusing position by the vertical axis, the average inclinations k of straight lines linking the plotted data are figured out. Although the inclination should be theoretically zero in a state corresponding to the wave front W0, i.e. in the absence of a focusing error, there actually are initial deviations represented by A marks, resulting from errors in the positional adjustment of the divided photodetectors and other causes, and the line has an inclination k0 indicated by a one-dot chain line. This value is stored in advance in a ROM as an offset value to be used as a compensator in computing the inclination k. A line having x marks plots a state corresponding to the wave front W1, i.e. a state in which there are focusing errors in the direction in which the objective lens moves away from the optical disk, and has a negative inclination k1 indicated by a two-dot chain line. A line having; marks plots a state corresponding to the wave front W2, i.e. a state in which there are focusing errors in the direction in which the objective lens approaches the optical disk, and has a positive inclination k2 indicated by a wavy line. As the inclinations k1 and k2 thus have polarities and magnitudes corresponding to focusing errors ensuing from the movement of the objective lens away from or towards the optical disk, a focusing error signal FE is generated by using an inclination k, and the objective lens is so controlled as to reduce this to zero after an offsetting correction.

In order to figure out the deviation ∈ of the focusing position then from the outputs of divided photodetectors, the standardized output obtained by dividing the difference in luminous energy by the luminous energy sum of the divided photodetectors is used as already explained with reference to FIG. 6(b). What this output means is, as is seen from Equation 2 and Equation 9 trough Equation 11, substantially the local inclinations of wave fronts in the individual regions, i.e. the linear special differentials of the wave fronts.

Generating focusing error signals in this way provides the following advantages over the prior art. While there are a number of focusing error detecting methods according to the prior art including the knife edge method, the SSD method and the astigmatism method, every one of them basically uses the whole wave front of backward light and detects focusing errors on the basis of variations in the curvature of this whole wave front. Thus, whereas the curvature of the whole wave front varies and the focal position shifts between before and behind the photodetector surface along with the movement of the objective lens towards or away from the optical disk, an optical design is contrived to detect this back and forth shifting of the focal position as a difference in divided photodetector output. By the knife edge method, the dividing line is so provided as to pass the optical axis and the luminous energy is made asymmetric; by the SSD method, and at the same time between the right and left of the dividing line; and by the astigmatism method, focal positions are also separated before and behind the photodetector surface according to the direction of the lens.

However, by any method according to the prior art by which differences in the curvature of the wave front are detected, the smaller the area of each region is made by dividing the detection region of the polarization hologram 63 into a greater number, the more the accuracy of detection deteriorates. This is due to the character of the curvature which is given as a quadratic spatial differential of the wave front, and such higher order variations become more difficult as the detection region becomes smaller. By contrast, as the configuration in this embodiment of the present invention is so disposed the variations in wave front inclinations in the detection regions, i.e. linear spatial differentials, are detected and synthesized into focusing error signals, the accuracy of detecting focusing errors can be prevented from deterioration even if the detection regions of the polarization hologram 63 are multi-sected to reduce the area of each region.

The principle of the capability to generate focusing error signals FE is as explained above, and this is expressed in Equation 34 in a somewhat simplified way. Here are used four signs including the output difference X (=R−L) between the right and left divided parts of each of the regions 63a trough 63ab, the output difference Y (=U−D) between the upper and lower divided parts, the total sum S (=R+L+U+D), and the absolute value L of the distance between the center of the optical axis and the center of each region. For instance, Xa, Ya and Sa corresponding to the region 63a are given as represented by Equation 35 trough Equation 37.

$$FE = \sum \left( \frac{Xa}{La \cdot Sa} \sim \frac{Xn}{Ln \cdot Sn}, \right.$$
$$\frac{Ya}{La \cdot Sa} \sim \frac{Yg}{Lg \cdot Sg}, \frac{Yo}{Lo \cdot So} \sim \frac{Yu}{Lu \cdot Su} \right) -$$
$$\sum \left( \frac{Xo}{Lo \cdot So} \sim \frac{Xab}{Lab \cdot Sab}, \frac{Yh}{Lh \cdot Sh} \sim \frac{Yn}{Ln \cdot Sn}, \right.$$
$$\left. \frac{Yv}{Lv \cdot Sv} \sim \frac{Yab}{Lab \cdot Sab} \right) \quad \text{(Equation 34)}$$

$Xa = La - Ra$ (Equation 35)

$Ya = Ua - Da$ (Equation 36)

$Sa = Ra + La + Ua + Da$ (Equation 37)

The explanation of the configuration will be continued referring back to FIG. 10. As signals for controlling the deformable mirror, signals resulting from processing of the aforementioned output signals Xa trough Xab, Ya trough Yab and Sa trough Sab with a low pass filter will be used. The cut-off frequency of the low pass filter is set to a sufficiently lower value than the band of the reproduced signals of recording marks to avoid the effect of the modulation of the recording marks. It is even more preferable to set this cut-off frequency to a sufficiently lower value than the response frequency of the objective lens. The reason is that in this way wave front variation noises due to focusing errors and tracking errors can be averaged and thereby substantially reduce the effects of those noises. In the following description, the output signals Xa trough Xab, Ya trough Yab and Sa trough Sab all mean such signals having undergone processing with the low pass filter.

In this embodiment of the present invention, standardized outputs Xa/Sa trough Xab/Sab and Ya/Sa trough Yab/Sab are generated, a servo filter is figured out from state formulas in a matrix form as described with reference to Embodiment 1 of the invention, and the deformable mirror is so controlled as to make these outputs Xa/Sa trough Xab/Sab and Ya/Sa trough Yab/Sab to zero.

The outer circumferential region 63xx of the polarization hologram 63 performs the role of prescribing the aperture at a fixed value even if the angle of expansion from the light source 80 fluctuates, and the pattern of the hologram is so designed as to deflect ordinary rays in forward light outside the optical path to make them invalid stray light and, if transmitted extraordinary rays are reflected by the disk and come incident again as backward ordinary rays, to deflect them into positions where they would not affect the vertically divided photodetectors 81 and the horizontally divided photodetectors 82.

Reference will be made again to FIG. 9.

The detailed configurations of the photodetectors of the DVD laser module 69 and the polarization hologram 71 substantially the same as the contents described with reference to the laser module 60 and the polarization hologram 63. The differences between them are little, if at all, than that the optical path of red light beams are composed of a finite system, beams are brought to incidence on the polarization hologram 71 in the oval form before they are shaped into a circular form and a difference in specific design dimensions corresponding to the difference in laser wavelength.

The configurations of the photodetectors of the CD laser module 73 and the glass hologram 74, too, are basically the same as the contents described above. The differences from the configuration described above include a reduced number of localized areas into which the hologram pattern is divided for wave front phase detection on account of less exactness about the accuracy of correction, and the absence of a hologram pattern for wave front phase detection in positions where side beams are emitted or come incident with a view to compatibility with three-beam tracking detection. Further, as a glass hologram, not a polarization hologram, is used, there is no difference in behavior attributable to the direction of polarization.

Infrared light beams which are forward incident beams from the CD laser module 73 are first branched on the surface closer to the CD laser module 73 into three beams for tracking control use. Next, on the other surface, beams of the first and higher orders are deflected by a hologram pattern for deflection to photodetectors out of the optical path to become invalid stray light, and only zero-order beams are reflected by the optical disk 68 as valid infrared light beams to become backward light. Of the backward light beams, the +1st order beams are deflected by the photodetectors of the CD laser module 73. The zero-order backward light beams, which feedback light to the semiconductor laser, have no adverse effects, such as significant scooping, partly because of the relatively large quantity of feedback light.

Figure 12A:
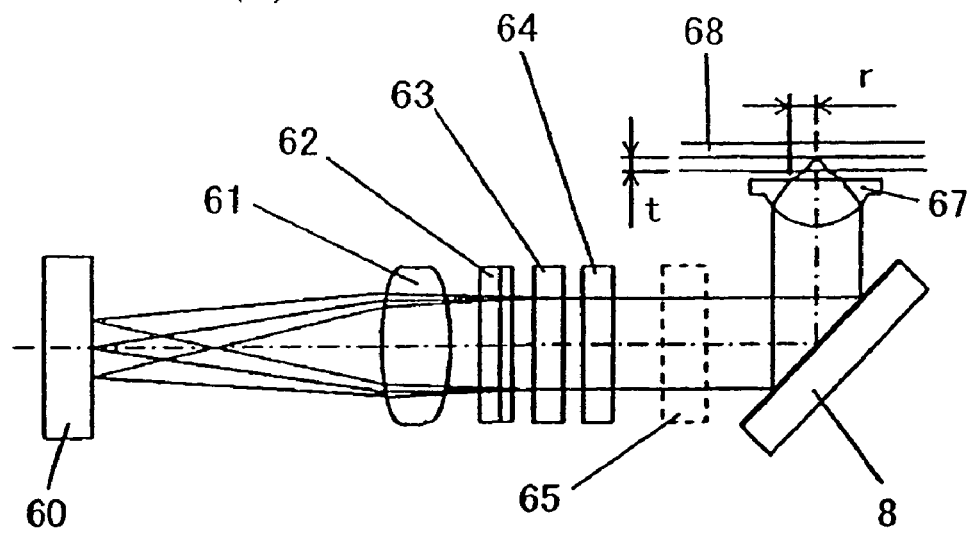
FIGS. 12(a) through 12(c) are schematic diagrams of optical systems of information recording devices, differentiated by the disk type, in Embodiment 2 of the invention.
Figure 12B:
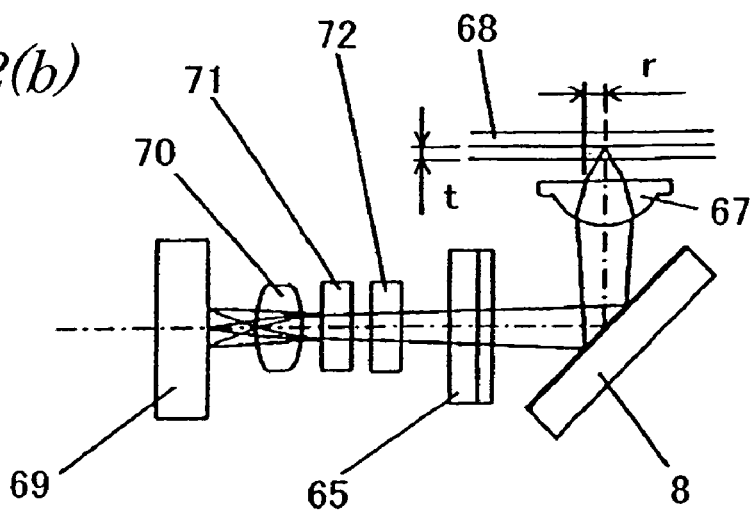
Figure 12C:
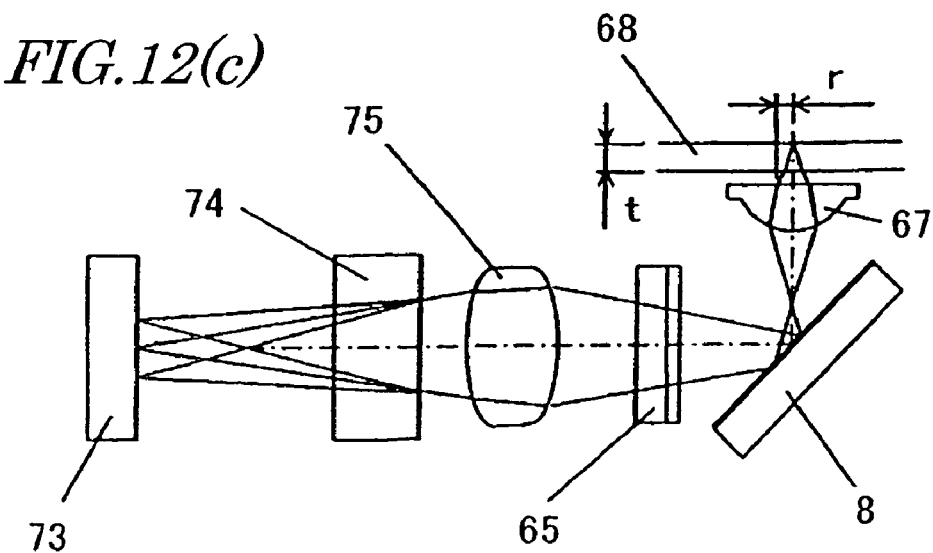

The operation of the information recording device configured as described above will be explained with reference to FIG. 12. FIG. 12 are schematic diagrams of optical systems of information recording devices, differentiated by the disk type, in Embodiment 2 of the present invention. FIG. 12(*a*) shows a blue light optical system for recording and reproducing onto or from blue light recording disks; FIG. 12(*b*), a red light optical system for recording and reproducing onto or from DVD disks; FIG. 12(*c*), an infrared optical system for reproducing from CD disks. The blue light optical system is an infinite system, while the red light optical system and the infrared optical system are finite systems; in particular, the infrared optical system is so disposed that the point of imaging by the lens 75 exist before the objective lens 67, i.e. between the lens 75 and the objective lens 67.

The optical system of every color is so designed as to minimize wave front aberrations anticipated in the design in a state in which the deformable mirror 8 is not operated, i.e. in a state in which the reflective surface is flat. Although the finite red light optical system and infrared optical system are more subject to wave front aberrations due to deviations from the ideal design state, such as changes in focusing position resulting from lens shifting or face imbalance, the stroke range of the actuators of the deformable mirror 8 is so prescribed that, even in the worst state of deviation, wave front aberrations at least may not go beyond the correctable range of the deformable mirror 8.

When the optical disk 68 is inserted by a loading mechanism and fitted to a disk motor (not shown), first the CD laser module 73 is caused to emit light, the objective lens 67 is shifted upwards for focusing, and it is judged whether or not the optical disk 68 is a CD disk. If the control track data of the optical disk 68 can be read and the optical disk 68 is judged to be a CD disk, the procedure shifts to the operation of usual CD reproduction. In any other case, the optical disk 68 is judged not to be a CD disk; next the DVD laser module 69 is caused to emit light for focusing, and it is judged whether or not the disk is a DVD disk. If the optical disk 68 is judged to be a DVD disk, the procedure shifts to the operation of DVD recording/reproduction; in any other case, the optical disk 68 is judged to be a blue light recording disk, the laser module 60 is caused to emit light for focusing, and the procedure shifts to the operation of recording onto or reproducing from a blue light recording disk.

By causing the CD laser module 73, the DVD laser module 69 and the laser module 60 to emit light in sequence and thereby identifying the type of the disk, it can be reliably prevent in the focusing operation the objective lens 67 from hitting against the optical disk 68.

In more general terms, priority is given to an optical system having a smaller numerical aperture NA closer to the light emitting side of the objective lens 67 for use in the identification of the disk type. In this configuration, the sequence of disk type identification is from NA=0.45 of the infrared optical system to NA=0.6 of the red light optical system and then to NA=0.85 of the blue light optical system. For the purpose of preventing the objective lens 67 from hitting against the optical disk 68, the above-described operation is particularly effective where the following conditions hold. First will be explained the collision focal distance f given by Equation 38. The collision focal distance f is defined as the distance from the disk surface to the focal point when the objective lens 67 has hit against the surface of the optical disk 68.

$$f = r \cdot \frac{(n^2 - NA^2)^{1/2}}{NA} \tag{Equation 38}$$

Here, n is the refractive index of the disk substrate, which is given as a typical value 1.55 for polycarbonate resin, for example; r, the pupil radius at the peak of the objective lens 67, i.e. in its nearest position to the optical disk 68, a value determined in the design of the optical system. This configuration is disposed to meet the conditions of r=0.57 mm and f=1.9 mm for the infrared optical system, r=0.63 mm and f= 1.5 mm for the red light optical system, and r=0.73 mm, f=1.1 mm for the blue light optical system.

In a combination wherein the disk substrate thickness t of the optical disk 68 is greater than the collision focal distance f, no detection can be done from the recording face of the disk, and in the focusing operation the objective lens 67 will hit against the surface of the optical disk 68. If, for instance, a CD disk (disk substrate thickness t=1.2 mm) is subjected to type identification using the blue light optical system, the objective lens 67 will run into collision because the disk thickness is greater than the collision focal distance f=1.1 mm. Therefore, if the condition of Equation 39 holds where t max is the greatest disk substrate thickness t of the acceptable optical disk 68 and f min, the smallest collision focal distance f of any optical system, disk discrimination is done by the prioritized use of an optical system whose numerical aperture NA is smaller on the light emitting side of the objective lens 67, and the possibility of such a collision-inviting combination of an optical disk and an optical system is securely eliminated. By dong so, the objective lens 67 can be reliably prevented from hitting against the optical disk 68 in the focusing operation.

$$t\ max < f min \tag{Equation 39}$$

After completion of the type identification of the optical disk 68, the information recording device drives a laser module in accordance with the result of identification. The subsequent part of the operation is similar to what was described of the configuration and the contents of description of the operation of Embodiment 1 for the invention.

As described so far, in this embodiment of the present invention, while forward light emitted from a light source having a plurality of wavelengths are being subjected to wave front detection, the detected wave fronts are corrected with the deformable mirror 8 and recording/reproduction is carried out by using a common objective lens 67, enabling interchanges among a plurality of types of optical disk 68 to be accurately accomplished with a simple configuration. Moreover, if various wave front aberrations including chromatic aberrations due to wavelength differences and spherical abberation ensuing from base thickness differences of the optical disk 68 are contained within a prescribed range by an appropriate optical design in advance, the remaining aberrations can be eliminated by wave front correction, making it possible to substantially enlarge the margins of designing against aberrations.

Also, as a finite optical system having the imaging point before the objective lens is used as the infrared optical system for CD disks, it is made possible to reproduce from CD disk equivalent to NA=0.45 by using an objective lens 67 whose NA is extremely great, as great as 0.85. Further, as the polarization hologram 63 deflects backward light in two directions differing from one to another of the regions 63a trough 63ab, and light is received by the vertically divided photodetectors 81 and the horizontally divided photodetectors 82 differing from each other in the direction of the dividing line, wave front components in two directions can be detected with effective utilization of diffracted beams, adjusting ease of detector positions, a low wiring density for outputs from the detectors and ease in wiring design.

Further, as backward light is divided into a plurality of regions 63a trough 63ab according to the conditions of interference by the grooves of the optical disk 68, and the conditions of interference are made substantially the same in the same region, accurate wave front detection can be accomplished even from backward light where the light intensity pattern is made complex by the interference of grooves.

Furthermore, since variations in wave front inclination within the detection regions, i.e. linear spatial differentials, are detected and synthesized into focusing error signals, the accuracy of detecting focusing errors can be prevented from deterioration even if the detection regions of the polarization hologram 63 are multi-sected to reduce the area of each region. Also, the operation by the discrimination unit for the optical disk 68 to identify the disk type in the sequence of a CD disk, DVD disk and a blue light recording disk makes it possible to prevent the objective lens 67 from hitting against the optical disk 68 in the focusing action.

(Embodiment 3)

Figure 13:
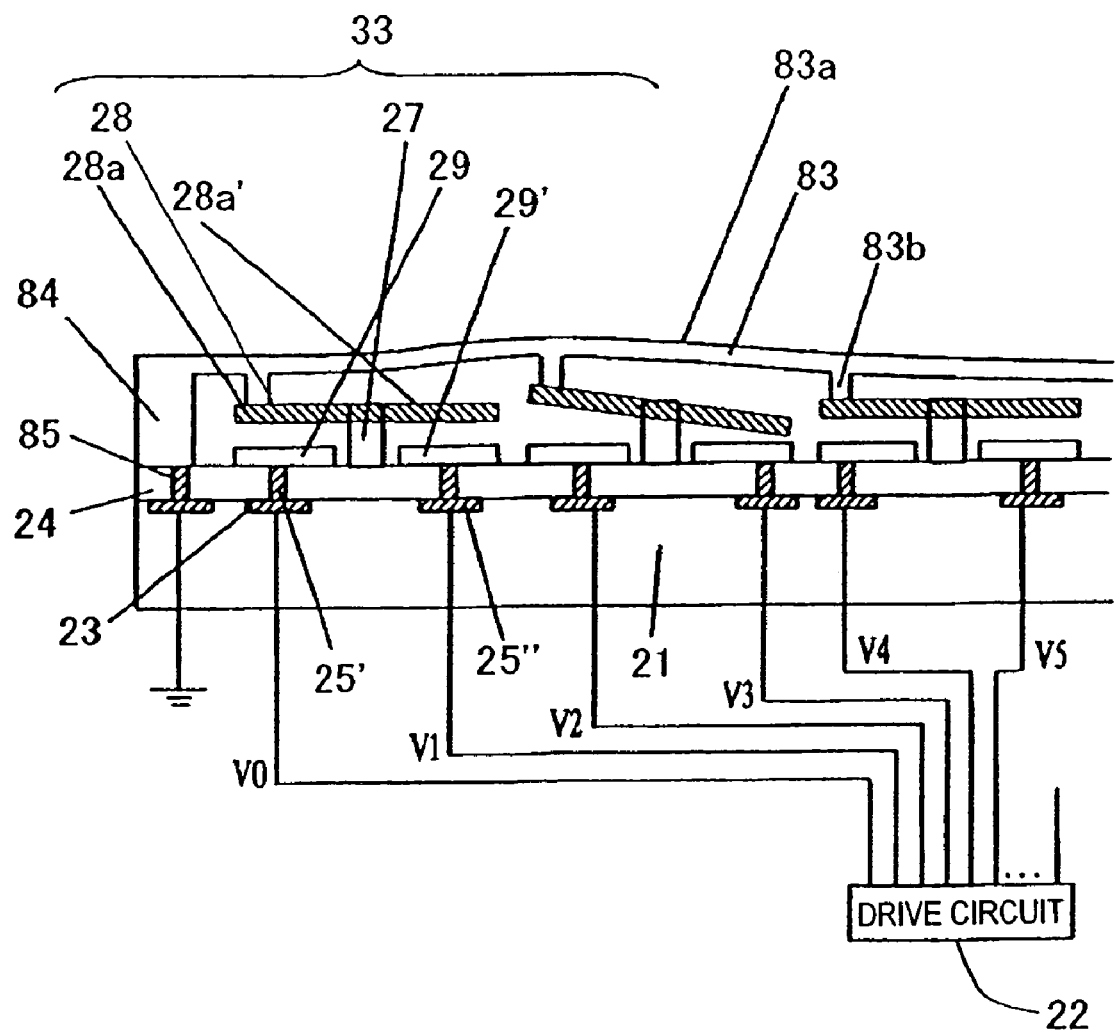
FIG. 13 is a schematic configurational diagram of a deformable mirror in Embodiment 3 of the invention.

A deformable mirror according to another embodiment of the present invention will be described with reference to FIG. 13. FIG. 13 shows a schematic configuration of this embodiment of the present invention. Incidentally in FIG. 13, common members with the first embodiment of the present invention are denoted by the same reference signs as their respective counterparts in FIG. 3.

The substrate 21 is formed of an Si material, whose thermal expansion coefficient is 2.8 trough $7.3 \times 10^{-6}$. A reflective film 83 is formed by sputter-vapor deposition of a metallic material having a greater thermal expansion coefficient than the substrate 21. Where the material of the reflective film 83 is Al, its thermal expansion coefficient is about $23.6 \times 10^{-6}$.

As the reflective film 83 is formed in a high temperature condition of about 450° C. and moreover is coupled to the substrate 21 at its periphery 84, because of the difference in thermal expansion coefficient, the reflective film 83 behaves to contract more than the substrate 21 does at 80° C., which is the temperature condition of actual use, to create an internal stress in the direction of tension. This securely keeps the reflective film 83 under tension all the time, thereby enabling the planar accuracy of the reflective surface 85a flattened by CMP to be maintained.

Coupling stubs 83b which couple the actuators 33 and the reflective film 83 to each other are formed of an Al material integrally with the reflective film 83 to establish electrical continuity between the yoke 28 and the reflective film 83. Further, the reflective film 83 is coupled the periphery 84 of the same Al material, and communicates with the interconnection layer 23 of the substrate 21 by way of via holes 85 bored in the insulating layer 24, being dropped to the ground potential from the interconnection layer. By forming in this way the reflective film 83 and the coupling stubs 83a integrally of an electroconductive material and coupling them with the electroconductive yoke 28, the wiring route to the yoke 28 can be simplified, and the wiring resistance can be substantially reduced as well. Moreover, since all elements from the actuators 33 to the reflective film 83 are formed of one and the same material, the manufacturing process can be simplified and its productivity improved.

(Embodiment 4)

Figure 14A:
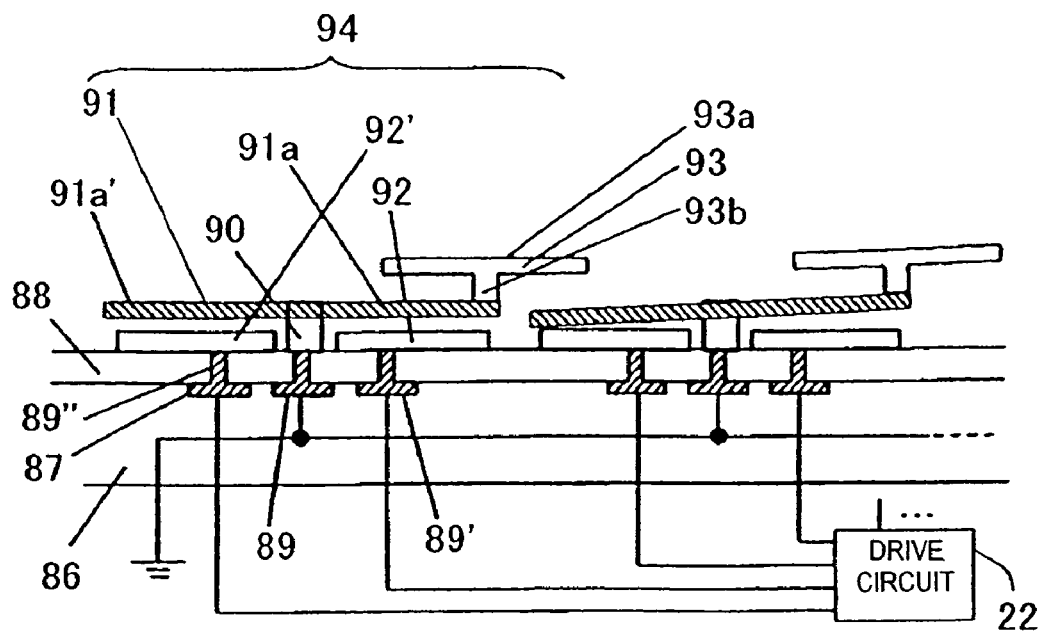
FIGS. 14(a) and 14(b) are schematic configurational diagrams of a deformable mirror in Embodiment 4 of the invention.
Figure 14B:
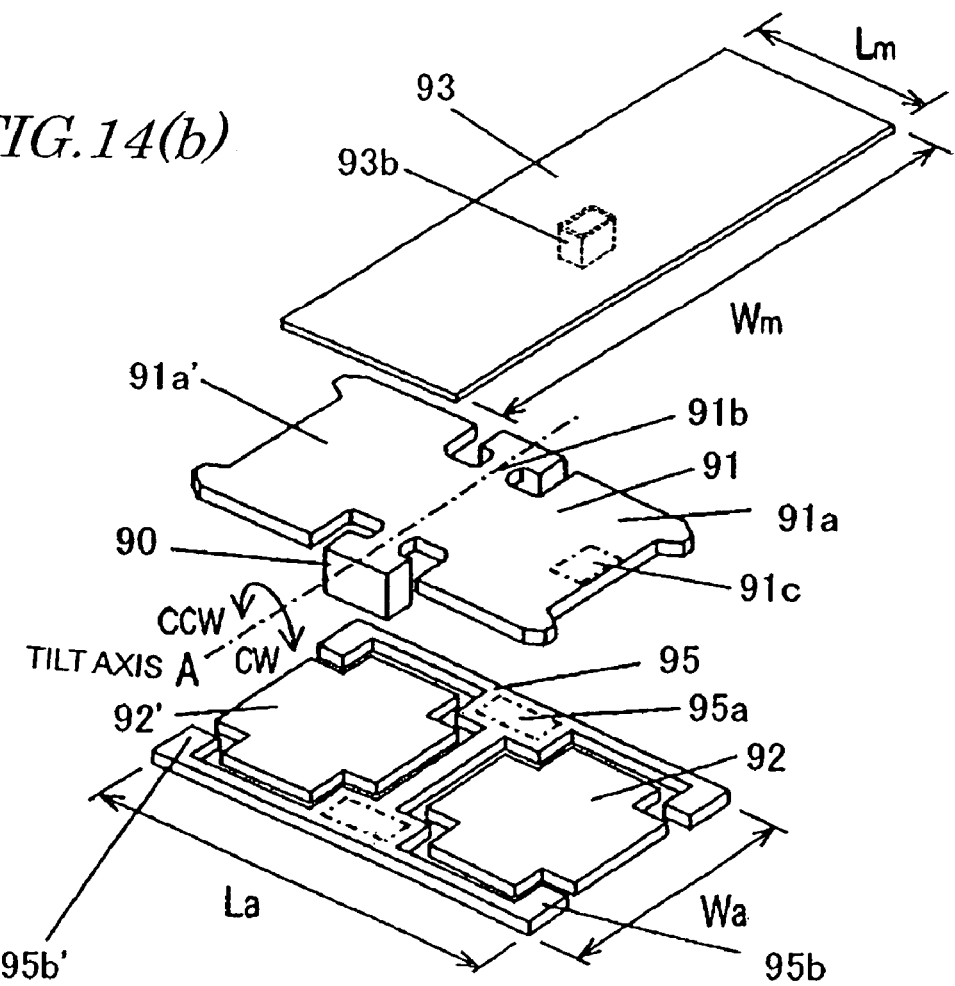

A deformable mirror in another embodiment of the present invention will be described while referring to FIG. 14. FIG. 14(*a*) schematically shows a section of the deformable mirror, and FIG. 14(*b*), an exploded perspective view of actuators 94 and reflectors 93.

In FIG. 14(*a*), a substrate 86, a interconnection layer 87, an insulating layer 88, and via holes 89, 89' and 89" have substantially the same configurations as the substrate 21, the interconnection layer 23, the insulating layer 24, and the via holes 25, 25' and 25", respectively, in Embodiment 1, but are different in the positions of arrangement and some other respects.

The configuration in this embodiment of the present invention differs from that in Embodiment 1 mainly in that the reflectors 93 consist of a plurality of micromirrors separated from one another, and an actuator 94 is coupled to each of the reflectors 93.

As shown in FIG. 14(*b*), a base 95 in this embodiment of the present invention has a substantially rectangular shape of a length La and a width Wa. La and Wa determine the dimensions of a unit cell one actuator 94 occupies. Such a unit cell matches the area occupied by each actuator where the actuators 94 are laid with no blank space in-between, but is not identical with the dimensions of a yoke 91. Hereinafter the length La and the width Wa of the actuators 94 will be used in this sense.

In this embodiment of the present invention, as the length La is set to be greater than the width Wa, the lengthwise direction the actuators 94 crosses the tilt axis A orthogonally. The base 95 comprises supporting post fitting portions 95a and yoke contacting portions 95b and 95b'. Their functions are the same as their counterparts described with reference to Embodiment 1.

The yoke 91 is connected to supporting posts 90 via hinge portions 91b, and can be rotated round the tilt axis A by twist deformations of the hinge portions 91b.

The reflectors 93 operate independently of one another. It is possible to make the hinge portions 91b as much more rigid than their counterparts in Embodiment 1 as the load which would otherwise result from the deformation of these reflectors 93 but are absent here. The yoke 91 has a first portion 91a and a second portion 91a' separated right and left with the tilt axis A in-between, and the first portion 91*a* is in a position opposite a first fixed electrode 92 with a gap between them while the second portion 91*a*' is in a position opposite a second fixed electrode 92' with a gap between them. Further, the yoke 91 is coupled to a coupling stub 93*b* at a yoke's free end 91*c* indicated by one-dot chain lines. The yoke's free end 91*c* is within the region of the first portion 91*a* of the yoke 91, and positioned at a prescribed distance from the tilt axis A. As was stated with reference to Embodiment 1, this distance can be differentiated from actuator to actuator. The yoke 91, the supporting posts 90 and the base 95 are all formed of an Al material and have the same electric potential.

The reflectors 93 differ from the actuators 94 in the lengthwise direction, and are in a substantially rectangular shape having the tilt axis A as their lengthwise direction, with the width Wm greater than the length Lm. The reflectors 93, also formed of an Al material, are substantially rigid bodies, each having on its surface a reflective surface 93*a*. The coupling stubs 93*b* are formed in the same Al sputter-vapor deposition process as the reflectors 93 are. When a difference in electric potential is given between the first fixed electrode 92 and the yoke 28 or between the second fixed electrode 92' and the yoke 28, an electrostatic force rotates the yoke 28 round the tilt axis A either clockwise CW or counterclockwise CCW, and the reflectors 93 coupled to the yoke 91 via the coupling stubs 93*b* are displaced in two directions including the downward direction toward the substrate (not shown) and the upward direction away from the substrate.

In this process, although the reflectors 93 do not only move in purely vertical directions but also are inclined by the same angle as the inclination of the yoke 91, the angle of inclination relative to the displacement can be kept very small because the shape of the actuators 94 has the direction normal to the tilt axis A as its lengthwise direction and the shape of the reflectors 93 has the direction of the tilt axis A as its lengthwise direction. Furthermore, the area Lm×Wa of the reflectors 93 is as large as 90% or more of the area La×Wa of the actuators to prevent the reflected luminous energy from decreasing. Therefore, the width Wm of the reflectors is greater than the width Wa of the actuators, and the projective dimensions of the reflectors 93 are so provided as to partly overrun the dimensions of the actuators 94. In such a configuration, too, it is possible to prevent the reflectors 93 from overlapping one another when a plurality of the actuators 94 are arranged. How such an arrangement can be achieved will be described with reference to FIG. 15.

Figure 15:
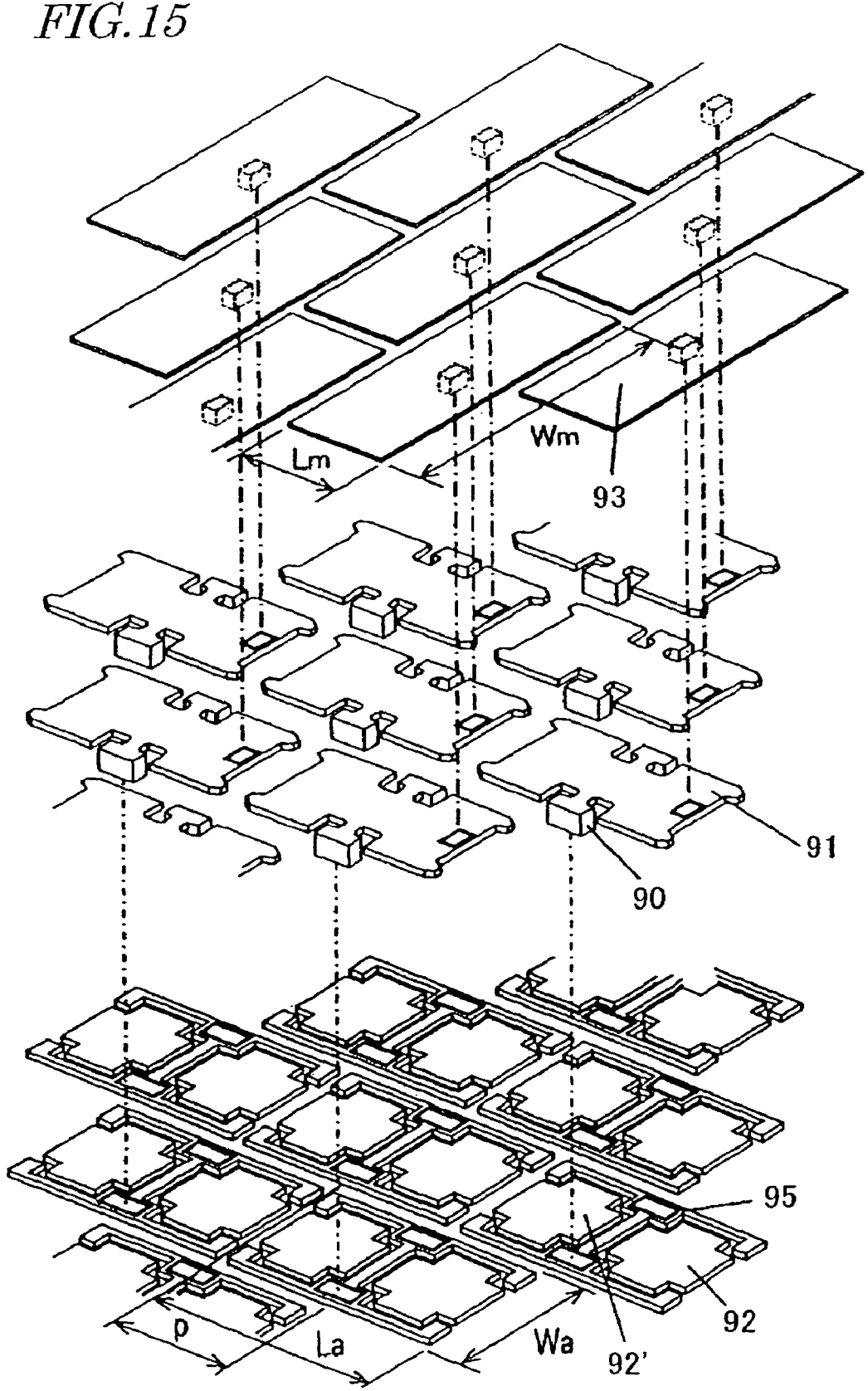
FIG. 15 is a diagram showing the arrangement of an actuator and a reflector in Embodiment 4 of the invention.

FIG. 15 is a diagram showing the arrangement of the actuators 94 and the reflectors 93 in Embodiment 4 of the present invention. Although each base 95 is depicted noticeably apart from the adjoining bases 95 in the drawing to make their boundaries readily recognizable, actually these gaps are either extremely narrow or zero.

The actuators 94 adjoining in the direction normal to the tilt axis A are arranged without lags, but adjoining in the direction of the tilt axis A are arranged with lags of p=La/k each, where k is a number greater than 1 and k=2 in the drawing. The length Lm and the width Wm of the reflectors 93 are determined to satisfy the conditions of Equation 40 and Equation 41.

$$Lm < p \quad \text{(Equation 40)}$$

$$Wa < Wm < k \cdot Wa \quad \text{(Equation 41)}$$

The length Lm and the width Wm of the reflectors 93 determined to satisfy these conditions make it possible to suppress interference between the reflectors 93 themselves and their inclinations accompanying displacements in the vertical directions and at the same time to enhance the efficiency of reflection.

As described above, as the reflectors 93 consist of a plurality of micromirrors separated from one another and an actuator 94 is coupled to each of the reflectors 93 in this embodiment, the displacements of the reflectors 93 can be controlled for each actuator 94 in complete independence, and accordingly the control operation can be simplified and improved in responsiveness.

(Embodiment 5)

Figure 16A:
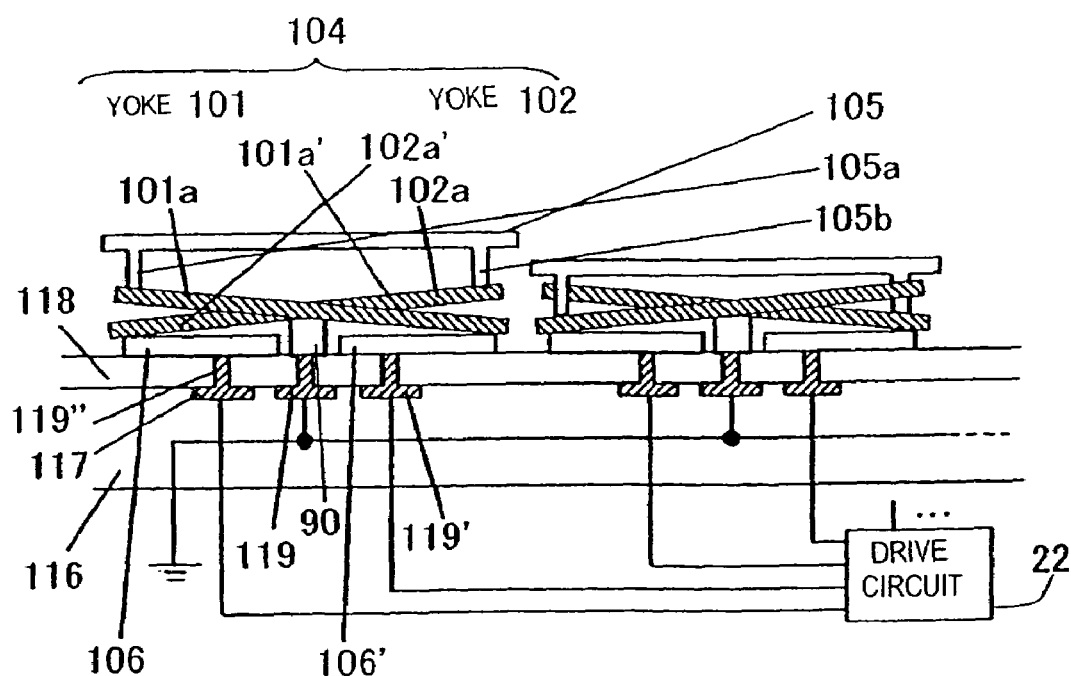
FIGS. 16(a) and 16(b) are schematic configurational diagrams of a deformable mirror Embodiment 5 of the invention.
Figure 16B:
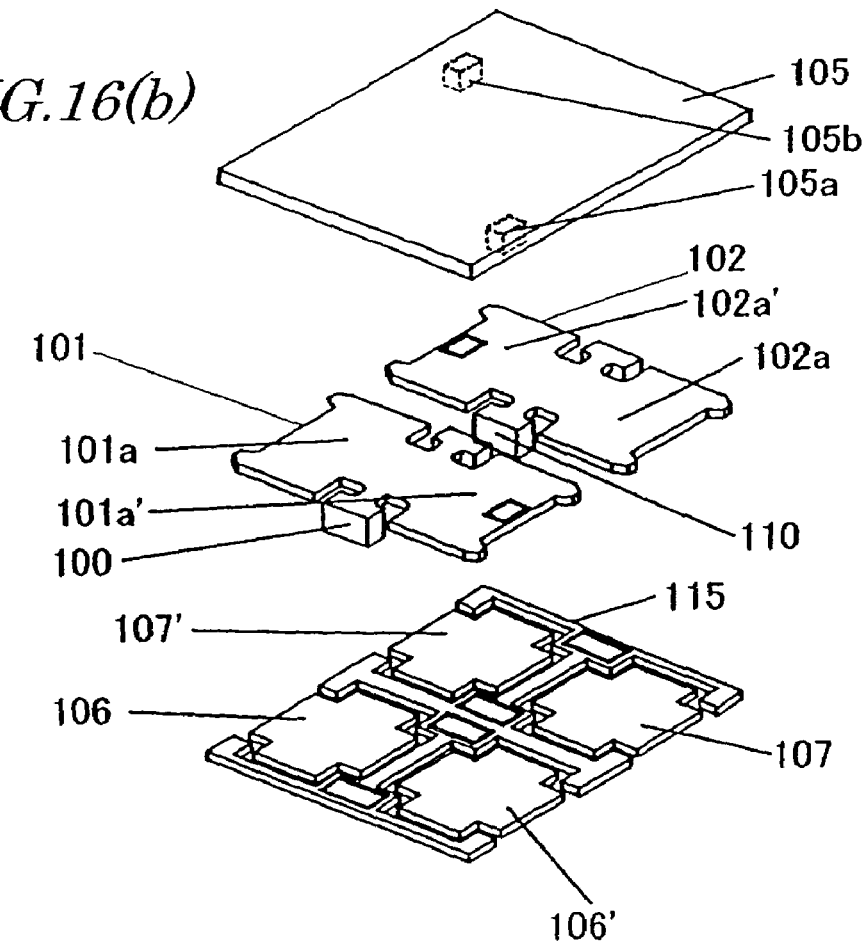

A deformable mirror according to Embodiment 5 of the present invention will be described while referring to FIGS. 16(*a*) and 16(*b*). FIG. 16(*a*) shows a schematic section of the deformable mirror, and FIG. 16(*b*) shows an exploded perspective view of an actuator 104 and a reflector 105. This configuration particularly differs from Embodiment 4 in that the reflector 105 is coupled at two points, i.e. the actuator 104 including a pair of yokes 101 and 102 and coupling stubs 105*a* and 105*b*, and thereby enable to shift up and down in parallel (in stroke actions).

In FIG. 16, details of supporting posts 100 and 110, the yokes 101 and 102, first fixed electrodes 106 and 107, second fixed electrodes 106' and 107', a base 115, a the substrate 116, a interconnection layer 117, an insulating layer 118, via holes 119, 119' and 119" are substantially the same as what was described with reference to Embodiment 4.

In positions opposite first and second portions 101*a* and 110*a*' of the yoke 101 are arranged the first and second fixed electrodes 106 and 106', and in positions opposite first and second portions 102*a* and 102*a*' of the other yoke 102 are arranged the first and second fixed electrodes 107 and 107'. The first fixed electrodes 106 and 107 are electrically connected and provided to be equal in electric potential, and similarly the second fixed electrodes 106' and 107' are electrically connected and provided to be equal in electric potential.

The reflector 105 is coupled to the first portion 111*a* of the yoke 101 via the coupling stub 105*a* and to the first portion 102*a* of the yoke 102 via the coupling stub 105*b*.

The shape and dimensions of the reflector 105 are so determined as to make its rigidity sufficiently greater than that of the coupling stubs 105*a* and 105*b*.

In FIG. 16(*a*), the state of the reflector 105 when drive voltages are given to the second fixed electrodes 106' and 107' from the drive circuit 22 is shown on the left side. When drive voltages are given to the fixed electrode 106' and 107', the second portion 110*a*' of the yoke 101 and the second portion 102*a*' of the yoke 102 are attracted towards the fixed electrodes, and the reflector 105, while keeping its parallel state, shifts in the direction of going away from the substrate 116.

Also, the state of the reflector 105 when, conversely, drive voltages are given to the first fixed electrodes 106 and 107 from the drive circuit 22 is shown on the right side. When drive voltages are given to the fixed electrodes 106 and 107, the first portion 110*a* of the yoke 101 and the first portion 102*a* of the yoke 102 are attracted towards the fixed electrodes, and the reflector 105, while keeping its parallel state, shifts in the direction of approaching the substrate 116.

As described so far, the reflector 105 can shift in the direction normal to the substrate while keeping its parallel state in this embodiment of the present invention, and adverse effects accompanying any inclination of the reflector 105 can be averted.

While in the configuration in this embodiment of the present invention described above the first fixed electrodes 106 and 107 are equalized in electric potential, the second fixed electrodes 106' and 107' are equalized in electric potential and the reflector 105 are shifted in parallel, a two-dimensional inclination can as well be given if drive voltages for the fixed electrodes 106, 106', 107 and 107' are individually set to different levels.

(Embodiment 6)

An optical compensation device in an embodiment of the present invention will be described below while referring to FIG. 17.

Figure 17:
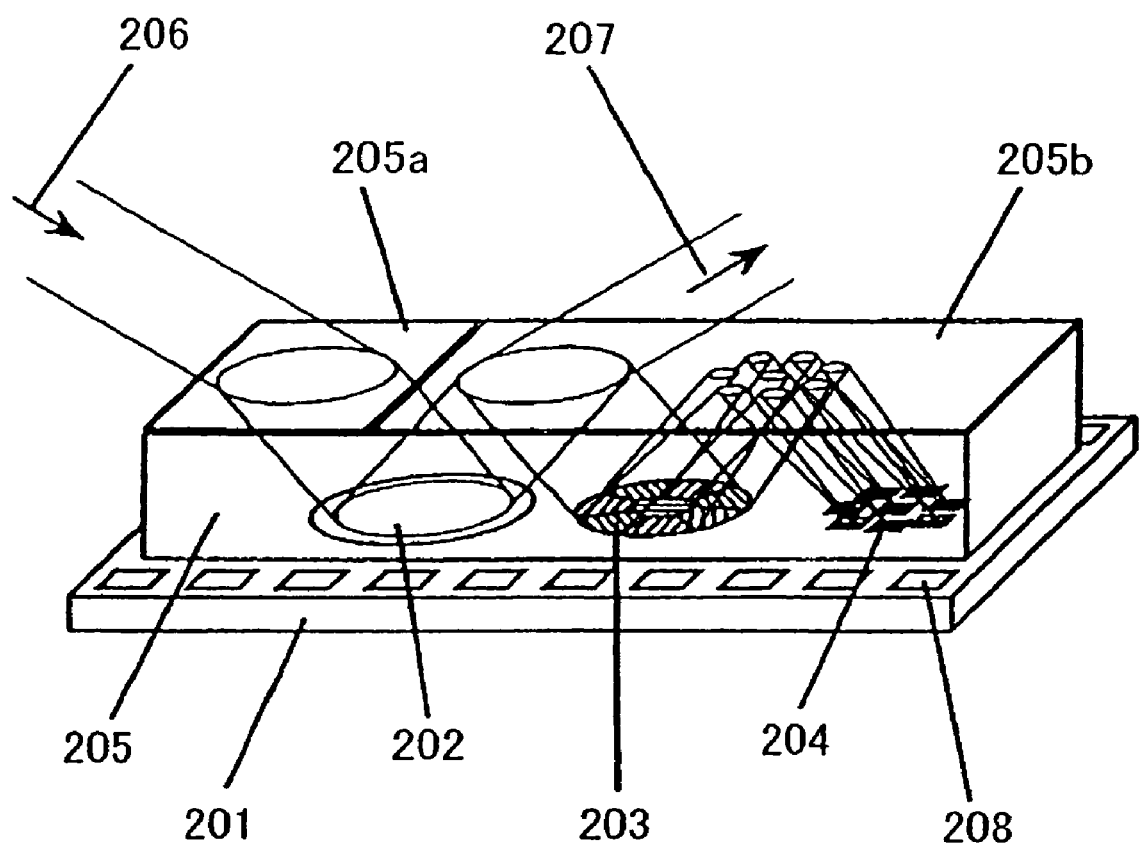
FIG. 17 is a schematic configurational diagram of an optical compensation device in Embodiment 6 of the invention.

As shown in FIG. 17, a deformable mirror 202, a hologram 203 and an optical detector 204 is integrated over a semiconductor substrate 201 of silicon or the like in this embodiment. Also integrated over the semiconductor substrate 201 are circuits concerned with amplification and arithmetic processing of the output signals of the optical detector 204 and the driving of the deformable mirror 202.

Further, a flat glass sheet 205 is mounted over the semiconductor substrate 201; on one part of the top face of the flat glass sheet 205 is formed an antireflection film 205a is formed, and on another part is formed a polarizing splitter film 5b which transmits P polarized beams and reflects S polarized beams.

Incident light 206, whose wave fronts of are still uncorrected, come incident on the flat glass sheet 205 through the antireflection film 205a and are reflected by the deformable mirror 202 to undergo wave front correction. Of these reflected light, P polarized beams become emitted light 207 which are emitted outside through the polarizing splitter film 205a. Out of the reflected light, S polarized beams are reflected by the polarizing splitter film 205a to be directed to the semiconductor substrate 201 again, and come incident on the hologram 203. The hologram 203 divides these S polarized beams into a plurality of detection regions, and deflects the beams on focal points differing from one detection region to another. The light beams of the different detection regions deflected by the hologram 203 are again reflected by the polarizing splitter film 205a and focus on the semiconductor substrate 201.

On each of these focuses is provided a quadrisected optical detector 204, and variations in focal position can be detected by comparing the output signals of the divided parts. These output signals of the optical detector 204 undergo computation and reconstruction of the wave fronts of the incident light 206 by a wave front reconstructing unit (not shown) provided over the semiconductor substrate 201, and the deformable mirror 202 is controlled on this basis. Reference numeral 208 denotes posts wire-bonded to leads when the semiconductor substrate 201 is to be packaged.

Figure 18:
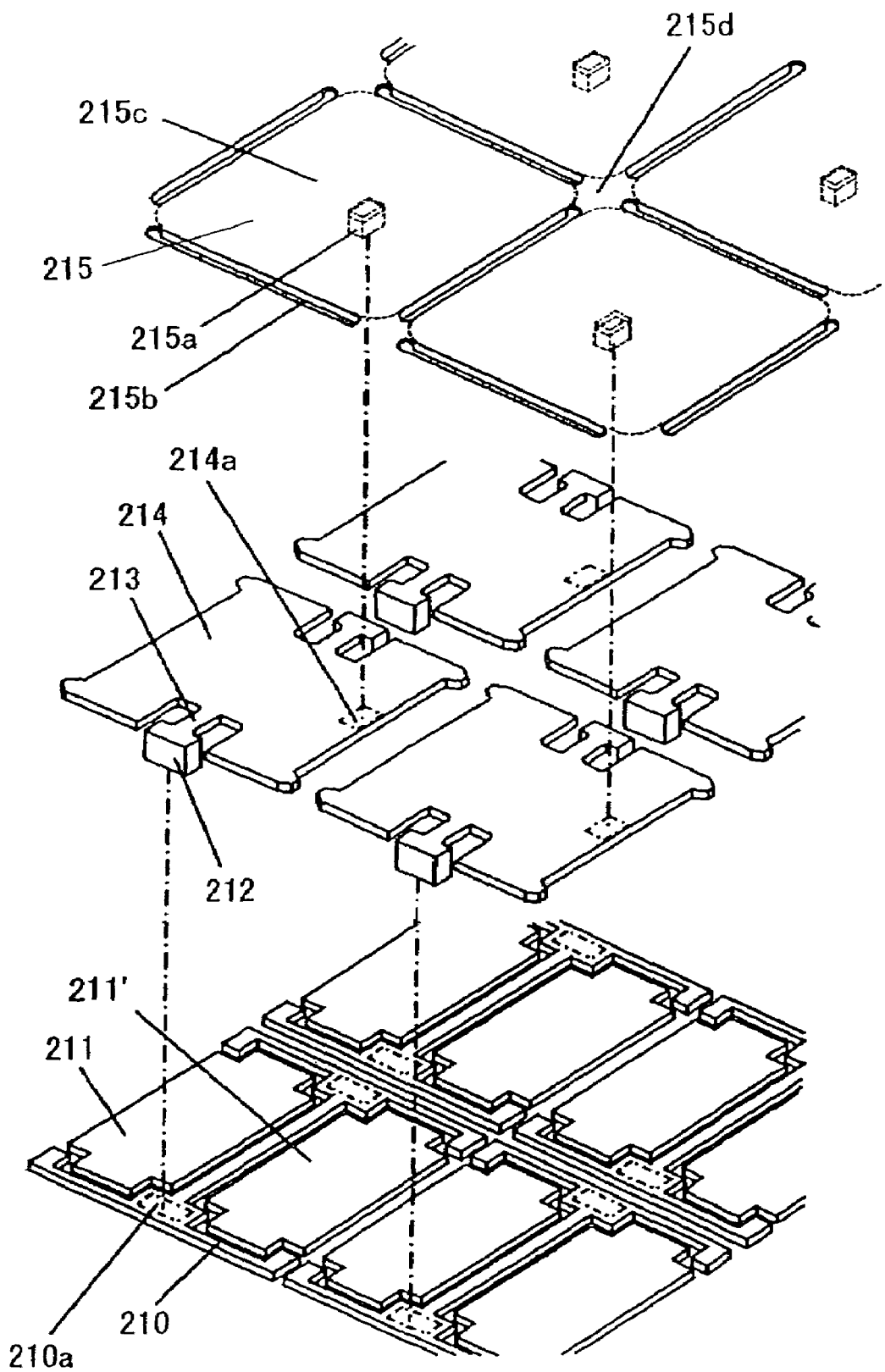
FIG. 18 is an enlarged exploded perspective view of a deformable mirror in Embodiment 6 of the invention.
Figure 19:
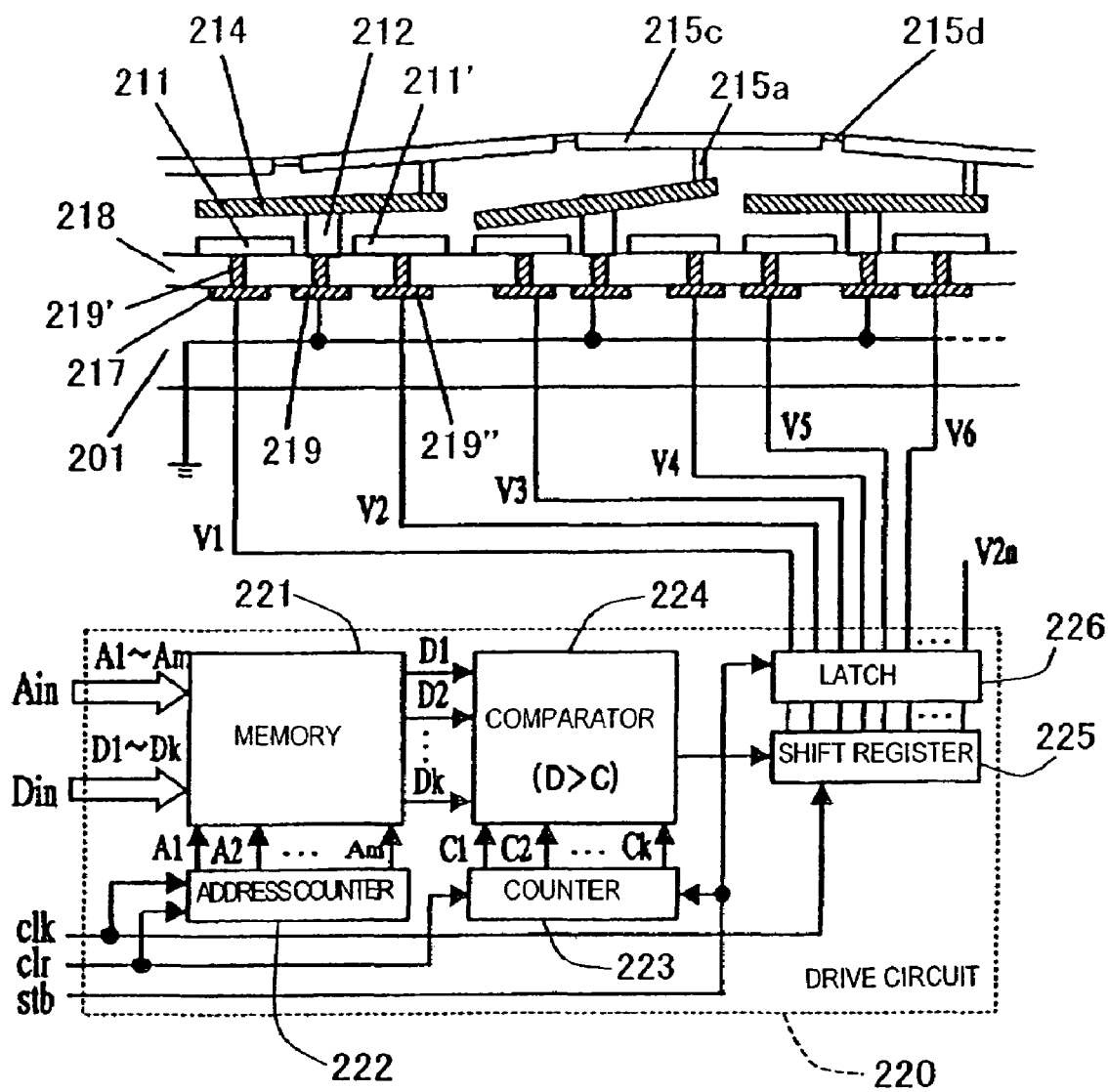
FIG. 19 is a schematic configurational diagram of a deformable mirror in Embodiment 6 of the invention.

The configuration of the deformable mirror 202 will be described with reference to FIG. 18 and FIG. 19. FIG. 18 is an enlarged exploded perspective view of the deformable mirror 202 in this embodiment of the present invention. In FIG. 18, a base 210, formed over an insulating layer (not shown) of the semiconductor substrate 201, is formed by etching from the same Al layer as first and second electrodes 211 and 211'. A supporting post 212 is fitted to the base 210 at a supporting post fitting portion 210a, and supports a yoke 214 via a pair of hinges 213. The supporting post 212, the hinges 213 and the yoke 214 are also formed by etching from the same Al layer, and the base 210 and the yoke 214 are equal in electric potential. The yoke 214, which is in a planar shape of 1 μm in thickness, opposes a first electrode 211 and a second electrode 211' with a gap of a few μm in-between; if a difference in electric potential is provided between one of the electrodes and the base 210, the yoke 214 will be tilted by an electrostatic force either clockwise or counterclockwise. To the free end 214a of the yoke 214 is fitted a reflector 215 via a coupling stub 215a.

The reflector 215 is configured-of polycrystalline silicon, and its top surface is a flat reflective surface. Reference sign 215b denotes holes penetrating the reflector 15; 215c, a reflector main body demarcated by the holes 215b in a substantially square shape; and 215d, links linking the reflector main body 215c at four corners. The film thicknesses of the reflector main body 215c and the links 215d are 1 μm and 0.2 μm, respectively, and the film thickness of the reflector main body 215c is greater than that of the links 215d. This serves to increase rigidity within each reflector main body 215c, to prevent the residual stresses of films from inviting unnecessary deformations to deteriorate mirror surface accuracy, and to enhance drive responsiveness by utilizing the flexibility of the links 215d.

Except the portions coupled by the coupling stubs 215a, there is a gap of a few μm between the yoke 214 and the reflector 215. This gap and the gaps between the yoke 214 and the first and second electrodes 211 and 211' are provided by, after forming in advance a sacrificial layer made of an organic material where the gaps are to exist, removing finally this layer by plasma etching. Here, the reflector 215 is planarized, before this sacrificial layer is removed, by subjecting the reflective surface to CMP processing. When a difference in electric potential is given between the first electrode 211 and the yoke 214, the yoke 214 rotates counterclockwise, and the reflector 215 is driven upwards, i.e. in the direction of moving away from the semiconductor substrate 201. When a difference in electric potential is given between the second electrodes 211' and the yoke 214, the yoke 214 rotates clockwise, and the reflector 215 is driven downwards, i.e. in the direction of approaching the semiconductor substrate. Such a configuration enables the deformable mirror 202 to control the reflector 215 in any desired shape with drive voltages applied to the first electrode 211 and the second electrode 211' corresponding to each yoke 214.

Next will be described the configuration of the drive circuit of the deformable mirror 202 with reference to FIG. 19. FIG. 19 is a schematic configurational diagram of the deformable mirror 202 in this embodiment of the present invention.

The drive circuit 220 of the deformable mirror is configured of a CMOS formed over a semiconductor substrate 1. In FIG. 19, only the block configuration, to be described afterwards, of the drive circuit 220 is shown, and detailed sections of n- and p-channel MOSFETs are dispensed with. An Al interconnection layer 217, which is the top layer, is typically illustrated. Over this Al interconnection layer 217 is provided an $SiO_2$-based insulating layer 18, and the top layer of the insulating layer 218 is planarized by CMP. In the insulating layer 218 are bored via holes 219, 219' and 219" for establishing electrical contacts with required parts of the interconnection layer 217.

The yoke 214 is connected to the interconnection layer 217 via the supporting post 212 and the via holes 219, and kept at the ground potential (hereinafter this electric potential will be denoted by L) all the time. The first and second electrodes 211 and 211' are connected to the interconnection layer 217 through the via holes 219' and 219", respectively, and controlled to electric potentials V1 and V2. V1 and V2 are switched over between the ground potential L and a high electric potential (5 V here; hereinafter this electric potential will be denoted by H) by the drive circuit 220. Either V1 or V2 is controlled to H, and the attraction of the yoke 214 towards the electrode in the H state by an electrostatic force causes the yoke 214 to generate a rotational force either clockwise or counterclockwise. The magnitude of the rotational force can be adjusted by controlling the duration of holding the H sate with k bits (at $2^k$ steps). When no rotational force is generated, both V1 and V2 are set to the L electric potential. The set of the yoke 214 and the first and second electrodes 211 and 211' supported by the supporting post 212 will hereinafter be referred to as the actuator.

The drive circuit 220 is intended to perform the H/L time control of output voltages V1 trough V2n to the electrodes by inputting control data Din representing the address Ain and the drive force of each electrode of the actuator. The drive circuit 220 is configured of a memory 221, an address counter 222, a counter 223, a comparator 224, a shift register 225 and a latch 226. The address Ain is supposed to be in m bits; the control data Din, in k bits; the number of actuators, n; and the number of electrodes, 2n.

The memory 221 is a memory for storing control data Din corresponding to each of the addresses Ain. The address counter 222 gives m-bit addresses to the memory 221, and causes 2n sets of control data to be sent out serially. The address counter 222 is reset with an initialization (clr) signal, and counted up with a clock (clk) signal. The counter 223 a k-bit incremental counter which is reset with an initialization (clr) signal and, after having read out 2n sets of control data, is counted up with a strobe (stb) signal.

The comparator 224 compares the output of the counter 223 and the k-bit data in the memory 221, and sends out one-bit serial data to the shift register 225. If the data in the memory 221 are found greater than the output of the counter 223, it will output 1(H) or otherwise, 0(L). The shift register 225 is a 2n-bit shift register operating in response to the clk signal, and the latch 26 is a 2n-bit latch which latches the value of the shift register 225 in response to the stb signal.

The operation of this drive circuit 220 will be described. The k-bit control data written in the memory 221 are read out at a rate of 2n sets consecutively according to an m-bit address provided by the address counter 222. When the address counter 22 has run a round and all the control data in the memory 221 have been read out, it stores the data accumulated in the shift register 225 into the latch 226 at the stb signal, at the same time counts up the output of the counter 223, and again reads out the contents of the memory 221 from the beginning. To refer to this cycle as T, this constitutes the smallest unit of electricity flow duration to the actuator. The electricity flow duration is controlled by repeating this cycle T $2^k$ times, $2^k$ being determined by the number of steps of the counter 223. Although the same control data are read out of the memory 221 in every cycle then, the output of the comparator 224 is reduced to 0 along with the drop of the output of the memory 221 to or below the count of the counter 223 because the count of the counter 223 increases every cycle. Therefore, the output of the latch 226 can be controlled in proportion to the inputted control data Din at the minimum resolution in parallel with the control of the duration of electricity flow to the fixed electrodes of all the actuators.

Figure 20A:
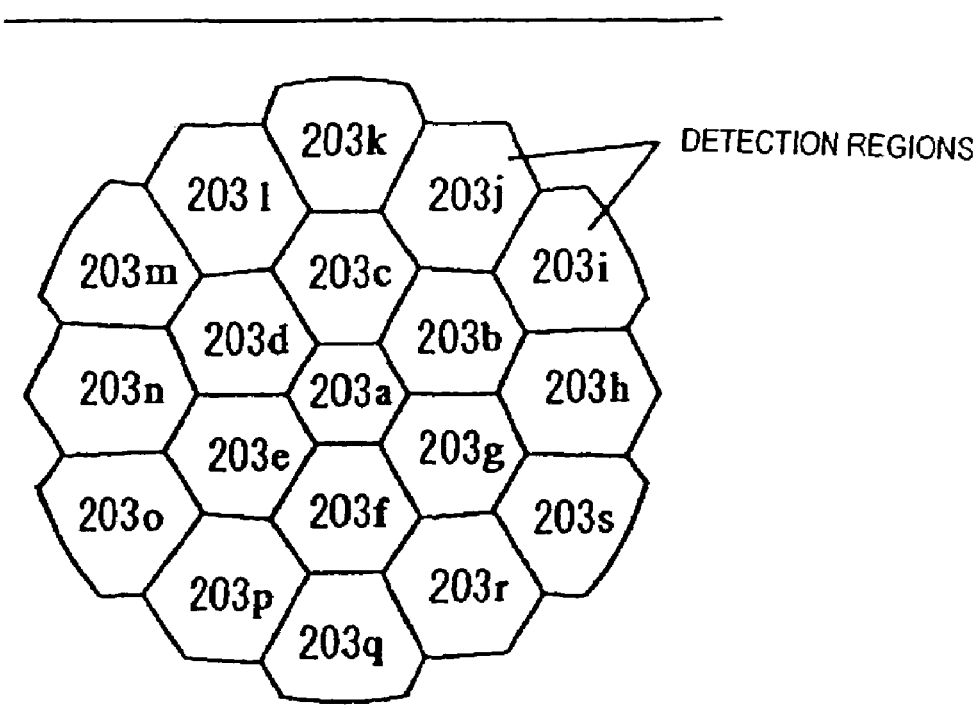
FIGS. 20(a) and 20(b) are schematic configurational diagrams of a hologram in Embodiment 6 of the invention.
Figure 20B:
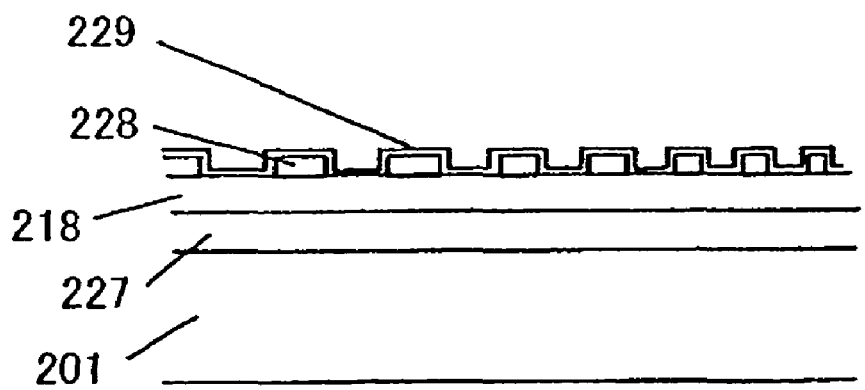

Next will be described the configuration of the hologram 203 with reference to FIG. 20. FIG. 20 are schematic configurational diagrams of a hologram in Embodiment 1 of the invention. FIG. 20(*a*) shows a plan of a hologram 3. The hologram 3 is divided into 19 detection regions, i.e. areas 3*a* trough 3*s*, and in each detection region is formed a hologram pattern for deflecting incident light beams onto a prescribed focal point. While a different detection region has a different focal point, it is so designed that all the focal points, when reflected by a polarizing splitter film on a planar glass sheet (not shown), be positioned on the surface of the semiconductor substrate. The hologram pattern is formed by using as a mask image a zone plate computed by a computer as the interference pattern between a plane wave, which is incident light, and a spherical wave, which is emitted light, and transferring it onto the semiconductor substrate 1 by photolithography. To add, the focal points are designed and arranged so that higher-order light from each detection region may not substantially overlap focal points in other detection regions.

FIG. 20(*b*) shows an enlarged section of the hologram 203. A hologram pattern layer 228 is formed over the $SiO_2$-based insulating layer 218. The insulating layer 218 is formed over a circuit formation layer 227 formed over the semiconductor substrate 201 for control circuits and the like, and its top face is planarized by CMP as described with reference to FIG. 19. The hologram pattern layer 228 is produced by using as the mask shape an interference pattern generated by a computer hologram and selectively etching by photolithography a polycrystalline silicon film grown to a depth of about ¼ of the detection wavelength. The etching is accomplished with a magnetron RIE using chlorine gas, and a high selection ratio to the $SiO_2$ insulating layer 218 is achieved. After forming the hologram pattern layer 228, a thin film of Al or the like is formed by sputtering as a reflective film 229 with a view to enhancing the reflection factor.

Figure 21A:
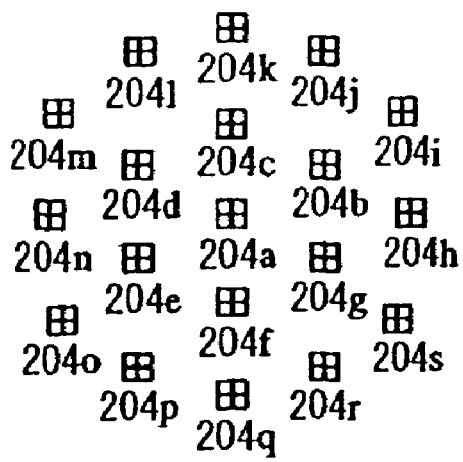
FIGS. 21(a) through 21(c) are schematic configurational diagrams of an optical detector in Embodiment 6 of the invention.
Figure 21B:
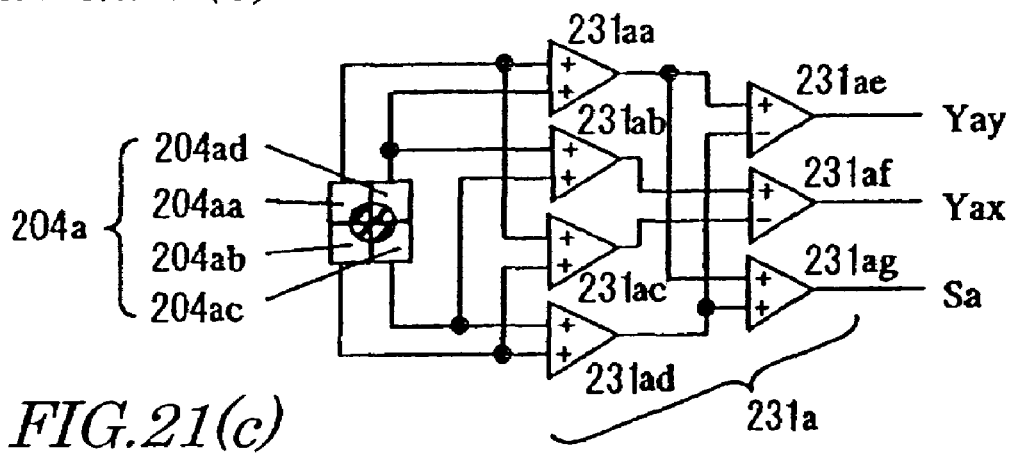
Figure 21C:
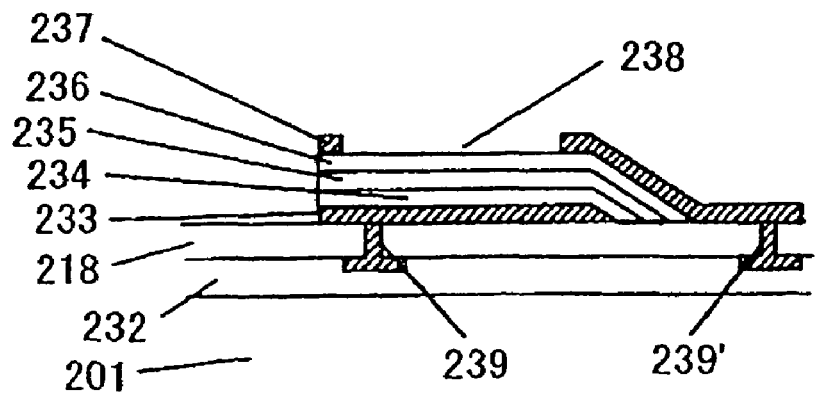

Next will be described the configuration of the optical detector 204 with reference to FIG. 21. FIG. 21 are schematic configurational diagrams of the optical detector 204 in this embodiment of the present invention. As shown in FIG. 21(*a*), 19 quadrisected photodiodes 204*a* trough 204*s* are arranged in the optical detector 204 in positions corresponding to focal points in the hologram. Deviations of focal points are detected from the outputs of these quadrisected photodiodes 204*a* trough 204*s*, and local variations in the wave fronts of incident light are thereby detected. Taking up the quadrisected photodiodes 204*a* as an example, the configuration for generating output signals will be explained with reference to FIG. 21(*b*). FIG. 21(*b*) is a configurational diagram of the quadrisected photodiode 204*a* and a preamplifier 231*a*. In the drawing, the quadrisected photodiode 204*a* is divided into areas 204*aa* trough 204*ad* by a dividing line extending in the horizontal direction and another dividing line extending in the vertical direction. The preamplifier 231*a* consists of a group of seven amplifiers in total including four former stage preamplifiers 231*aa* trough 231*ad*, two latter stage differential amplifiers 231*ae* and 231*af*, and one amplifier 231*ag*.

The output of the area 204*aa* is inputted to the preamplifiers 231*aa* and 231*ac*; the output of the area 4*ab*, to the preamplifiers 231*ac* and 231*ad*; the output of the area 4*ac*, to the preamplifiers 231*ab* and 231*ad*; and the output of the area 4*ad*, to the preamplifiers 231*aa* and 231*ab*, these outputs being amplified and added. The output of the preamplifier 231*aa* is inputted to the + side of the differential amplifier 231*ae* and the amplifier 231*ag*; the output of the preamplifier 231*ab* to the + side of the differential amplifier 231*af*; the output of the preamplifier 231*ac* to the − side of the differential amplifier 231*af*; and the output of the preamplifier 231*ad*, to the − side of the differential amplifier 231*ae* and the amplifier 231*ag*. This causes the differential amplifier 231*ae* to give an output Yay; the differential amplifier 231*af*, an output Yax; and the amplifier 231*ag* an output Sa.

The output Yay here is a signal pertaining to the displacement of focal points in the vertical direction, and will be represented by (204*aa*+204*ad*)−(204*ab*+204*ac*) as a simplified expression. The output Yax is a signal pertaining to the displacement of focal points in the horizontal direction, and this also will be represented by (204*ac*+204*ad*)−(204*aa*+204*ab*) as a simplified expression. The output Sa is a signal representing the total sum of luminous engine in the four areas, and will be represented by (204*aa*+204*ab*+204*ac*+204*ad*). Though not shown, preamplifiers 231*a* trough 231*s* are provided for all of the quadrisected photodiodes 204*a* trough 204*s*, and the respective input/output relationships are set similar to the aforementioned relationship between 204*a* and 231*a*. This enables the preamplifier 231 to output difference signals Yax trough Ysx and Yay trough Ysy and sum signals Sa trough Ss. The difference signals Yax trough Ysx and Yay trough Ysy and the sum signals Sa trough Ss are converted by a standardizing unit (not shown) into standardized outputs Yax/Sa trough Ysx/Ss and Yay/Sa trough Ysy/Ss. These 38 signals constitute the output vector y of the optical detector 4.

An enlarged section of a photodiode is shown in FIG. 21(*c*). A circuit formation layer 232 including the preamplifier 231 is formed over the semiconductor substrate 201, and over it is formed the insulating layer 218. Further over it is formed electrodes an Al interconnection layer 233, and a pin structure is formed by growing an n region 234 which is an n-doped silicon layer, an i-region 235 which is a high resistance intrinsic semiconductor layer, and a p-region 236 which is a p-doped silicon layer. Finally an Al interconnection layer 237, which is to constitute an electrode to the p-region 236 is formed by sputtering to configure a photodiode. In the interconnection layer 233 and the interconnection layer 237 are bored via holes 239 and 239', respectively, for establishing electrical contacts with the circuit formation layer 232. When a reverse bias voltage is given from the circuit formation layer 232 to between the interconnection layer 233 and the interconnection layer 237, an output signal according to the incident luminous energy from an opening 238 is obtained.

Figure 22:
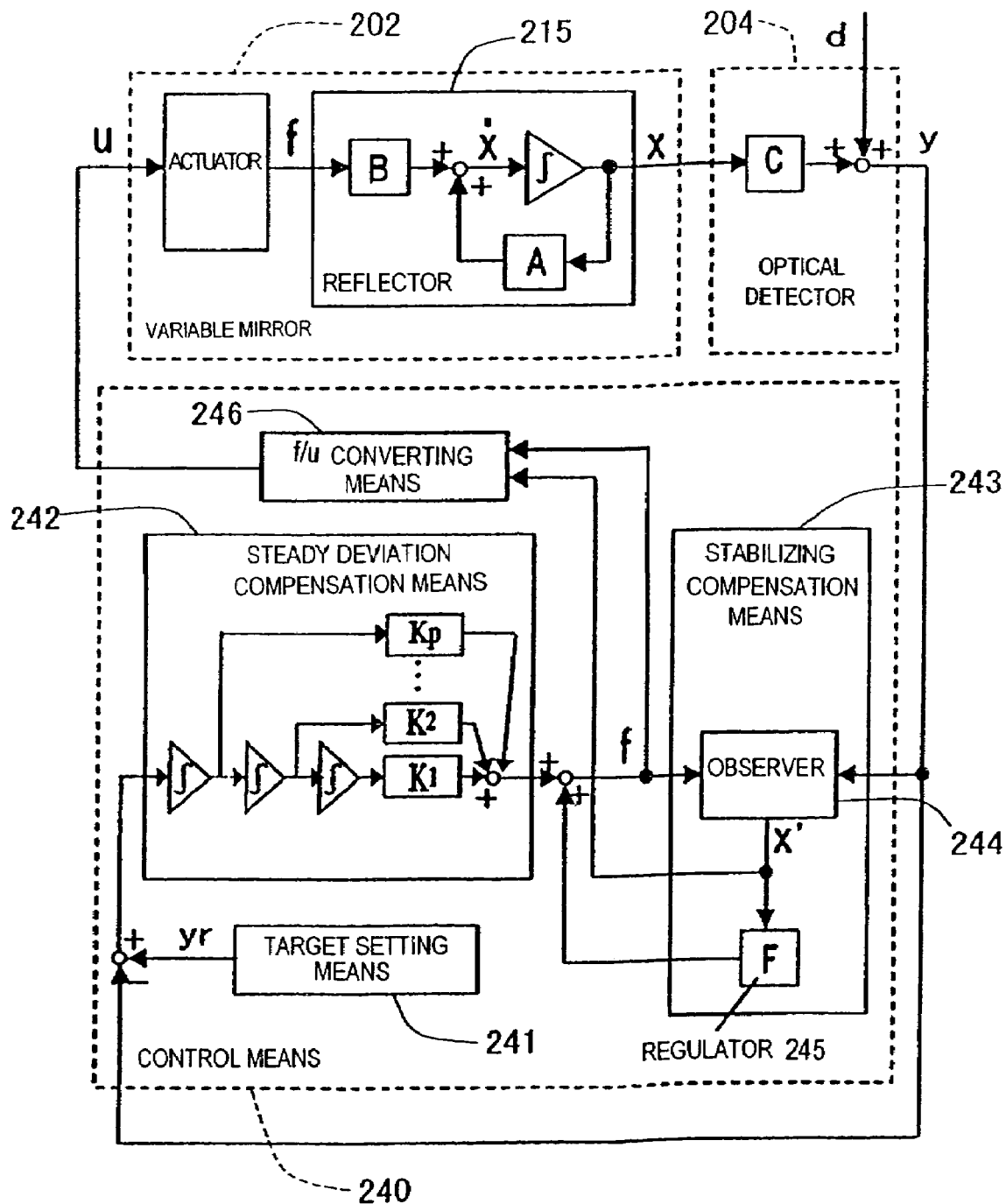
FIG. 22 is a schematic configurational diagram of a control unit in Embodiment 6 of the invention.

Next will be described a control unit configured over the semiconductor substrate 201 with reference to FIG. 22. FIG. 22 is a schematic configurational diagram of the control unit in this embodiment of the present invention. A control unit 240 in this embodiment of the present invention comprises a target setting unit 241, a steady deviation control unit 242, a stabilizing compensation unit 243 and an f/u conversion unit 246; receiving the inputting of the output vector y of the optical detector 204, it outputs the flow duration duty vector u of the actuator.

The target setting unit 241 sets the target vector yr, which is to serve as the target of the output vector y of the optical detector 204. For the purpose of constantly controlling the wave fronts of incident light irrespective of the disturbances, the target vector yr is set to a prescribed fixed vector. A zero vector may be set as this fixed vector with an ideal state being supposed, but a vector value obtained in advance by calibration may as well be stored into and read out of a memory. Alternatively, it is also possible to store a plurality of vector values into a memory in advance, and to use different target vector values according to variations in the conditions of use, such as a temperature change or switching the wavelength to match incident light. Then, for the purpose of actively varying the wave fronts of incident light for the purpose of scanning or the like, the target vector yr may be varied over time.

The steady deviation control unit 242 is an integral compensator which, with an eye to realizing the number p of types required for complying with an error signal yr-y without steady deviation, has p integrators coupled in series, multiplies the outputs of the integrators by gain matrixes K1 trough Kp and adds the products of multiplication. The number p of types and the values of the gain matrixes K1 trough Kp are figured out in the design process on the basis of the relationship between the order of the function of the vector y to be responded to and the matrix functions A, B and C to be described afterwards, and set as predetermined functions.

The stabilizing compensation unit 243 is a differential compensator for stabilizing a closed loop system asymptotically, and is configured here of an observer 244 and a regulator 245. The observer 44 is a least-dimensional observer, to which the output vector y of the optical detector 204 and the drive force vector f of the actuator are inputted, for outputting the estimated vector x' of a state vector x. The regulator 45, to which the estimated vector x' of a state is entered according to a feedback gain matrix F, and outputs the result of its linear computation. In the matrix F are set values figured out in advance in the design process so that poles of the closed loop system be arranged in appropriate positions of a complex left plane to be stabilized asymptotically. The sum of the output of the regulator 245 and the output of the steady deviation compensation unit 242 is the drive force vector f of the actuator.

The f/u conversion unit 246 is a nonlinear conversion unit for converting the drive force vector f of the actuator into the flow duration duty vector u. The flow duration duty is the quotient of the division of the duration of electricity flow to the actuator by the control cycle time, and this constitutes the quantity of manipulation in actual control. To the f/u conversion unit 246 are inputted the drive force vector f and the estimated state vector x', and the flow duration duty U is calculated back for every actuator from the drive force F and the estimated value of the displacement Z in accordance with Equation 1; where α and β are constants and V, the drive voltage. In more detail, the f/u conversion unit 246 has a selector circuit for selecting either one of the two fixed electrodes each actuator has and a conversion table in which are stored values predetermined as nonlinear functions in a memory. First the fixed electrode to be driven is selected according to the positive or negative sign of the drive force F, and then the flow duration duty U is obtained by inputting Z and F to the conversion table as addresses. This procedure is performed for all the actuators, and the flow duration duty vector u is obtained.

$$F = \pm \frac{\alpha V^2}{(1 \pm \beta \cdot Z)^2} \cdot U \tag{Equation 42}$$

The control unit 240 configured as described above constitutes a closed loop system between the objects of control of the deformable mirror 202 and of the optical detector 204. The flow duration duty vector u, which is the output of the control unit 240, is inputted to the deformable mirror 202; the actuator generates a drive force f to vary the state x of the reflector 215; and the wave front phase of the light beams reflected by it varies. The sum of these variations in wave front caused by the reflector 215 and variations in wave front due to disturbances d is observed, and becomes an input to the control unit 240 as the output vector y of the optical detector 204. A, B and C stated in the drawing here are fixed matrixes determined by the configurations of the deformable mirror 202 and of the optical detector 204. In this way, the output vector y of the optical detector 204 is so controlled as to comply with the target vector yr.

As described above, since the optical detector 204 which is the wave front detector and the deformable mirror 202 which is the wave front corrector are integrally formed over the semiconductor substrate 201 in this embodiment of the present invention, semiconductor process technology can be taken full advantage of to realize a high level of positional accuracy for both. Moreover, as these wave front detector and wave front corrector are formed over a common substrate under common manufacturing conditions, fluctuations in substrate characteristics including the thermal expansion coefficient and dimensional errors due to the combination of components belonging to different production lots or similar causes can be reduced.

Also, as the wiring for transmitting the output of the wave front detector to the wave front corrector is formed as a planar wiring pattern over the semiconductor substrate 201, complex wiring for connection in a three-dimensional space is unnecessary, making it possible to reduce the number of man-hours spent in assembly and to make the device more compact. Furthermore, since the control unit for controlling the wave front corrector on the basis of the output of the wave front detector are formed over the same substrate together with the wave front detector and the wave front corrector, the device can be further reduced in size and the wiring simplified.

Further, as the hologram 203, which is the deflector, and the optical detector 204 are integrally formed over the semiconductor substrate 1, semiconductor process technology can be taken advantage of to realize a high level of positional accuracy for both.

(Embodiment 7)

Figure 23:
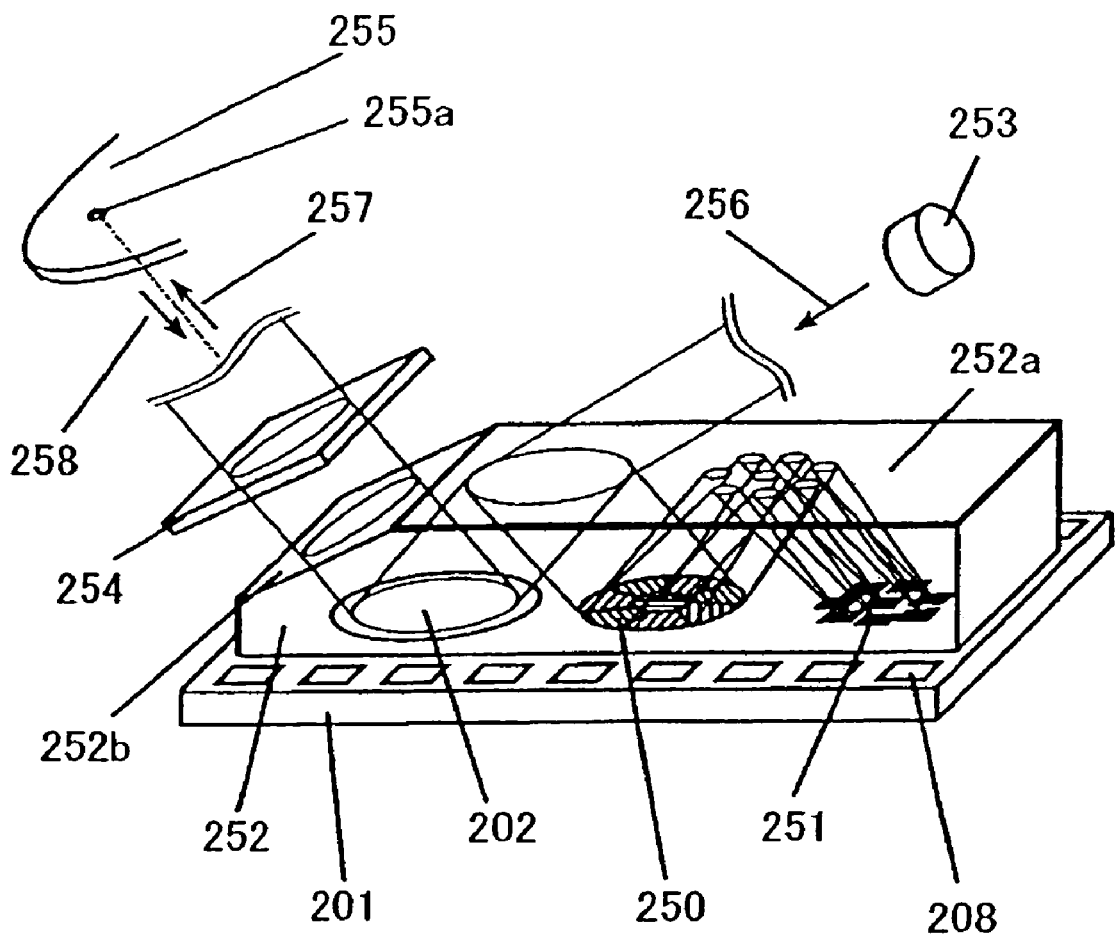
FIG. 23 is a schematic configurational diagram of an optical compensation device in Embodiment 7 of the invention.

FIG. 23 is a schematic configurational diagram of an optical compensation device in this embodiment of the present invention. Here is described in this embodiment of the present invention an example of configuration in which the optical compensation device is applied to an optical disk device.

The semiconductor substrate 201, the deformable mirror 202 and the posts 208 in this embodiment of the present invention have respectively the same structures as their counterparts in Embodiment 6. While a the hologram 250 and an optical detector 251 are substantially the same as their respective counterparts in Embodiment 6 in basic configuration, the arrangement is differentiated with focal points in the detection regions to address interfering wave fronts due to track grooves in an optical disk 255.

A microprism 252 provided over the semiconductor substrate 201 has a polarizing splitter film 252a on its top face and an inclined face 252b in some part. The inclined face 252b performs the role of a beam shaping prism for shaping oval beams into circular beams.

A semiconductor laser 253 is fixed integrally with the semiconductor substrate 201 by a holding mechanism (not shown). Light beams emitted by the semiconductor laser 253 are converted into parallel beams by a collimator lens (not shown).

Next will be described the operation of the optical compensation device in this embodiment of the present invention.

Light beams emitted from the semiconductor laser 253 are converted into oval parallel beams by the collimator lens; only their p polarized components are brought to incidence on the microprism 252 as forward incident beams 256 through the polarizing splitter film 252a and, after they are reflected by the deformable mirror 202 to undergo wave front correction, are emitted from the inclined face 252b as circular beams. This emitted light is converted by a quarter-wave plate 254 into circular beams, travel towards the optical disk 255 as forward reflected beams 257, and focused by an objective lens on a recording spot 255a. Reflected beams from the recording spot 255a go through the objective lens again to become backward incident beams 258, which are converted by the quarter-wave plate 254 into S polarized beams.

These backward incident beams 258 come incident on the microprism 252 from the inclined face 252b, and are reflected by the deformable mirror 202 to undergo wave front correction. These reflected beams are reflected by the polarizing splitter film 252a to come incident on the hologram 250. The hologram 203 divides these light beams into a plurality of detection regions to be deflected to different focal points, and the light beams are again reflected by the polarizing splitter film 252a to be received by the optical detector 251. The output signal of the optical detector 204 is inputted to a control unit (not shown) provided over the semiconductor substrate 201, and the deformable mirror 202 is controlled on the basis of this signal.

To add, since the incident/emitting direction of the forward reflected beams 257 or the backward incident beams 258 is made identical with the direction of the normal of the inclined face 252b, the positional accuracy of focal points on the hologram 250 can be maintained irrespective of the positional accuracy of the microprism 252 in the x and y directions.

Thus, in this embodiment of the present invention, a configuration in which beams from a light source is reflected by the deformable mirror 202 to be emitted outside the optical compensation device, and beams again coming incident on the optical compensation device are again reflected by the deformable mirror 202 to be guided to the optical detector 251 can be realized with a simple device in which the microprism 252 provided with the polarizing splitter film 252a is arranged over the semiconductor substrate 201.

In this embodiment of the present invention, by providing the microprism 252 with the inclined face 252b and using this inclined face 252b as the incident face or emitting face for light beams, it is made possible to give the effect of a beam shaping prism to the microprism 252 and at the same time to delete the polarizing splitter film 252a collectively with the formation of the inclined face 252b, with the result that no masking is needed at the time of forming the polarizing splitter film 252a and the number of man-hours required can be reduced correspondingly.

Further in this embodiment of the present invention, as the direction of the normal of the inclined face 252b is made coincident with the incident/emitting direction of the forward reflected beams 257 or the backward incident beams 258, the required positional accuracy of the microprism 252 can be substantially eased.

(Embodiment 8)

Figure 24:
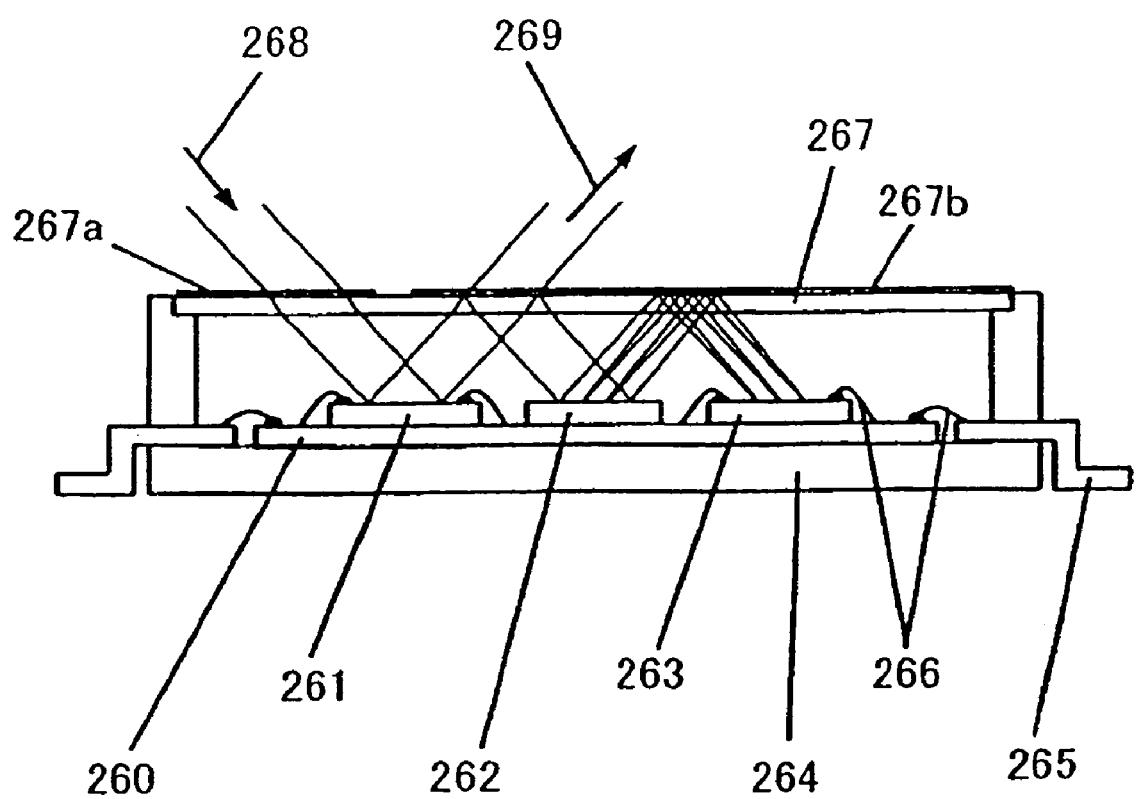
FIG. 24 is a schematic configurational diagram of an optical compensation device in Embodiment 8 of the invention.

FIG. 24 is a schematic configurational diagram of an optical compensation device in this embodiment of the present invention. This embodiment of the present invention differs from Embodiment 6 in that no all the constituent elements are integrated over the same semiconductor substrate but are divided into a number of chips as in a multi-chip module (MCM) and that a planar glass sheet 267 is configured as part of package case. Other aspects of the configuration and other functions are the same as their respective counter parts in Embodiment 6.

A ceramic substrate 260 consists of an insulating substrate of alumina or the like over which a wiring pattern is formed of a metallic film. Reference sign "261" denotes a deformable mirror unit comprising a Silicon substrate and a deformable mirror and a control circuit for controlling it, both formed integrally over the substrate. Reference sign "262" denotes a hologram made of a glass material over which a diffraction pattern is formed for deflection to focal points differing from one detection region to another, while reference sign "263" denotes an optical detector unit 263 comprising a GaAs substrate over which a quadrisected photodiode and an analog signal processing circuit for amplifying the output of the photodiode and performing signal processing including differential computation are integrated.

These deformable mirror unit 261, hologram 262 and optical detector unit 263 are packaged over the ceramic substrate 260, and wiring connection between the deformable mirror unit 261 and the optical detector unit 263 is accomplished with a wiring pattern formed on the ceramic substrate 260. The ceramic substrate 260 is adhered to a package base 264 and connected to a lead 265. This wiring connection is accomplished by bonding with an Au line 266.

The planar glass sheet 267 adhered to the top face of the package base 264 constitutes an optical path for incident beams 268 and emitted beams 269, treated with an anti-reflection film 267a and a polarizing splitter film 267b, and also makes up part of a package case together with the package base 264. The operation to detect the wave fronts of the incident beams 268 with the optical detector unit 263 and to correct these wave fronts with the deformable mirror unit 261 is the same in contents as what was described with reference to Embodiment 6, and the emitted beams 269 compensated for the wave fronts are thereby obtained.

Thus this embodiment of the present invention makes it possible to provide a compact optical compensation device with relative ease even where consistency in semiconductor process formation is made rather difficult to achieve by the use of different kinds of semiconductor substrates. Thus, as the deformable mirror unit 261 and the optical detector unit 263 are disposed over the same ceramic substrate 260, adjustment of the relative positions of the two units requires only two-dimensional positional adjustment in the same plane, and the number of man-hours spent on adjustment can be remarkably reduced because only three-degree-of-freedom adjustment is needed unlike the prior art which requires six-degree-of-freedom adjustment in a three-dimensional space.

Furthermore, as the wiring for transmitting the output of the optical detector unit 263 to the deformable mirror unit 261 is formed of a planar wiring pattern over the ceramic substrate 260, complex wiring required for connections in a three-dimensional space is unnecessary, making it possible to reduce the number of man-hours spent on assembly and to make the device more compact.

Also as the planar glass sheet 267 is assigned dual functions of constituting an optical path for detecting and correcting wave fronts of light beams and of a package case, the number of components can be reduced and the device can be built more compact.

With reference to Embodiments 6 trough 8, though configurations in which variations in the positions of focal points are detected by quadrisected detectors as wave front detectors have been described, the invention is not limited to these, but can as well be applied to other configurations in which, for instance, incident beams and reference beams are caused to interfere with each other and wave fronts are detected from the interference pattern.

Similarly, regarding the wave front corrector, though configurations in which a deformable mirror whose reflective surface is deformed have been described, the invention is not limited to these, but can as well be applied to other configurations in which, for instance, the wave fronts are corrected by utilizing variations in the refractive index of liquid crystals.

(Embodiment 9)

Figure 25A:
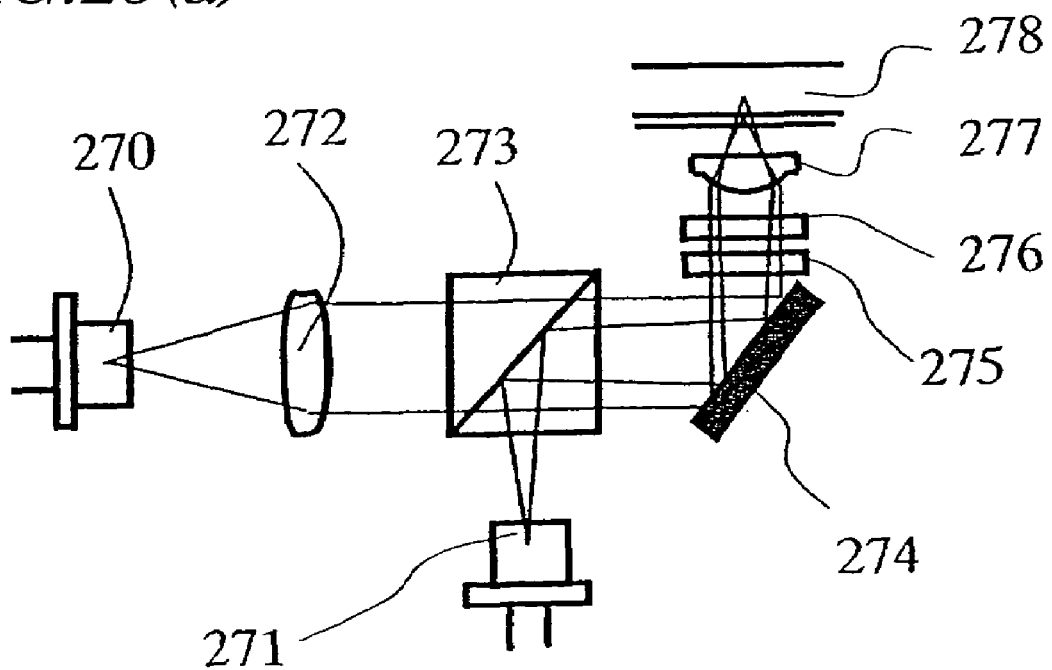
FIG. 25(a) is a schematic configurational diagram of an information device in Embodiment 9 of the invention.
Figure 25B:
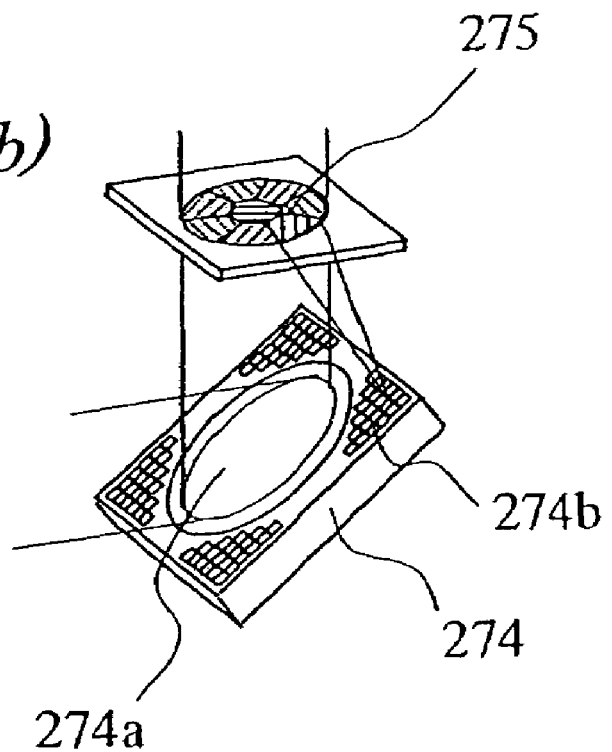
FIG. 25(b) is a perspective view of an optical compensation device for use in the information device.
Figure 26A:
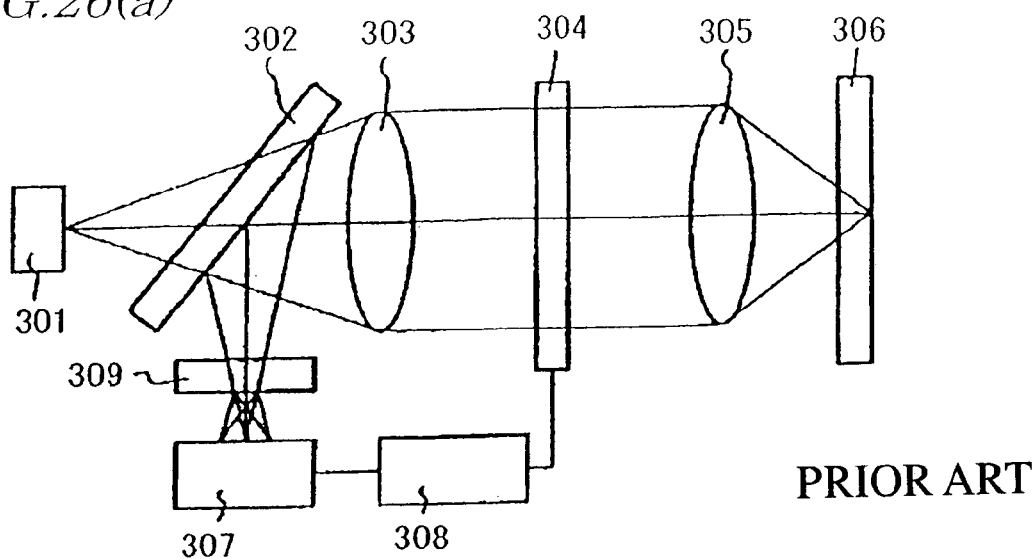
FIGS. 26(a) through 26(c) are configurational diagrams showing one example of an information device according to the prior art.
Figure 26B:
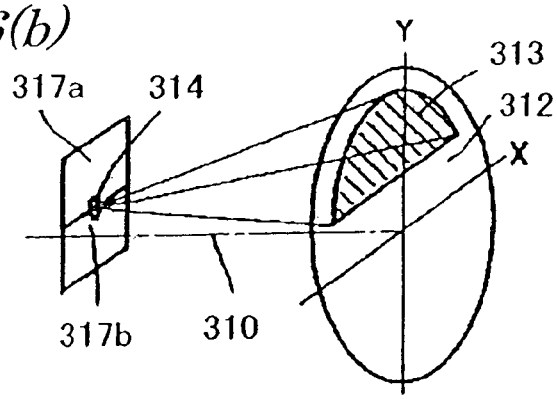
Figure 26C:
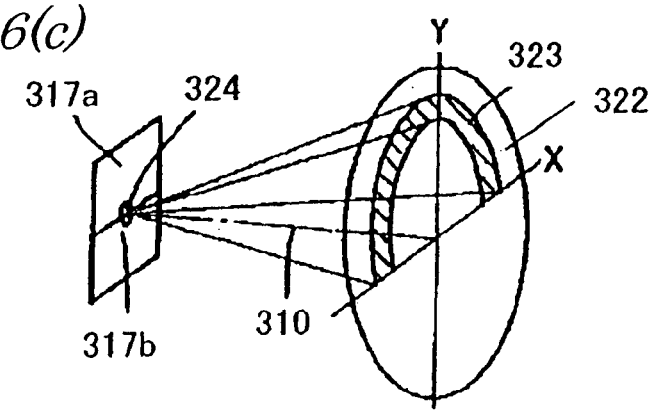

FIG. 25(a) is a schematic configurational diagram of an information device according to Embodiment 9 of the invention, and FIG. 25(b) is a perspective view of an optical compensation device for use in the information device.

The information device in this embodiment of the present invention comprises two types of lasers as light sources including an HD-DVD laser (blue light laser) 270 and a DVD-RAM laser (red light laser) 271. Beams emitted from each laser come incident on an optical compensation device 274 via a dichroic prism 273. The beams emitted from the HD-DVD laser (blue light laser) 270 come incident on the dichroic prism 273 via a lens 272.

The optical compensation device 274 in this embodiment of the present invention, as shown in FIG. 25(b), is a device comprising a common substrate (e.g. a semiconductor substrate such as a silicon substrate) over which a deformable mirror 274a and an optical detector 274b are integrally formed.

Beams reflected by the deformable mirror 274a of this optical compensation device 274, after being successively transmitted by a polarization hologram 275, a quarter-wave plate 276 and an objective lens 277, irradiate a disk (HD-DVD disk or DVD-RAM disk) 278, which is the information recording medium.

The beams reflected by the disk 278, after being transmitted by the objective lens 277 and the quarter-wave plate 276, are deflected by the polarization hologram 275, and come incident on the optical detector 274b on the optical compensation device 274.

The functioning of the polarization hologram 275, basically the same as that of the polarization hologram 63 described with reference to FIG. 10, is to deflect beams whose polarized face has been rotated 90° by being transmitted by the quarter-wave plate 276 twice, back and forth, to a desired position on the optical compensation device 274. To add, the configuration and operation of the deformable mirror 274a are similar to those of deformable mirrors in other embodiments of the present invention.

In this embodiment of the present invention, the deformable mirror 274a and the optical detector 274b are integrated into a single chip. In this respect, the information device in this embodiment of the present invention differs from the information device according to Embodiment 2. Where the optical compensation device 274 in which the optical detector 274b is integrated with the deformable mirror 274a in this embodiment of the present invention is to be applied to an information device, most of the light sources can be shared between an information device operating on a single light source and an information device operating on a plurality of light sources. As a result, where an information device operating on a single light source is to be improved to design an information device operating on two different light sources, it will be sufficient to add another light source of a different wavelength band. Therefore, it will be easy to enhance the compatibility of disks with different formats, and be made possible to provide at low cost an information device capable of reproducing from many different types of disks and therefore excelling in compatibility.

Although the polarization hologram 275 is not integrated with the optical compensation device 274 in the illustrated example, the polarization hologram 275 and/or the quarter-wave plate 276 can be integrated with the optical compensation device.

INDUSTRIAL APPLICABILITY

According to the present invention, a deformable mirror that can address many different types of aberrations, excel in accuracy, has a wide range of correctability, is highly responsive and capable of correcting wave front aberrations, and an information device using such a mirror is provided. Further according to the invention, an optical compensation device and a wave front detection device which can be easily reduced in size and cost and excels in the accuracy of relative positions is provided.

The invention claimed is:

1. An information device for irradiating a medium with forward light emitted from a light source and detecting information stored by said medium on the basis of backward light modulated by said medium, said information device comprising:
a wave front detector for detecting the wave fronts of said backward light in respect of each of a plurality of detection regions included in a section across the optical axis of said backward light,
a wave front corrector, provided within the optical path of said forward light and/or backward light, for locally varying the optical path length of said forward light and/or backward light by an action of a plurality of drive units arrayed on a plane crossing said optical path, and
a control unit for supplying a plurality of drive signals to said wave front corrector on the basis of a plurality of outputs of said wave front detector and reconstructing the whole wave fronts of said backward light.

2. The information device according to claim 1 wherein said control unit has a multi-input/multi-output converting unit comprising undiagonal conversion elements.

3. The information device according to claim 1 wherein said wave front detector comprises:
a deflector for deflecting said backward light in respect of each of said detection regions independently of one another, and
an optical detector having divided photodetectors comprising a plurality of light receiving portions for receiving said backward light deflected by said deflector in respect of each of said detection regions, wherein:
wave fronts in each detection region of said backward light are detected by comparing the outputs of a plurality of divided parts of said divided photodetectors.

4. The information device according to claim 3 wherein the areas of detection regions arranged in parts where the intensity of said backward light is lower are set greater than the areas of detection regions arranged in parts where the intensity of said backward light is higher.

5. The information device according to claim 4 wherein said backward light has an intensity distribution of decreasing according to the distance from the center of the optical path,
the areas of detection regions crossing the center of said optical path are smaller than the areas of other detection regions,
the areas of detection regions are set to become greater with an increase in distance from the center of said optical path,
the shapes of detection regions at an equal distance from the center of said optical path are substantially the same among one another and have rotational symmetry with respect to the center of said optical path.

6. The information device according to claim 3 wherein said medium has a diffraction groove extending in a prescribed direction,
said plurality of detection regions are divided according to the conditions of interference by said diffraction groove, and said conditions of interference are set to be substantially the same within the same one of said detection regions.

7. The information device according to claim 6 wherein said detection regions are the regions in which the conditions of interference by said diffraction groove are substantially the same, being divided into a plurality.

8. The information device according to claim 3 wherein said deflector includes a hologram having diffraction grating patterns differing from one to another of said detection regions, wherein:
said hologram deflects backward light in at least two deflecting directions differing from one detection region to another,
backward light deflected in a first deflecting direction included in said two deflecting directions are received by a first divided detector comprising a dividing line in the first dividing direction,
backward light deflected in a second deflecting direction included in said two deflecting directions are received by a second divided detector comprising a dividing line in a second dividing direction at least differing from the first dividing direction, and
wave front components in two different directions, which are directions normal to said dividing line, are detected by comparing the outputs of detectors divided by each of said dividing lines with each other.

9. The information device according to claim 1 comprising a medium information detecting unit for detecting on the basis of the backward light information stored by the medium, and
a timing unit for generating on the basis of the output of said medium information detecting unit a timing to validate the output of said wave front detector, wherein:
said wave front detector detects, on the basis of said timing outputted from said timing unit, local wave fronts of said backward light.

10. The information device according to claim 1 wherein said wave front corrector comprises:
a reflector for reflecting said forward light and/or backward light, and
a plurality of drive units for bidirectionally displacing said reflector by an electrostatic force.

11. The information device according to claim 2 wherein said control unit comprises:
a steady deviation compensation unit having an integrator for integrating the outputs of the wave front detector and an undiagonal first matrix computing unit for linearly converging the outputs of said integrator,
a stabilizing compensation unit having an undiagonal second matrix computing unit for computing and predicting the state of the wave front corrector from the output of said steady deviation compensation unit and the output of said wave front detector, and a diagonal converting unit, to which the output of said steady deviation compensation unit and the output of said stabilizing compensation unit are inputted, for generating drive signals for drive units.

12. The information device according to claim 11 wherein said diagonal converting unit performs nonlinear computations.

13. The information device according to claim 1 comprising a plurality of light sources differing in each other in the wavelength of emitted beams and an optical system for irradiating said medium with forward light of different wavelengths emitted from said light sources, wherein said wave front corrector is arranged within said optical system, and said wave front detector separates by wavelength backward light modulated by said medium, and detects the wave fronts of said backward light for each wavelength.

14. The information device according to claim 13 comprising an objective lens for focusing forward light emitted from said plurality of light sources and irradiating the medium with them, wherein the numerical aperture of said objective lens towards said medium side can take either one of a first value and a second value smaller than said first value according to the selected light source.

15. The information device according to claim 14 wherein at least one light source out of said plurality of light sources forms forward light functioning as finite system light in the divergent direction, and the numerical aperture of said objective lens towards said medium, where said forward light comes incident, is set to the second value.

16. The information device according to claim 15 wherein the imaging point of said forward light is formed before said objective lens.

17. The information device according to claim 14 provided in an acceptable way with a first medium so configured as to appropriately detect information it holds when the first value is assigned as the numerical aperture of the objective lens towards the medium, and a second medium so configured as to appropriately detect information it holds when the second value is assigned as the numerical aperture of said objective lens towards the medium, further comprising a medium discriminating unit for distinguishing said first medium and said second medium from each other by judging whether or not said detection has been appropriately accomplished, wherein, after first causing said medium discriminating unit to judge whether or not the medium is said second medium in a state in which said second value is assigned as the numerical aperture of said objective lens towards the medium, said medium discriminating unit is caused to judge whether or not the medium is said first medium in a state in which said first value is assigned as the numerical aperture of said objective lens towards the medium.

18. An information device for irradiating a medium with forward light emitted from a light source and detecting information stored by said medium on the basis of backward light modulated by said medium, said information device comprising a wave front detector for dividing said backward light into a plurality of detection regions and detecting wave fronts of said backward light in each of said detection regions, a curvature computing unit for computing a value representing the curvature of the whole wave fronts of said backward light on the basis of a plurality of outputs of said wave front detector, and an objective lens control unit for controlling said objective lens on the basis of the output of said curvature computing unit.

19. An optical compensation device comprising:

a deflector for deflecting light beams as divided into a plurality of detection regions;

an optical detector arranged in a position to receive said light beams deflected by said deflector; and a wave front corrector for correcting the wave fronts of said light beams on the basis of the output of said optical detector, wherein:

said deflector, optical detector and wave front corrector are formed over the same substrate, and there are further provided a dielectric member in a parallel planar shape for forming an optical path for said light beams to come incident on said wave front-corrected recording medium.

20. The optical compensation device according to claim 19 wherein said dielectric member is formed of a microprism comprising an inclined face non-parallel to the main face of said substrate, and said inclined face functions as the incident face or the emitting face of said light beams.

21. The optical compensation device according to claim 20 wherein the incident direction or emitting direction of said light beams substantially coincides with the direction normal to the inclined face of said microprism.

22. An information device comprising an optical compensation device according to claim 19.

* * * * *